(12) United States Patent
Dowling et al.

(10) Patent No.: US 7,719,536 B2
(45) Date of Patent: May 18, 2010

(54) GLYPH ADJUSTMENT IN HIGH RESOLUTION RASTER WHILE RENDERING

(75) Inventors: Terence S. Dowling, San Jose, CA (US); R. David Arnold, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 839 days.

(21) Appl. No.: 11/464,716

(22) Filed: Aug. 15, 2006

(65) Prior Publication Data

US 2007/0188497 A1     Aug. 16, 2007

Related U.S. Application Data

(63) Continuation-in-part of application No. 10/816,582, filed on Mar. 31, 2004.

(60) Provisional application No. 60/714,549, filed on Sep. 13, 2005.

(51) Int. Cl.
G06T 11/00   (2006.01)
G09G 5/24    (2006.01)
G09G 5/26    (2006.01)

(52) U.S. Cl. .................. 345/467; 345/468; 345/469; 345/469.1; 345/470; 345/471; 345/472; 345/472.1; 345/472.2; 345/472.3

(58) Field of Classification Search .......... 345/467, 345/468, 469, 469.1, 470, 471, 472, 472.1, 345/472.3, 472.2
See application file for complete search history.

(56) References Cited

U.S. PATENT DOCUMENTS 4,200,861 A    4/1980    Hubach et al.

(Continued)

FOREIGN PATENT DOCUMENTS

DE    69622961.7    8/2002

(Continued)

OTHER PUBLICATIONS

Taligent Documentation, "Miter limit joint" [online],1995 [retrieved on Mar. 8, 2007]. Retrieved from the Internet: <URL: http://www.cubik.org/mirrors/taligent/Docs/books/GS/GS_134.html> 1 page.

(Continued)

*Primary Examiner*—Ulka Chauhan
*Assistant Examiner*—Jeffrey J Chow
(74) *Attorney, Agent, or Firm*—Fish & Richardson P.C.

(57) ABSTRACT

Methods and apparatus, including computer program products, that implement a method for glyph adjustment in high resolution raster while rendering. In one aspect, a method includes the actions of receiving a glyph for display at a size on a raster output device; receiving a grid ratio specifying an integer number of fine pixels of a high resolution grid that correspond to a device pixel of the output device; rendering the glyph at the size on the high resolution grid; determining for each line of pixels of the high resolution grid, a line-specific, per-transition adjustment number; and in each line of pixels, marking or erasing the line-specific, per-transition adjustment number of fine pixels in the high resolution grid at each transition from a marked fine pixel to an unmarked fine pixel in a particular direction of the line of pixels.

33 Claims, 39 Drawing Sheets

U.S. PATENT DOCUMENTS

| | | | |
|---|---|---|---|
| 4,331,955 A | 5/1982 | Hansen | |
| 4,486,785 A | 12/1984 | Lasher et al. | |
| 4,580,231 A | 4/1986 | Tidd et al. | |
| 4,591,844 A | 5/1986 | Hickin et al. | |
| 4,667,247 A | 5/1987 | Karow | |
| 4,672,369 A | 6/1987 | Preiss et al. | |
| 4,675,830 A | 6/1987 | Hawkins | |
| 4,720,705 A | 1/1988 | Gupta et al. | |
| 4,780,711 A | 10/1988 | Doumas | |
| 4,783,652 A | 11/1988 | Lumelsky | |
| 4,827,255 A | 5/1989 | Ishii | |
| 4,851,825 A | 7/1989 | Naiman | |
| 4,907,282 A | 3/1990 | Daly et al. | |
| 4,908,780 A | 3/1990 | Priem et al. | |
| 4,945,351 A | 7/1990 | Naiman | |
| 5,099,435 A | 3/1992 | Collins et al. | |
| 5,132,674 A | 7/1992 | Bottorf | |
| 5,241,653 A | 8/1993 | Collins et al. | |
| 5,278,678 A | 1/1994 | Harrington | |
| 5,280,577 A | 1/1994 | Trevett et al. | |
| 5,299,308 A | 3/1994 | Suzuki et al. | |
| 5,301,267 A | 4/1994 | Hassett et al. | |
| 5,301,269 A | 4/1994 | Alcorn et al. | |
| 5,304,989 A | 4/1994 | Martinez et al. | |
| 5,325,479 A | 6/1994 | Kaasila | |
| 5,386,509 A | 1/1995 | Suzuki et al. | |
| 5,398,306 A | 3/1995 | Karow | |
| 5,416,898 A | 5/1995 | Opstad et al. | |
| 5,459,828 A | 10/1995 | Zack et al. | |
| 5,517,601 A | 5/1996 | Rust et al. | |
| 5,519,824 A * | 5/1996 | Lizzi | 345/170 |
| 5,544,294 A | 8/1996 | Cho et al. | |
| 5,568,597 A | 10/1996 | Nakayama et al. | |
| 5,633,991 A * | 5/1997 | Hakaridani et al. | 358/1.11 |
| 5,664,086 A | 9/1997 | Brock et al. | |
| 5,673,371 A | 9/1997 | Koopman et al. | |
| 5,684,510 A | 11/1997 | Brassell et al. | |
| 5,734,388 A | 3/1998 | Ristow et al. | |
| 5,754,187 A | 5/1998 | Ristow et al. | |
| 5,771,048 A | 6/1998 | Nankou et al. | |
| 5,808,600 A | 9/1998 | Mochizuki | |
| 5,825,370 A | 10/1998 | Yoshida et al. | |
| 5,852,448 A | 12/1998 | Cheng | |
| 5,857,067 A | 1/1999 | Hassett et al. | |
| 5,909,221 A | 6/1999 | Nakai et al. | |
| 5,910,805 A | 6/1999 | Hickey et al. | |
| 5,929,866 A | 7/1999 | Arnold | |
| 5,940,080 A | 8/1999 | Ruehle et al. | |
| 5,943,063 A | 8/1999 | Dowling | |
| 5,959,634 A | 9/1999 | Yoshida | |
| 5,995,086 A * | 11/1999 | Dowling et al. | 345/467 |
| 6,005,588 A | 12/1999 | Guha | |
| 6,088,644 A | 7/2000 | Brandt et al. | |
| 6,104,833 A | 8/2000 | Naoi et al. | |
| 6,128,415 A | 10/2000 | Hultgren et al. | |
| 6,141,441 A | 10/2000 | Cass et al. | |
| 6,229,521 B1 | 5/2001 | Yip | |
| 6,236,390 B1 | 5/2001 | Hitchcock | |
| 6,266,444 B1 | 7/2001 | Yoshida | |
| 6,282,327 B1 | 8/2001 | Betrisey et al. | |
| 6,288,725 B1 | 9/2001 | Fu | |
| 6,288,726 B1 | 9/2001 | Ballard | |
| 6,323,879 B1 | 11/2001 | Sauerbrei | |
| 6,330,003 B1 | 12/2001 | Curtis et al. | |
| 6,342,890 B1 | 1/2002 | Shetter | |
| 6,356,278 B1 | 3/2002 | Stamm et al. | |
| 6,369,902 B1 | 4/2002 | Beaman et al. | |
| 6,377,262 B1 | 4/2002 | Hitchcock et al. | |
| 6,384,839 B1 | 5/2002 | Paul | |
| 6,408,109 B1 | 6/2002 | Silver et al. | |
| 6,438,576 B1 | 8/2002 | Huang et al. | |
| 6,459,431 B1 | 10/2002 | Browne et al. | |
| 6,563,502 B1 | 5/2003 | Dowling et al. | |
| 6,614,432 B1 | 9/2003 | Merrill | |
| 6,897,879 B2 | 5/2005 | Lyapunov et al. | |
| 6,950,986 B1 | 9/2005 | Jacobi et al. | |
| 7,190,367 B2 | 3/2007 | Perry et al. | |
| 7,408,556 B2 | 8/2008 | Brown | |
| 2001/0048764 A1 | 12/2001 | Betrisey et al. | |
| 2002/0093476 A1 | 7/2002 | Hill et al. | |
| 2002/0093502 A1 | 7/2002 | Koyama | |
| 2002/0105515 A1 | 8/2002 | Mochizuki | |
| 2002/0108521 A1 | 8/2002 | Velde et al. | |
| 2002/0173947 A1 | 11/2002 | Soskov et al. | |
| 2003/0080969 A1 | 5/2003 | Barmettler | |
| 2003/0214513 A1 | 11/2003 | Brown et al. | |
| 2004/0001069 A1 | 1/2004 | Snyder et al. | |
| 2004/0025118 A1 | 2/2004 | Renner | |
| 2004/0119724 A1 | 6/2004 | Hawksworth | |
| 2004/0189666 A1 | 9/2004 | Frisken et al. | |
| 2004/0212620 A1 | 10/2004 | Dowling et al. | |
| 2004/0227770 A1 | 11/2004 | Dowling et al. | |
| 2004/0227771 A1 | 11/2004 | Arnold et al. | |
| 2005/0190183 A1 | 9/2005 | Barone et al. | |
| 2005/0219247 A1 | 10/2005 | Arnold et al. | |
| 2005/0219248 A1 | 10/2005 | Arnold et al. | |
| 2006/0017733 A1 | 1/2006 | Matskewich et al. | |
| 2007/0030272 A1 | 2/2007 | Dowling et al. | |
| 2007/0262993 A1 | 11/2007 | Fux et al. | |
| 2008/0068383 A1 | 3/2008 | Dowling | |

FOREIGN PATENT DOCUMENTS

| | | |
|---|---|---|
| EP | 0 214 547 | 3/1987 |
| EP | 0 397 299 | 11/1990 |
| EP | 0 428 356 | 5/1991 |
| EP | 0 435 391 | 7/1991 |
| EP | 0 468 652 | 1/1992 |
| EP | 0 506 381 A | 9/1992 |
| EP | 0 304 509 | 6/1993 |
| EP | 0 590 923 | 4/1994 |
| EP | 0 654 778 | 5/1995 |
| EP | 0 667 596 | 8/1995 |
| EP | 0 693 740 | 1/1996 |
| EP | 0 772 144 | 5/1997 |
| EP | 1 077 445 | 2/2001 |
| GB | 2 236 463 | 4/1991 |
| JP | 2-275494 | 11/1990 |
| JP | 3243370 | 10/1991 |
| JP | 6-208370 | 7/1994 |
| WO | 86/04703 | 8/1986 |
| WO | 94/06094 | 3/1994 |
| WO | 94/29843 | 12/1994 |
| WO | 00/52673 | 9/2000 |
| WO | 2004/104933 | 12/2004 |
| WO | 2004/104937 | 12/2004 |
| WO | 2005/097490 | 10/2005 |
| WO | 2005/098757 | 10/2005 |

OTHER PUBLICATIONS

Wikipedia, "Transformation matrix" [online], [retrieved on Mar. 8, 2007]. Retrieved from the Internet: <URL: http://en.wikipedia.org/wiki/Matrix_transformation> 5 pages.

"TrueType Typography: A History of True Type", 6 pages [online], 2005. Retrieved from the Internet: <URL: http://www.truetype.demon.co.uk/tthist.htm> on Jan. 12, 2006.

Betrisey, et al., "20.4: Displaced Filtering for Patterned Displays", *Society for Information Display*, (2000), 4 pages.

Foley et al., "Computer Graphics Principles and Practice—Second Edition", Addison-Wesley Publishing Company, (1990) pp. 132-140, 617-646 and 965-979.

Foley et al., "Computer Graphics Principles and Practice—Second Edition", Addison-Wesley Publishing Company, (1990), pp. 584-586, 589-590, 599-600, 642-646 and 693-695.

Gibson Research Corporation, "Sub-Pixel Font Rendering Technology—Implementation Details", 7 pages [online], 1999. Retrieved from the Internet: <URL: http://grc.com/cttech.htm> on Dec. 28, 2005.

Gibson Research Corporation, "Sub-Pixel Font Rendering Technology—Who Did It First?", 7 pages, [online], 2000. Retrieved from the Internet: <URL: http://grc.com/ctwho.htm> on Dec. 28, 2005.

Gibson Research Corporation, "Sub-Pixel Font Rendering Technology—Visitor Dialog Q&A", 7 pages [online], 2003. Retrieved from the Internet: <URL: http:grc.com/ctdialog.htm> on Dec. 28, 2005.

Gibson Research Corporation, "Sub-Pixel Font Rendering Technology—How It Works", 9 pages [online], 2002. Retrieved from the Internet: <URL: http://grc.com/ctwhat.htm> on Dec. 28, 2005.

Microsoft Corporation, "ClearType Antialiasing", 2 pages [online], 2003. Retrieved from the Internet: <URL: http://msdn.microsoft.com/library/default.asp?url=/library/en-us/gdi/fonttext-osgn.asp> on Dec. 28, 2005.

Microsoft Corporation, "gasp—Grid-fitting And Scan-conversion Procedure", 2 pages [online], 1998. Retrieved from the Internet: <URL: http://www.microsoft.com/typography/otspec/gasp.htm> on Dec. 18, 2005.

Microsoft Corporation, "Microsoft ClearType FAQ", 4 pages [online], 2002. Retrieved from the Internet: <URL: http://www.microsoft.com/typography/faq/faq15.htm> on Dec. 28, 2005.

Microsoft Corporation, "The TrueType instruction set", cover sheet 1 page, pp. 181-261 [online], 1997. Retrieved from the Internet: <URL: http://www.microsoft.com/typography/otspec/ttinst.htm> on Dec. 18, 2005.

Microsoft Corporation, "What is ClearType?", 3 pages [online], 2002. Retrieved from the Internet: <URL: www.microsoft.com/typography/cleartype/what.htm?frame=%208fsize> on Dec. 28, 2005.

Phinney, Thomas, W., "TrueType & Post Script Type 1: What's the Difference?", 10 pages [online], 1997. Retrieved from the Internet: <URL: http://www.truetype.demon.co.uk/articles/ttvst1.htm> on Jan. 12, 2006.

Platt, John C., "Optimal Filtering for Patterned Displays", Microsoft Research, *IEEE Signal Processing Letters*, (2000), vol. 7, No. 7, pp. 179-180.

SMPTE 170M-1999, SMPTE Standard for Television, "Composite Analog Video Signal—NTSC for Studio Applications", *The Society of Motion Picture and Television Engineers* (1999), 19 pages.

Display Flicker Reduction by Use of Anisotropic Filtering. IBM Technical Disclosure Bulletin vol. 27, Issue 1, Jan. 1, 1985, see p. 4662.

International Search Report and Written Opinion of the International Searching Authority, PCT Application Serial No. PCT/US07/78943, Aug. 20, 2008, 12 pp.

"Docjar," org.apache.batik.svggen.font.Glyph, v. 1.4, Aug. 18, 2004 [online]. Retrieved from the Internet: http://www.docjar.org/docs/api/org/apache/batik/svggen/font/Glyph.html.

"Glyphe," Jul. 16, 2009 [online] [retrieved Oct. 8, 2009]. Retrieved from the Internet: http://de.wikipedia.org/wiki/Glyphc, with machine translation.

"Glyph—Wikipedia, the free encyclopedia," Oct. 12, 2009 [online] [retrieved Oct. 29, 2009]. Retrieved from the Internet: http://en.wikipedia.org/wiki/Glyph.

Office Action, German Patent and Trademark Office, issued Aug. 11, 2009 for Application No. 11 2007 002 225.6-53.

International Search Report and Written Opinion of the International Searching Authority, PCT Application Serial No. PCT/US05/09933, Feb. 23, 2006, 10 pp.

International Search Report and Written Opinion of the International Searching Authority, PCT Application Serial No. PCT/US05/09934, Nov. 8, 2006, 9 pp.

Non-Final Office Action dated Jan. 1, 2006, from U.S. Appl. No. 10/816,587, 14 pages.

Snapshot from Feb. 3, 1999, How Sub-Pixel Font Rendering Works, "How It Works" [online], retrieved from the Internet: http://web.archive.org/web/19990508193320/www.spinrite.com/ctwhat.htm, Retrieved on Jun. 26, 2009, 10 pages.

Snapshot from Feb. 3, 1999, Sub-Pixel Rendering Implementation Details, "Sub-Pixel Font Rendering Technology" [online], retrieved from the Internet: http://web.archive.org/web/20040112153322/www.spinrite.com/cttech.htm, Retrieved on Jun. 26, 2009, 7 pages.

* cited by examiner

Font Type: Type 1 Gray Scale

| Scaled Stem Width (1/16ths) 802 | X Grid Ratio 804 | Y Grid Ratio 806 | Hint Grid Ratio 808 | Hinting Policy 809 | X Align. 810 | Y Align. 812 | X Offset Amt. 814 | Y Offset Amt. 816 | X Carry (y/n) 818 | Y Carry (y/n) 820 | Initial Adjustment Value (1/16ths) 822 |
|---|---|---|---|---|---|---|---|---|---|---|---|
| 0 | 4 | 4 | 4 | Black Edge | 4 | 4 | 0 | 1 | 1 | 1 | 4 |
| 1 | 4 | 4 | 4 | Black Edge | 4 | 4 | 0 | 1 | 1 | 1 | 4 |
| 2 | 4 | 4 | 4 | Black Edge | 4 | 4 | 0 | 1 | 1 | 1 | 4 |
| 3 | 4 | 4 | 4 | Black Edge | 4 | 4 | 0 | 1 | 1 | 1 | 4 |
| 4 | 4 | 4 | 4 | Black Edge | 4 | 4 | 0 | 1 | 1 | 1 | 4 |
| 5 | 8 | 8 | 8 | Black Edge | 8 | 8 | 0 | 1 | 1 | 1 | 4 |
| 6 | 8 | 8 | 8 | Black Edge | 8 | 8 | 0 | 1 | 1 | 1 | 4 |
| 7 | 8 | 8 | 8 | Black Edge | 8 | 8 | 0 | 1 | 1 | 1 | 4 |
| 8 | 8 | 8 | 8 | Black Edge | 8 | 8 | 0 | 1 | 1 | 1 | 4 |
| 9 | 8 | 8 | 8 | Black Edge | 8 | 8 | 0 | 1 | 1 | 1 | 4 |
| 10 | 8 | 4 | 4 | Black Edge | 4 | 4 | 1 | 1 | 1 | 0 | 4 |
| 11 | 4 | 4 | 4 | Black Edge | 4 | 4 | 1 | 1 | 1 | 0 | 4 |
| 12 | 8 | 8 | 8 | Black Edge | 8 | 8 | 1 | 1 | 1 | 1 | 4 |
| 13 | 8 | 8 | 8 | Black Edge | 8 | 8 | 1 | 1 | 1 | 1 | 3 |
| 14 | 8 | 8 | 8 | Black Edge | 8 | 8 | 1 | 1 | 1 | 1 | 3 |
| 15 | 8 | 8 | 8 | Black Edge | 8 | 8 | 1 | 1 | 1 | 1 | 3 |
| 16 | 8 | 8 | 8 | Black Edge | 8 | 8 | 1 | 1 | 1 | 1 | 3 |
| 17 | 8 | 8 | 8 | Black Edge | 8 | 8 | 1 | 1 | 1 | 1 | 2 |

FIG. 8A-1

| Scaled Stem Width (1/16ths) | X Grid Ratio | Y Grid Ratio | Hint Grid Ratio | Hinting Policy | X Align. | Y Align. | X Offset Amt. | Y Offset Amt. | X Carry (y/n) | Y Carry (y/n) | Initial Adjustment Value (1/16ths) |
|---|---|---|---|---|---|---|---|---|---|---|---|
| 18 | 8 | 8 | 8 | Black Edge | 8 | 8 | 1 | 1 | 1 | 1 | 2 |
| 19 | 8 | 8 | 8 | Black Edge | 8 | 8 | 1 | 1 | 1 | 1 | 2 |
| 20 | 8 | 8 | 8 | Black Edge | 8 | 8 | 1 | 1 | 1 | 1 | 2 |
| 21 | 8 | 8 | 8 | Black Edge | 8 | 8 | 1 | 1 | 1 | 1 | 2 |
| 22 | 8 | 8 | 8 | Black Edge | 8 | 8 | 1 | 1 | 1 | 1 | 2 |
| 23 | 8 | 8 | 8 | Black Edge | 8 | 8 | 1 | 1 | 1 | 1 | 2 |
| 24 | 8 | 8 | 8 | Black Edge | 8 | 8 | 1 | 1 | 1 | 1 | 2 |
| 25 | 8 | 8 | 8 | Black Edge | 8 | 8 | 1 | 1 | 1 | 1 | 2 |
| 26 | 4 | 4 | 4 | Black Edge | 4 | 4 | 0 | 0 | 1 | 0 | 1 |
| 27 | 4 | 4 | 4 | Black Edge | 4 | 4 | 0 | 0 | 1 | 0 | 1 |
| 28 | 4 | 4 | 4 | Black Edge | 4 | 4 | 0 | 0 | 1 | 0 | 1 |
| 29 | 8 | 8 | 8 | Black Edge | 8 | 8 | 1 | 1 | 1 | 1 | 1 |
| 30 | 8 | 8 | 8 | Black Edge | 8 | 8 | 1 | 1 | 1 | 1 | 1 |
| 31 | 8 | 8 | 8 | Black Edge | 8 | 8 | 1 | 1 | 1 | 1 | 1 |
| 32 | 8 | 8 | 8 | Black Edge | 8 | 8 | 1 | 1 | 1 | 1 | 1 |
| 33 | 8 | 8 | 8 | Black Edge | 8 | 8 | 1 | 1 | 1 | 1 | 1 |
| 34 | 4 | 4 | 4 | Black Edge | 4 | 4 | 0 | 0 | 1 | 0 | 0 |
| 35 | 4 | 4 | 4 | Black Edge | 4 | 4 | 0 | 0 | 1 | 0 | 0 |
| 36 | 4 | 4 | 4 | Black Edge | 4 | 4 | 0 | 0 | 1 | 0 | 0 |
| 37 | 4 | 4 | 4 | Black Edge | 4 | 4 | 0 | 0 | 1 | 0 | 0 |

FIG. 8A-2

Font Type: Type 1 Gray Scale

| Scaled Stem Width (1/16ths) | Asymmetric Adjusting (y/n) 850 | Low Density 852 | Low Initial Adjustment Value (1/16ths) 854 | High Density 856 | High Initial Adjustment Value (1/16ths) 858 |
|---|---|---|---|---|---|
| 0 | 0 | 0 | 0 | 0 | 0 |
| 1 | 0 | 0 | 0 | 0 | 0 |
| 2 | 0 | 0 | 0 | 0 | 0 |
| 3 | 0 | 0 | 0 | 0 | 0 |
| 4 | 0 | 0 | 0 | 0 | 0 |
| 5 | 1 | 0 | 2 | 24 | 6 |
| 6 | 1 | 0 | 2 | 24 | 6 |
| 7 | 1 | 0 | 2 | 32 | 6 |
| 8 | 1 | 0 | 2 | 32 | 6 |
| 9 | 1 | 0 | 2 | 40 | 6 |
| 10 | 0 | 0 | 2 | 40 | 6 |
| 11 | 0 | 0 | 0 | 0 | 0 |
| 12 | 1 | 8 | 4 | 56 | 2 |
| 13 | 1 | 8 | 4 | 56 | 2 |
| 14 | 1 | 8 | 4 | 56 | 2 |
| 15 | 1 | 8 | 4 | 56 | 2 |
| 16 | 1 | 0 | 0 | 0 | 0 |
| 17 | 0 | 0 | 0 | 0 | 0 |
| 18 | 0 | 0 | 0 | 0 | 0 |
| 19 | 0 | 0 | 0 | 0 | 0 |
| 20 | 0 | 0 | 0 | 0 | 0 |

FIG. 8B-1

| Scaled Stem Width (1/16ths) | Asymmetric Adjusting (y/n) | Low Density | Low Initial Adjustment Value (1/16ths) | High Density | High Initial Adjustment Value (1/16ths) |
|---|---|---|---|---|---|
| 21 | 0 | 0 | 0 | 0 | 0 |
| 22 | 0 | 0 | 0 | 0 | 0 |
| 23 | 0 | 0 | 0 | 0 | 0 |
| 24 | 0 | 0 | 0 | 0 | 0 |
| 25 | 0 | 0 | 0 | 0 | 0 |
| 26 | 1 | 0 | 0 | 12 | 2 |
| 27 | 1 | 0 | 0 | 12 | 2 |
| 28 | 1 | 0 | 2 | 12 | 2 |
| 29 | 1 | 0 | 2 | 56 | 0 |
| 30 | 1 | 0 | 0 | 56 | 0 |
| 31 | 1 | 8 | 0 | 56 | 2 |
| 32 | 1 | 8 | 0 | 56 | 2 |
| 33 | 1 | 16 | 0 | 56 | 2 |
| 34 | 0 | 0 | 0 | 0 | 0 |
| 35 | 0 | 0 | 0 | 0 | 0 |
| 36 | 0 | 0 | 0 | 0 | 0 |
| 37 | 0 | 0 | 0 | 0 | 0 |

FIG. 8B-2

Font Type: Type 1 Sub Pixel Rendering

| Scaled Stem Width (1/6ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/6ths) |
|---|---|---|---|---|---|---|---|---|---|---|---|
| 0 | 6 | 6 | 6 | 1 | 6 | 0 | 0 | 1 | 0 | Black Edge | 3 |
| 1 | 6 | 6 | 6 | 1 | 6 | 0 | 0 | 1 | 0 | Black Edge | 3 |
| 2 | 6 | 6 | 6 | 1 | 6 | 0 | 0 | 1 | 0 | Black Edge | 3 |
| 3 | 6 | 6 | 6 | 1 | 6 | 0 | 0 | 1 | 0 | Black Edge | 3 |
| 4 | 6 | 6 | 6 | 1 | 6 | 0 | 0 | 1 | 0 | Black Edge | 3 |
| 5 | 6 | 6 | 6 | 1 | 6 | 0 | 0 | 1 | 0 | Black Edge | 2 |
| 6 | 6 | 6 | 6 | 1 | 6 | 0 | 0 | 1 | 0 | Black Edge | 2 |
| 7 | 6 | 6 | 6 | 1 | 6 | 0 | 0 | 1 | 0 | Black Edge | 2 |
| 8 | 6 | 6 | 6 | 1 | 6 | 0 | 0 | 1 | 0 | Black Edge | 2 |
| 9 | 6 | 6 | 6 | 1 | 6 | 0 | 0 | 1 | 0 | Black Edge | 2 |
| 10 | 6 | 6 | 6 | 1 | 6 | 0 | 0 | 1 | 0 | Black Edge | 1 |
| 11 | 6 | 6 | 6 | 1 | 6 | 0 | 0 | 1 | 0 | Black Edge | 1 |
| 12 | 6 | 6 | 6 | 1 | 6 | 0 | 0 | 1 | 0 | Black Edge | 1 |
| 13 | 6 | 6 | 6 | 1 | 6 | 0 | 0 | 1 | 0 | Black Edge | 0 |

Font Type: True Type Gray Scale

| Scaled Stem Width (1/4ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/4ths) |
|---|---|---|---|---|---|---|---|---|---|---|---|
| 0 | 4 | 4 | 4 | 0 | 0 | 0 | 0 | 1 | 1 | No Smoothing | 4 |
| 1 | 4 | 4 | 4 | 0 | 0 | 0 | 0 | 1 | 1 | No Smoothing | 4 |
| 2 | 4 | 4 | 4 | 0 | 0 | 0 | 0 | 1 | 1 | No Smoothing | 4 |
| 3 | 4 | 4 | 4 | 0 | 0 | 0 | 0 | 1 | 1 | No Smoothing | 3 |
| 4 | 4 | 4 | 4 | 0 | 0 | 0 | 0 | 1 | 1 | No Smoothing | 2 |
| 5 | 4 | 4 | 4 | 0 | 0 | 0 | 0 | 1 | 1 | No Smoothing | 2 |
| 6 | 4 | 4 | 4 | 0 | 0 | 0 | 0 | 1 | 1 | No Smoothing | 1 |
| 7 | 4 | 4 | 4 | 0 | 0 | 0 | 0 | 1 | 1 | No Smoothing | 1 |
| 8 | 4 | 4 | 4 | 0 | 0 | 0 | 0 | 1 | 1 | No Smoothing | 1 |
| 9 | 4 | 4 | 4 | 0 | 0 | 0 | 0 | 1 | 1 | No Smoothing | 0 |

FIG. 8D

Font Type: True Type Sub Pixel Rendering

| Scaled Stem Width (1/6ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/6ths) |
|---|---|---|---|---|---|---|---|---|---|---|---|
| 0 | 6 | 6 | 6 | 0 | 0 | 0 | 0 | 1 | 1 | No Smoothing | 3 |
| 1 | 6 | 6 | 6 | 0 | 0 | 0 | 0 | 1 | 1 | No Smoothing | 3 |
| 2 | 6 | 6 | 6 | 0 | 0 | 0 | 0 | 1 | 1 | No Smoothing | 3 |
| 3 | 6 | 6 | 6 | 0 | 0 | 0 | 0 | 1 | 1 | No Smoothing | 3 |
| 4 | 6 | 6 | 6 | 0 | 0 | 0 | 0 | 1 | 1 | No Smoothing | 3 |
| 5 | 6 | 6 | 6 | 0 | 0 | 0 | 0 | 1 | 1 | No Smoothing | 2 |
| 6 | 6 | 6 | 6 | 0 | 0 | 0 | 0 | 1 | 1 | No Smoothing | 2 |
| 7 | 6 | 6 | 6 | 0 | 0 | 0 | 0 | 1 | 1 | No Smoothing | 2 |
| 8 | 6 | 6 | 6 | 0 | 0 | 0 | 0 | 1 | 1 | No Smoothing | 2 |
| 9 | 6 | 6 | 6 | 0 | 0 | 0 | 0 | 1 | 1 | No Smoothing | 2 |
| 10 | 6 | 6 | 6 | 0 | 0 | 0 | 0 | 1 | 1 | No Smoothing | 2 |
| 11 | 6 | 6 | 6 | 0 | 0 | 0 | 0 | 1 | 1 | No Smoothing | 1 |
| 12 | 6 | 6 | 6 | 0 | 0 | 0 | 0 | 1 | 1 | No Smoothing | 1 |
| 13 | 6 | 6 | 6 | 0 | 0 | 0 | 0 | 1 | 1 | No Smoothing | 0 |

FIG. 8E 830 832 Font Type: True Type Gray Scale

| Scaled Stem Width (1/8ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/8ths) |
|---|---|---|---|---|---|---|---|---|---|---|---|
| 0 | 8 | 2 | 8 | 1 | 4 | 0 | 0 | 1 | 0 | Anisotropic | 3 |
| 1 | 8 | 2 | 8 | 1 | 4 | 0 | 0 | 1 | 0 | Anisotropic | 3 |
| 2 | 8 | 2 | 8 | 1 | 4 | 0 | 0 | 1 | 0 | Anisotropic | 3 |
| 3 | 8 | 2 | 8 | 1 | 4 | 0 | 0 | 1 | 0 | Anisotropic | 3 |
| 4 | 8 | 2 | 8 | 1 | 4 | 0 | 0 | 1 | 0 | Anisotropic | 3 |
| 5 | 8 | 2 | 8 | 1 | 4 | 0 | 0 | 1 | 0 | Anisotropic | 2 |
| 6 | 8 | 2 | 8 | 1 | 4 | 0 | 0 | 1 | 0 | Anisotropic | 2 |
| 7 | 8 | 2 | 8 | 1 | 4 | 0 | 0 | 1 | 0 | Anisotropic | 2 |
| 8 | 8 | 2 | 8 | 1 | 4 | 0 | 0 | 1 | 0 | Anisotropic | 2 |
| 9 | 8 | 2 | 8 | 1 | 4 | 0 | 0 | 1 | 0 | Anisotropic | 2 |
| 10 | 8 | 2 | 8 | 1 | 4 | 0 | 0 | 1 | 0 | Anisotropic | 1 |
| 11 | 8 | 2 | 8 | 1 | 4 | 0 | 0 | 1 | 0 | Anisotropic | 1 |
| 12 | 8 | 2 | 8 | 1 | 4 | 0 | 0 | 1 | 0 | Anisotropic | 1 |
| 13 | 8 | 2 | 8 | 1 | 4 | 0 | 0 | 1 | 0 | Anisotropic | 1 |
| 14 | 8 | 2 | 8 | 1 | 4 | 0 | 0 | 1 | 0 | Anisotropic | 1 |
| 15 | 8 | 2 | 8 | 1 | 4 | 0 | 0 | 1 | 0 | Anisotropic | 1 |
| 16 | 8 | 2 | 8 | 1 | 4 | 0 | 0 | 1 | 0 | Anisotropic | 1 |
| 17 | 8 | 2 | 8 | 1 | 4 | 0 | 0 | 1 | 0 | Anisotropic | 1 |
| 18 | 8 | 2 | 8 | 1 | 4 | 0 | 0 | 1 | 0 | Anisotropic | 0 |

FIG. 8F

Font Type: True Type Sub Pixel Rendering

| Scaled Stem Width (1/6ths) | X Grid Ratio | Y Grid Ratio | Hint Grid Ratio | X Align. | Y Align. | X Offset Amt. | Y Offset Amt. | X Carry (y/n) | Y Carry (y/n) | Hinting Policy | Initial Adjustment Value (1/6ths) |
|---|---|---|---|---|---|---|---|---|---|---|---|
| 0 | 6 | 6 | 6 | 1 | 6 | 0 | 0 | 1 | 0 | Anisotropic | 3 |
| 1 | 6 | 6 | 6 | 1 | 6 | 0 | 0 | 1 | 0 | Anisotropic | 3 |
| 2 | 6 | 6 | 6 | 1 | 6 | 0 | 0 | 1 | 0 | Anisotropic | 3 |
| 3 | 6 | 6 | 6 | 1 | 6 | 0 | 0 | 1 | 0 | Anisotropic | 3 |
| 4 | 6 | 6 | 6 | 1 | 6 | 0 | 0 | 1 | 0 | Anisotropic | 3 |
| 5 | 6 | 6 | 6 | 1 | 6 | 0 | 0 | 1 | 0 | Anisotropic | 2 |
| 6 | 6 | 6 | 6 | 1 | 6 | 0 | 0 | 1 | 0 | Anisotropic | 2 |
| 7 | 6 | 6 | 6 | 1 | 6 | 0 | 0 | 1 | 0 | Anisotropic | 2 |
| 8 | 6 | 6 | 6 | 1 | 6 | 0 | 0 | 1 | 0 | Anisotropic | 2 |
| 9 | 6 | 6 | 6 | 1 | 6 | 0 | 0 | 1 | 0 | Anisotropic | 2 |
| 10 | 6 | 6 | 6 | 1 | 6 | 0 | 0 | 1 | 0 | Anisotropic | 2 |
| 11 | 6 | 6 | 6 | 1 | 6 | 0 | 0 | 1 | 0 | Anisotropic | 1 |
| 12 | 6 | 6 | 6 | 1 | 6 | 0 | 0 | 1 | 0 | Anisotropic | 1 |
| 13 | 6 | 6 | 6 | 1 | 6 | 0 | 0 | 1 | 0 | Anisotropic | 0 |

FIG. 8G

| Scaled Stem Width (16ths) | Grid Ratio | Alignment Offset | Darkening Amount (16ths Per Side) | Asymmetric Darkening | | | | Phase Difference | Rasterized Stem Width (Bold Lines) and Darkening Amount (Light Lines), Showing Both Phases |
|---|---|---|---|---|---|---|---|---|---|
| | | | | Low Density | Low Density Darkening Amount (16ths) | High Density | High Density Darkening Amount (16ths) | | |
| 1-4 | 4 | 0 | 4 | | | | | 1/4 | |
| 5,6 | 8 | 0 | 4 | 0 | 2 | 24 | 6 | 3/8 | |
| 7,8 | 8 | 0 | 4 | 0 | 2 | 32 | 6 | 1/4 | |
| 9,10 | 8 | 0 | 4 | 0 | 2 | 40 | 6 | 1/8 | |
| 11,12 | 4 | 1 | 4 | | | | | 1/4 | |
| 13,14 | 8 | 1 | 3 | 0 | 4 | 56 | 2 | 1/4 | |
| 15,16 | 8 | 1 | 3 | 8 | 4 | 56 | 2 | 3/8 | |
| 17,18 | 8 | 1 | 2 | | | | | 3/8 | |
| 19,20 | 8 | 1 | 2 | | | | | 1/2 | |
| 21,22 | 8 | 1 | 2 | 0 | 0 | 12 | 2 | 3/8 | |
| 23,24 | 8 | 1 | 2 | 0 | 2 | 56 | 0 | 1/4 | |
| 25 | 8 | 1 | 2 | 8 | 0 | 56 | 2 | 1/8 | |
| 26-28 | 4 | 0 | 1 | | | | | 1/8 | |
| 29,30 | 8 | 1 | 1 | 16 | 0 | 56 | 2 | 1/8 | |
| 31,32 | 8 | 1 | 1 | | | | | 1/4 | |
| 33 | 8 | 1 | 1 | | | | | 1/4 | |
| 34-37 | 4 | 0 | 0 | | | | | | |

FIG. 12

GLYPH ADJUSTMENT IN HIGH RESOLUTION RASTER WHILE RENDERING

CROSS-REFERENCE TO RELATED APPLICATIONS

This application is a continuation-in-part application of, and claims priority to, U.S. patent application Ser. No. 10/816,582, entitled "Edge Detection Based Stroke Adjustment", to R. David Arnold and Terence S. Dowling, filed Mar. 31, 2004. This application also claims priority to U.S. Provisional Application Ser. No. 60/714,549, entitled "Glyph Adjustment in High Resolution Raster While Rendering", filed on Sep. 13, 2005. The disclosures of the above applications are incorporated herein by reference in their entirety.

BACKGROUND

The present invention relates to rendering strokes, including glyphs formed from one or more strokes.

A character is an abstract construct that often represents an atomic unit in some system of expression, such as a language. Each character can be represented by a set of character attributes that define the semantic information of the character. A character encoding associates the set of character attributes for a character with a particular encoding value—for example, a scalar value included in a character set standard, such as ASCII (American Standard Code for Information Interchanges) or Unicode.

A glyph is a visual representation of a character, such as a graphical token or symbol, and includes one or more strokes, which may be vertical or horizontal (sometimes referred to as vertical and horizontal stems), curved or angled. A glyph image is a particular image of a glyph that has been rasterized or otherwise imaged onto some display surface. A font is a collection of glyphs, and can include a mapping of the collection of glyphs to corresponding characters (i.e., to encoding values). A font is typically constructed to support a character set standard. That is, fonts include glyphs representing characters included in the character set standard. A glyph can be associated with a set of glyph attributes defining appearance information for a representation of the corresponding character, and the glyph provides the information necessary to render a corresponding glyph image. A glyph can include, or can be associated with, a set of instructions for rendering the glyph. For example, TrueType™ fonts, available from Microsoft Corporation of Redmond, Wash., include glyphs that are associated with a set of instructions for use when rendering the glyph.

Hinting is a method of defining which pixels are turned on in order to create the best possible glyph bitmap shape, particularly at small sizes and low resolutions. A glyph's outline determines which pixels will constitute the bitmap. It is often necessary to modify the outline to create the bitmap, i.e., modify the outline until the desired combination of pixels is turned on. The modified outline can be referred to as a hinted outline. In certain fonts, such as TrueType fonts, a hint is a mathematical instruction that is included in the font program that defines a distortion of a glyph's outline at particular sizes. In other fonts, such as Type 1 fonts available from Adobe Systems Incorporated ("Adobe") of San Jose, Calif., a glyph outline may be hinted according to various hinting policies. Hinting of Type 1 fonts is described in Section 5 of a manual entitled "Adobe Type 1 Format", Version 1.1 available from Adobe. The term "Type 1" as used herein includes font/glyph definitions that are derived from or an enhancement of the Adobe Type 1 font format.

Certain types of visual output devices for computer systems are capable of outputting in "gray scale". That is, each of the pixels in the raster matrix of the output device is capable of displaying a number of tones, typically from pure light to pure dark (which may or may not be shades of gray, per se). Anti-aliasing is a technique of varying the gray scale or color values of the pixels representing a glyph image to provide the illusion of smoother curves and less jagged diagonal lines.

As illustrated in FIGS. 1 and 2, an anti-aliasing technique can downsample a high resolution bitmap 105 to generate a gray scale representation 205 of a glyph image, the gray scale representation having varying tones of gray. For example, the ratio of the high resolution of the bitmap to the device resolution can be 4 to 1 in both x and y directions, illustrated by the grid 110 shown in FIG. 1, which grid corresponds to the device resolution. The device resolution is the maximum number of individual pixels that can be displayed on the device used to display the corresponding glyph image, and may be expressed as "dots per inch", e.g., 96 dpi.

Before digital typography and scalable type, a font typically had a unique design for each glyph at each size. While the designs at different sizes were similar, important differences existed. As the size of a glyph became smaller, the relative size of the stems increased and the relative spacing between glyphs increased. These differences can be collectively referred to as optical compensation. However, with the advent of digital typography and the implications of "what you see is what you get" (WYSIWYG) and linear scaling, the optical size refinement in type design was largely lost. There are exceptions. For example, MultipleMaster fonts available from Adobe may have an optical size axis, or an individual type design can be implemented for different design sizes. However, even these techniques do not work well for final form documents that may be displayed at different zoom levels.

FIG. 3 shows this effect by comparing two variants of the letter "R" from the Type 1 SanvitoMM font. The SanvitoMM font contains four designs: a light 6 point design, a bold 6 point design, a light 72 point design and a bold 72 point design. The dotted outline 300 represents a glyph outline using the SanvitoMM light 6 point design, and the solid outline 305 represents a glyph outline using the SanvitoMM light 72 point design. For illustrative purposes, the outlines 300, 305 have been scaled to a common size so that the relative differences are more easily compared and have a common origin 310. The glyph outline 305 rendered at the 72 point size is positioned to the left (relative to the outline 300) and has a relatively smaller advance width 315 than the advance width 320 of the glyph outline 300 rendered at the 6 point size. The glyph outline 300 intended for the smaller point size has a relatively larger overall width and wider strokes. FIG. 3B shows the same two glyph outlines 300, 305 with their origins adjusted so that just the outline design differences may more easily be compared.

If, rather than drawing the glyph outline 300 using the SanvitoMM light 6 point design, the glyph outline 305 drawn using the SanvitoMM light 72 point design is scaled down to a 6 point size, the relative overall width will not be relatively larger nor will the strokes be relatively wider than the glyph outline drawn at 72 point size (because it is the same glyph outline). That is, the strokes will be too narrow (relatively speaking) when scaled down to a 6 point size. When applying conventional anti-aliasing techniques to such narrow strokes, the strokes tend to fade, which can adversely affect readability of the resulting displayed glyph. Adjustment techniques have been used to counter fading, such as an adjustment technique described in U.S. Pat. No. 5,929,866 to R. David Arnold entitled "Adjusting Contrast in Anti-Aliasing". Arnold describes a technique for adjusting the density values of pixels representing a glyph up to the maximum density value available from the output device.

SUMMARY

The present invention provides methods and apparatus, including computer program products, for rendering strokes, including glyphs formed from one or more strokes. A glyph being rendered can be adjusted to improve readability, to produce a bold appearance, and/or to produce a synthetic light appearance. Adjustment can be effected by an edge detection based technique, an improved smear bold technique, or an outline adjustment technique. Adjustment can be for augmentation or for erosion.

In general, in one aspect, the invention features a method and computer program product that implements the method, where the method includes receiving a glyph for display at a size on a raster output device; receiving a grid ratio, the grid ratio specifying an integer number of fine pixels of a high resolution grid that correspond to a device pixel of a raster of the output device; rendering the glyph at the size on the high resolution grid, the high resolution grid including fine pixels marked to represent the glyph and fine pixels that are unmarked; determining for each line of pixels of the high resolution grid, a line-specific, per-transition adjustment number; and, in each line of pixels of the high resolution grid, marking or erasing the line-specific, per-transition adjustment number of fine pixels in the high resolution grid at each transition from a marked fine pixel to an unmarked fine pixel in a particular direction of the line of pixels.

Particular advantageous embodiments of the invention include one or more of the following features. The glyph is associated with a font, wherein determining the line-specific, per-transition adjustment number includes obtaining a standard stem width of the font; calculating a scaled stem width for the glyph by scaling the standard stem width to the size at which the glyph is to be displayed on the raster output device; calculating an adjustment number from the scaled stem width; and determining an integer line-specific, per-transition adjustment number, the determining being based at least on the adjustment number. Determining the integer line-specific, per-transition adjustment number includes defining a pattern of the adjustment number of fine pixels for distribution among lines of fine pixels of the high resolution grid; and using the pattern to select, for each line of fine pixels in the high resolution grid, the integer number of fine pixels to be marked or erased at each transition from a marked fine pixel to an unmarked fine pixel in a particular direction. The pattern is a form of dithering in which the line-specific, per-transition adjustment number does not vary by more than one fine pixel from one line of fine pixels to a next line of fine pixels. The calculating of the adjustment number is based on one of a function for providing synthetic bold, a function for providing synthetic light, or a function providing optical compensation. The function for providing synthetic bold and the function for providing synthetic light each defines a linear relationship between adjustment number and scaled stem width. The function for optical compensation defines an inversely proportional relationship between adjustment number and scaled stem width. Calculating an adjustment number includes calculating a component for producing a synthetic bold appearance or a synthetic light appearance; calculating a component for optical compensation, the calculating of the component for optical compensation accounting for the component for producing a bold appearance or the component for producing the synthetic light; and combining the components. The grid ratio specifies a number of rows of fine pixels that correspond to a height of the device pixel. The line of fine pixels is a row in the high resolution grid. The adjustment number determined based on the scaled stem width is a first adjustment number. The method further comprises calculating a second adjustment number by dividing the first adjustment number by the number of rows of fine pixels corresponding to the height of the device pixel; when the second adjustment number is not an integer, selecting two integers that delimit the second adjustment number; defining a pattern of a number of instances of the two integers, a sum of values of the instances in the pattern equaling the first adjustment number, the number of instances equaling the number of rows of fine pixels corresponding to the height of the device pixel; and selecting, based on the pattern, one of the two integers as the line-specific, per-transition adjustment number. Obtaining the integer number includes calculating an adjustment number from the size at which the glyph is to be displayed, wherein size is expressed as either points per em or pixels per em; and determining the line-specific, per-transition adjustment number, the determining being based at least on the adjustment number. The high resolution grid is stored in a digital memory as a bitmap. Rendering the glyph includes adding unmarked fine pixels to an edge of the bitmap to allow for the marking or erasing. The method further comprises adjusting a bitmap metric after the marking or erasing. The marking or erasing are performed by a rasterizer during rendering, the rasterizer being is a first component of a renderer. The method further comprises downsampling the bitmap representing the adjusted version of the glyph. The downsampling is performed by a downsampler that is a second component of the renderer.

In general, in another aspect, the invention features a method and computer program product that implements the method, where the method includes receiving a glyph to be rendered at a size; generating from the glyph an outline of line segments, each line segment having two endpoints; translating the line segments all in an outward or inward direction, each line segment being moved by a distance and then rejoining pairs of adjacent line segments by extending or trimming their endpoints until each pair of adjacent line segments join at an intersection point that is an endpoint of each the line segments of the pair; and determining an augmented scaled outline of the glyph from the translated and rejoined line segments.

Particular advantageous embodiments of the invention include one or more of the following features. The outward or inward direction in which each line segment is translated is perpendicular to the line segment. The inward or outward directions which a line segment can be translated is classified as one of a predetermined set of cardinal directions, and the distance which the line segment is moved is based on a classification of the direction in which the line segment is moved. The cardinal directions are up, down, left, right, between up and right, between up and left, between down and left, and between down and right. The distance which a line segment is moved is represented by a horizontal component and a vertical component, and the line segment is moved by moving each endpoint of the line segment by the horizontal component and by the vertical component. Generating the outline of line segments includes generating from the glyph an initial outline; scaling the initial outline in accordance with the size to generate a scaled outline; and changing any curve of the scaled outline to one or more line segments. Determining an augmented scaled outline includes changing each line segment in the translated and rejoined line segments that were previously converted from a curve back to the respective curve. The distance which a line segment is translated is based on a displacement number that is calculated as a function of scaled stem width or size. The function is for one of optical compensation, producing a bold appearance, or producing a light appearance. Calculation of the adjustment number includes calculating an initial displacement number for producing a bold appearance or for producing a light appearance; calculating an initial displacement number for optical compensation, the calculating of the initial displacement number for optical compensation accounting for the initial displacement number for producing a bold appearance or for producing a light appearance; and combining the initial displacement number for producing a bold appearance or for producing a light appearance with the initial displacement number for optical compensation to obtain the displacement number. The method further includes determining whether a rejoining of two line segments has violated one or more constraints, wherein the rejoining produces an intersection point that is the intersection of the two line segments, the intersection being an endpoint for each of the line segment; and when the rejoining is determined to have violated the one or more constraints, adjusting the position of the intersection point. The one or more constrains require that an endpoint of a translated line segment be within a predetermined distance from the endpoint's pre-translated position. The one or more constraints are based on a miter limit. The method further includes generating a bitmap from the augmented scaled outline. Determining of the augmented scaled outline of the glyph and generating the bitmap are performed by a rasterizer during rendering, the rasterizer being a component of a renderer. The method further comprises using a downsampler to downsample the bitmap, the downsampler being a component of the renderer.

In general, in another aspect, the invention features a method and computer program product that implements the method, where the method includes receiving a glyph, the glyph having an outline that has an outside path; identifying four extrema points of the outline, each extrema point being an intersection of two vectors obtained from the outline; for each of the extrema points, calculating a cross product of the two vectors intersecting at the extrema point, wherein a positive result of the cross product indicates that the outside path is wound in a first direction, and wherein a negative result of the cross product indicates that the outside path is wound in an opposite, second direction; and determining the winding order of the outside path based on the cross products calculated.

Particular advantageous embodiments of the invention include one or more of the following features. The first direction is counter clockwise and the second direction is clockwise. Determining the winding order of the outside path includes determining that the outside path is wound in the first direction when three or four of the results are positive, regardless of a default winding order for the font. Determining the winding order of the outside path includes determining that the outside path is wound in the second direction when three or four of the results are negative, regardless of a default winding order for the font. The glyph is associated with a font and a font type, and determining the winding order of the outside path includes determining that the outside path is wound in a default winding direction unless the cross products indicate otherwise, the default winding direction being obtained from the font and the font type. Determining the winding order of the outside path includes determining that the outside path is wound in a default winding direction for the font when two of the results are positive and two of the results are negative. The method includes identifying, based on the winding order of the outside path, an outward direction for a line segment tangent to the outside path. The method includes providing the outward direction to a rasterizer of a rendering engine. The method includes providing the winding order to a rasterizer of a rendering engine.

In general, in another aspect, the features a system operable to perform the foregoing method.

The invention can be implemented to realize one or more of the following advantages. At small sizes, the appearance of a glyph or a stroke (e.g., a line) can be adjusted to improve the contrast between the glyph or stroke and a background against which the glyph or stroke is displayed. With respect to glyphs, the adjustment can improve readability. A bold or light appearance of a glyph can be produced, even when there is no bold design or light design for the glyph. The bold or light glyph appearance so produced is referred to in the instant specification a synthetic bold or a synthetic light, respectively. The density value of pixels representing the glyph or stroke can be adjusted even if an original density value is a maximum or minimum density value and the adjustments will carry over into neighboring pixels. Pre-adjustment, a glyph or stroke can be rendered offset from a device resolution grid such that the adjusted representation of the glyph or stroke benefits from adjustment without losing the benefits of hinting. Improved consistency can be achieved in the behavior among all glyphs of a font and size, font family members (e.g., a regular font and a bold font), and text rendered at different sizes. Distinct phases for strokes comprising a glyph image can be preserved.

Adjustment can be effected during rendering when information such as font/glyph properties, which may be lost post rendering and which can improve readability of a glyph image, can be used. Effecting adjustment during rendering eliminates the need to retain such information post rendering.

Bitmap metrics can be changed during rendering to make allowance for any impending adjustments so that the bitmap can be generated and modified in place without the need to perform an additional allocate/copy/deallocate step. The bitmap size, for example, can be changed in place based on an amount of augmentation calculated in the rendering process.

The assumed winding order of a glyph outline can be confirmed and corrected without consuming large amounts of computing resources. Ensuring the winding order is correctly assumed can prevent incorrect rendering and/or adjustment results.

An improved smear bold technique can be provided. In a conventional smear bold technique, a copy of an original bitmap of a glyph is generated. In the copy, the glyph is usually offset, for example, in a positive x direction. The copy is combined with the original version of the bitmap to produce a bitmap in which the glyph appears to be smeared in the positive x direction. The resulting smear is thus not dithered. In contrast, the improved smear bold technique provides smears that are dithered. Moreover, the conventional smear bold techniques requires a copying of the bitmap. In contrast, the improved smear bold technique can be implemented in place, i.e., adjustment is effected without requiring a copying of a bitmap. Furthermore, with improved smear bold, the glyph can be adjusted by a sub device pixel amount, as will be described below.

The details of one or more embodiments of the invention are set forth in the accompanying drawings and the description below. Other features and advantages of the invention will be apparent from the description, the drawings, and the claims.

BRIEF DESCRIPTION OF THE DRAWINGS

FIGS. 8A-G show look-up tables for initial adjustment values.

FIG. 12 shows a table illustrating phase differences at corresponding scaled stem widths.

Like reference numbers and designations in the various drawings indicate like elements.

DETAILED DESCRIPTION

Glyph rendering at smaller sizes may be improved by adjusting the density values of device pixels used to represent the glyph on an output device (e.g., a computer monitor). The term "density value" can refer to an alpha value in the range of 0 to 1 representing the percentage of a device pixel that is a text color as compared to a background color, where 0 represents fully transparent (i.e., no text color) and 1 represents fully opaque (i.e., all text color). Typically the density value is adjusted to increase the density, and may be referred to as "darkening". For example, in the case of a gray scale representation in shades of black against a white background, an increased pixel density results in the appearance of a darker pixel. Conventional darkening techniques cannot darken a pixel that already has a maximum density value (e.g., a black pixel in a gray scale representation). For example, if a glyph is displayed in gray scale at a certain point size and includes a stem that is an integral number of maximum intensity device pixels wide (i.e., a black stem), then using conventional darkening techniques, the pixels forming the stem cannot be darkened (because they are already of maximum density). This limitation makes the character less readable.

The methods and systems described herein allow the appearance of strokes forming a glyph image to be adjusted whether or not an unadjusted stroke is formed of maximum density pixels. The appearance of a stroke is adjusted based on detection of the edges of the stroke, and an adjustment of a pixel's density value can carry over into a neighboring pixel if the pixel's unadjusted density value is at maximum.

In a hinting process, it may be important to be able to place a stroke (e.g., a vertical stem) in more than one position, the positions differing from one another by less than one device pixel, to improve interglyph spacing and reduce glyph distortion. The different positions can be referred to as "phases". The methods and systems described herein can also preserve phase differences at various sizes. Adjustment of an appearance of a stroke need be calculated only once even when there are multiple phases.

Figure 1:
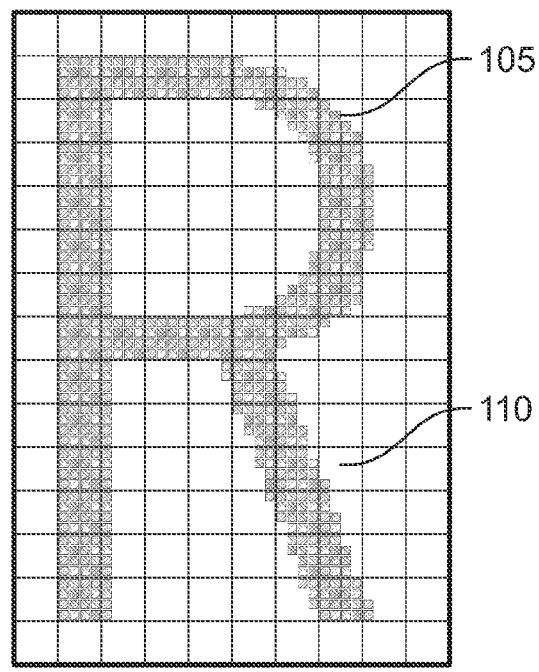
FIG. 1 shows a high resolution bitmap representation of a glyph representing the character R.
Figure 2:
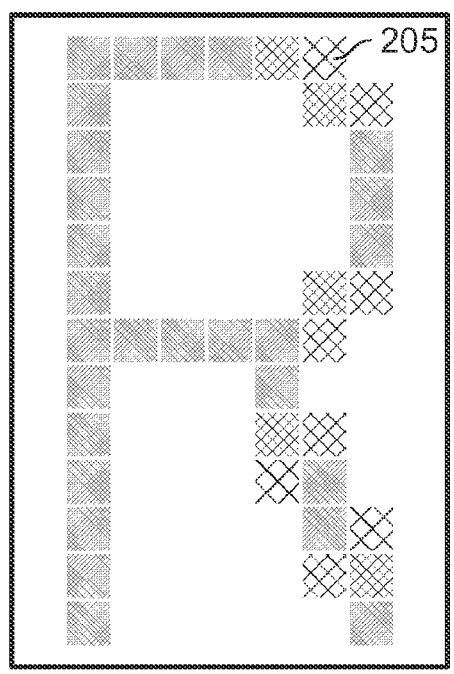
FIG. 2 shows a gray scale representation of a glyph representing the character R.
Figure 3A:
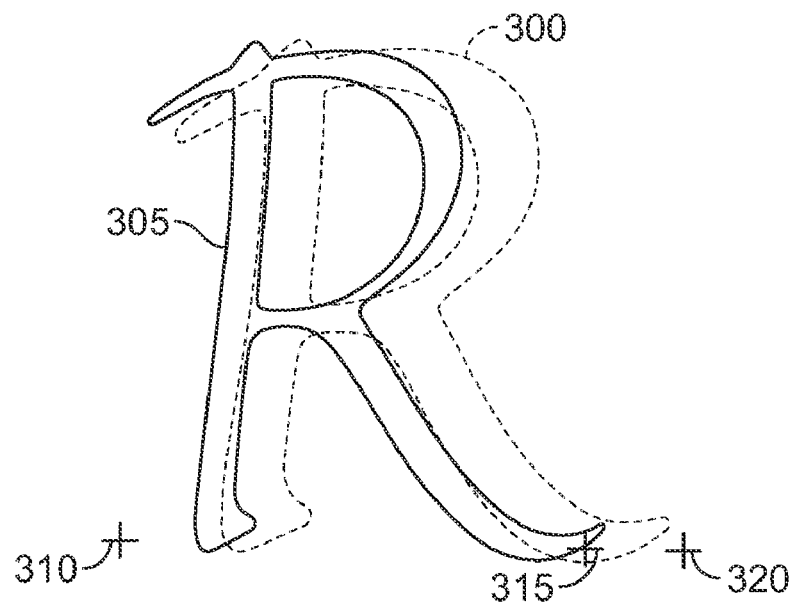
FIGS. 3A and 3B show glyph outlines representing the character R.
Figure 3B:
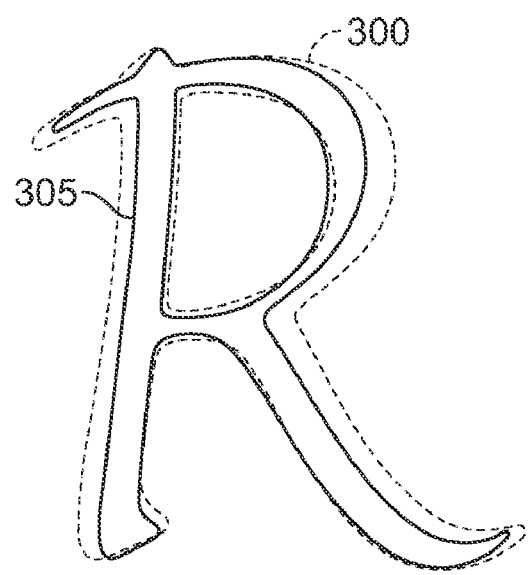
Figure 4A:
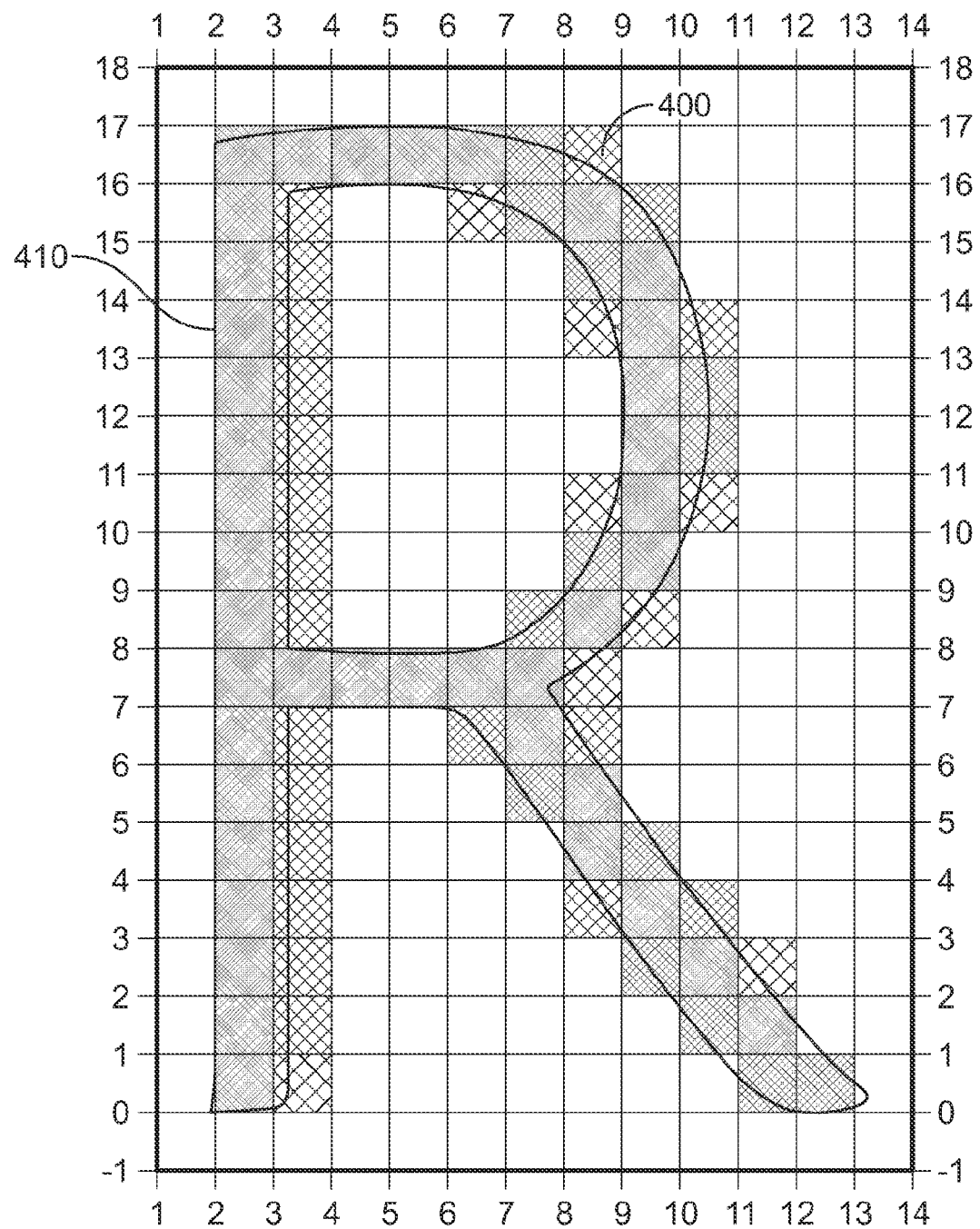
FIG. 4A shows an unadjusted gray scale representation of a glyph representing the character R.
Figure 4B:
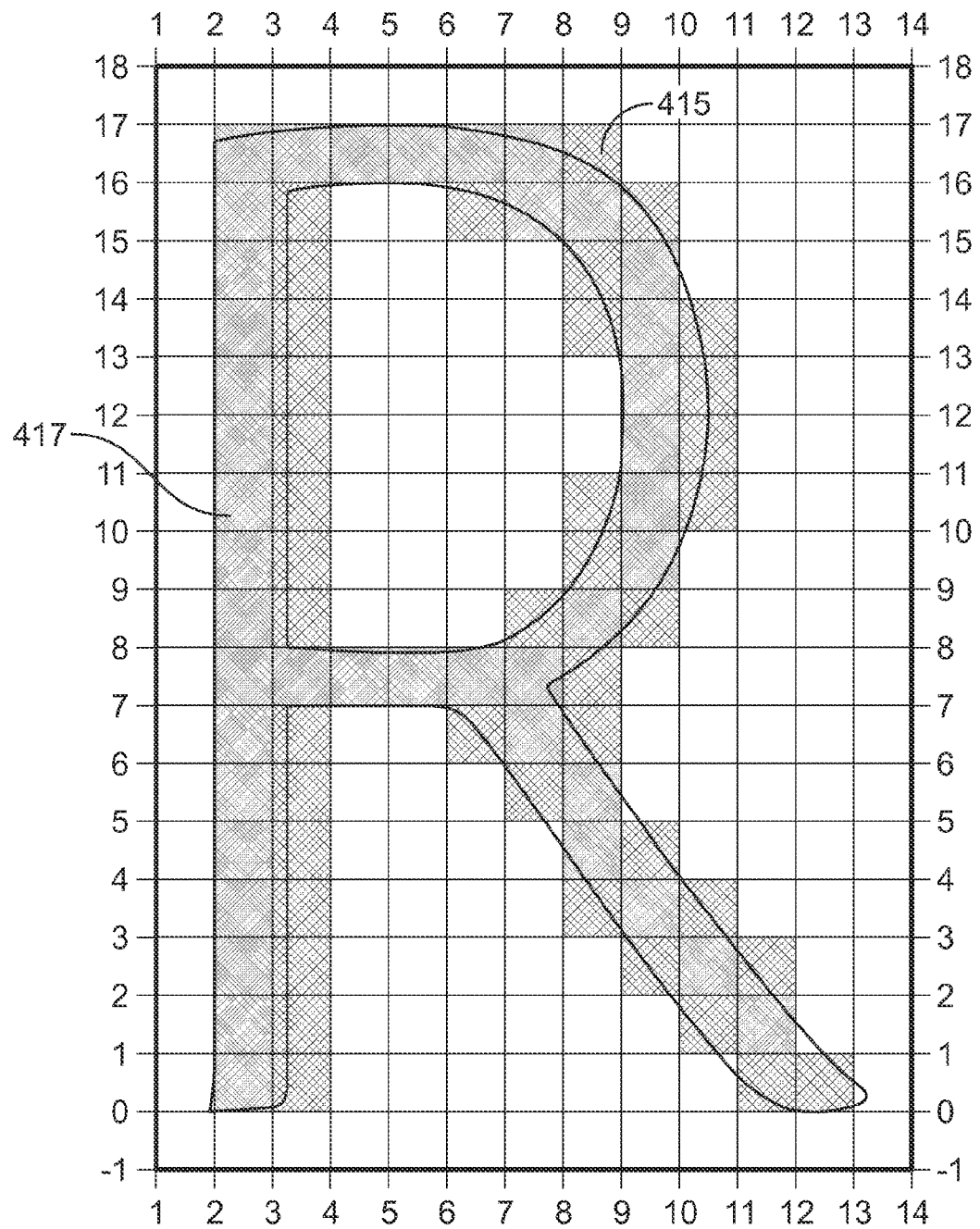
FIGS. 4B and 4C show adjusted versions of the gray scale representation of FIG. 4A.
Figure 4C:
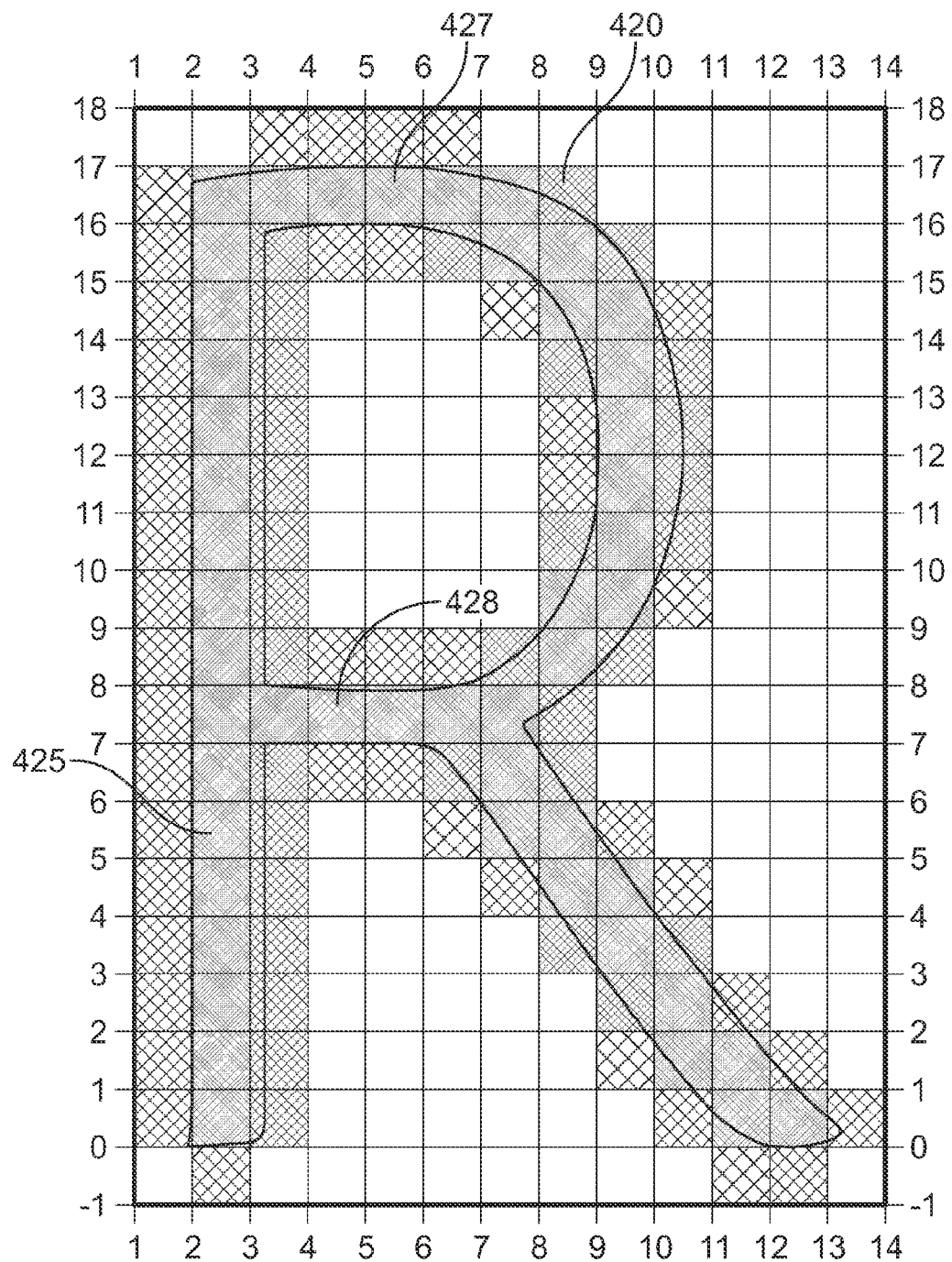

FIG. 4A shows an unadjusted gray scale representation 400 of a glyph corresponding to the character "R". The vertical stem 410 is a combination of a first column of maximum intensity (i.e., black) pixels and a second column of less than maximum intensity (i.e., gray) pixels. FIG. 4B shows the gray scale representation of FIG. 4A adjusted according to conventional techniques to darken the intensity of the gray pixels. The black pixels in the first column cannot be darkened as the density value is already the maximum permitted by the device. In FIG. 4B, the stems and strokes appear darker, but the number of device pixels marked is not increased. By contrast, an adjusted gray scale representation 420 is shown in FIG. 4C. This is the gray scale representation of FIG. 4A with the density values adjusted based on edge detection. In some instances the adjustment carries over into a neighboring pixel. For example, in FIG. 4C the vertical stem 425 is three device pixels wide as compared to the vertical stems 410 and 417 shown in FIGS. 4A and 4B, which are two device pixels wide. In FIG. 4C, the horizontal stems across the top 427 and middle 428 of the "R" increased from one pixel wide in FIGS. 4A and 4B to three pixels wide.

Figure 5:
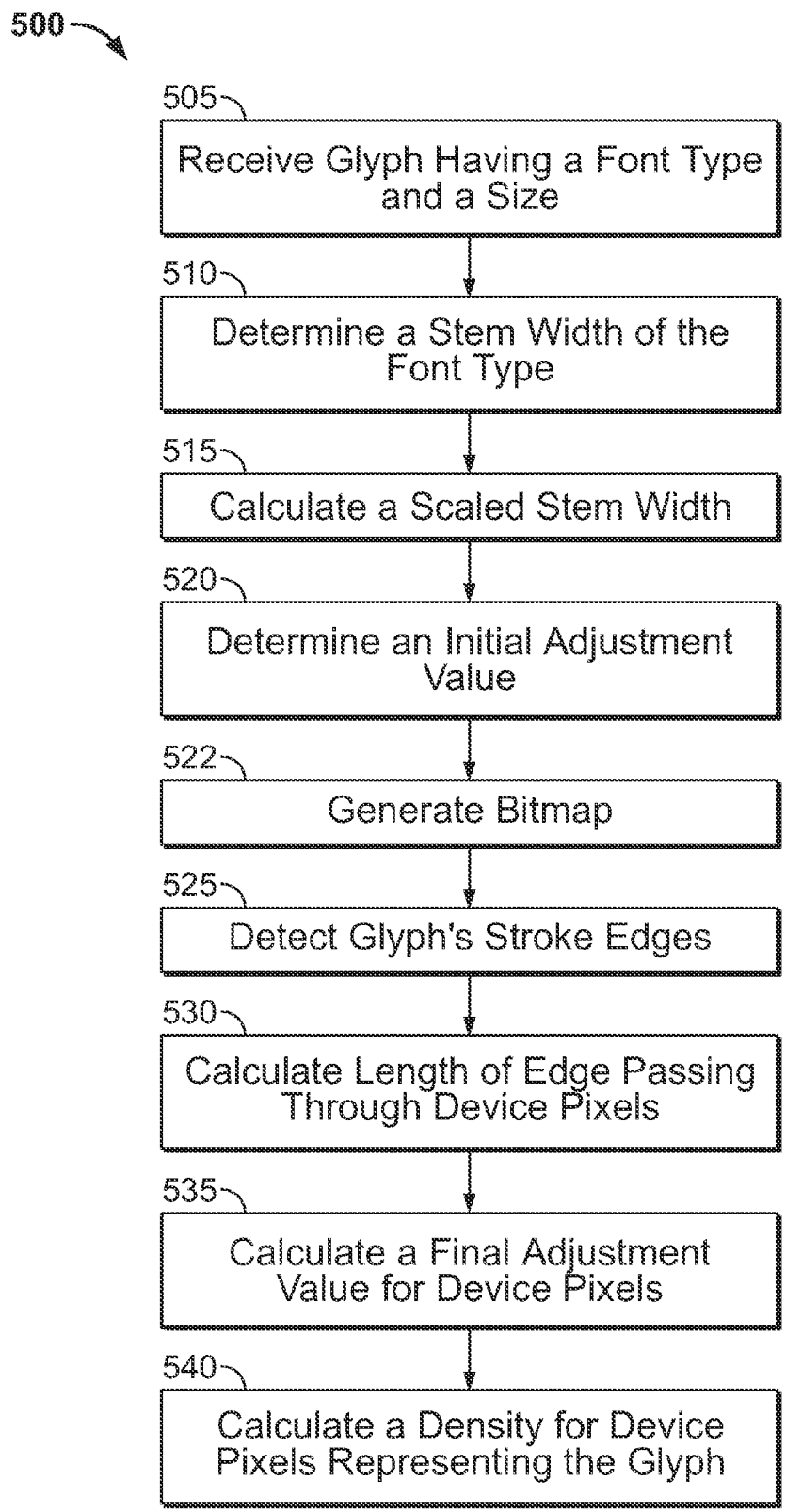
FIG. 5 is a flowchart showing a process for calculating final adjustment values for pixel densities representing a glyph.

FIG. 5 shows a process 500 for adjusting the density values of device pixels representing an image of a glyph based on edge detection, which can be used, for example, to adjust the gray scale representation 400 shown in FIG. 4A to the adjusted gray scale representation 420 shown in FIG. 4C. In a first step, a glyph to be rendered at a given size (step 505) belonging to a font is received by a renderer. For example, a glyph such as the glyph represented by the high resolution bitmap 605 shown in FIG. 6A may be received. The glyph corresponds to the character "R" in the Adobe Type 1 font CronosMM at a point size of 26 pixels per em. The bitmap 605 is shown on a fine grid having a ratio of 4×4 compared to the device resolution of an output device that will display the rendered glyph (i.e., 4 fine pixels in the x and y directions per one device pixel). The coarse grid 620 represents the device resolution.

The left edge 610 of the vertical stem 615 is aligned to the coarse grid 620, which suggests that the glyph outline used to generate the bitmap 605 was hinted to align the edge 610 to the coarse grid 620 before scan conversion. The bitmap 605 can be downsampled to render a gray scale representation 625 of the glyph, as shown in FIG. 6B.

Typically, a font defines a standard stem width that applies to all glyphs within the font. The standard stem width usually refers to a vertical standard stem width, although a horizontal stem width may also be defined by the font. A standard stem width, or an approximated standard stem width, can be determined in a number of ways, depending on the available information. In one implementation, the font dictionary can be queried for the standard stem width. Alternatively, a representative glyph, for example, a lower case "1", can be rasterized and the stem width measured. As another alternative, a default value, e.g., 75/1000, can be used as an approximate standard stem width. In some instances, a value of a standard stem width may be supplied by an electronic document to be rendered, for example, a PDF font descriptor.

In this example, the Type 1 CronosMM font (step 510) is used. A scaled stem width is calculated by scaling the font's standard stem width to the size at which the glyph is to be rendered (step 515). In this example, the font has as a standard stem width of 46/1000 and the glyph is to be rendered at a size of 26 pixels per em. The scaled stem width can be calculated by multiplying the standard stem width by the size, i.e., 46/1000*26=1.196, which may be rounded to the nearest ¼ pixel, and therefore the scaled stem width for the glyph is 1.25 device pixels.

Figure 7A:
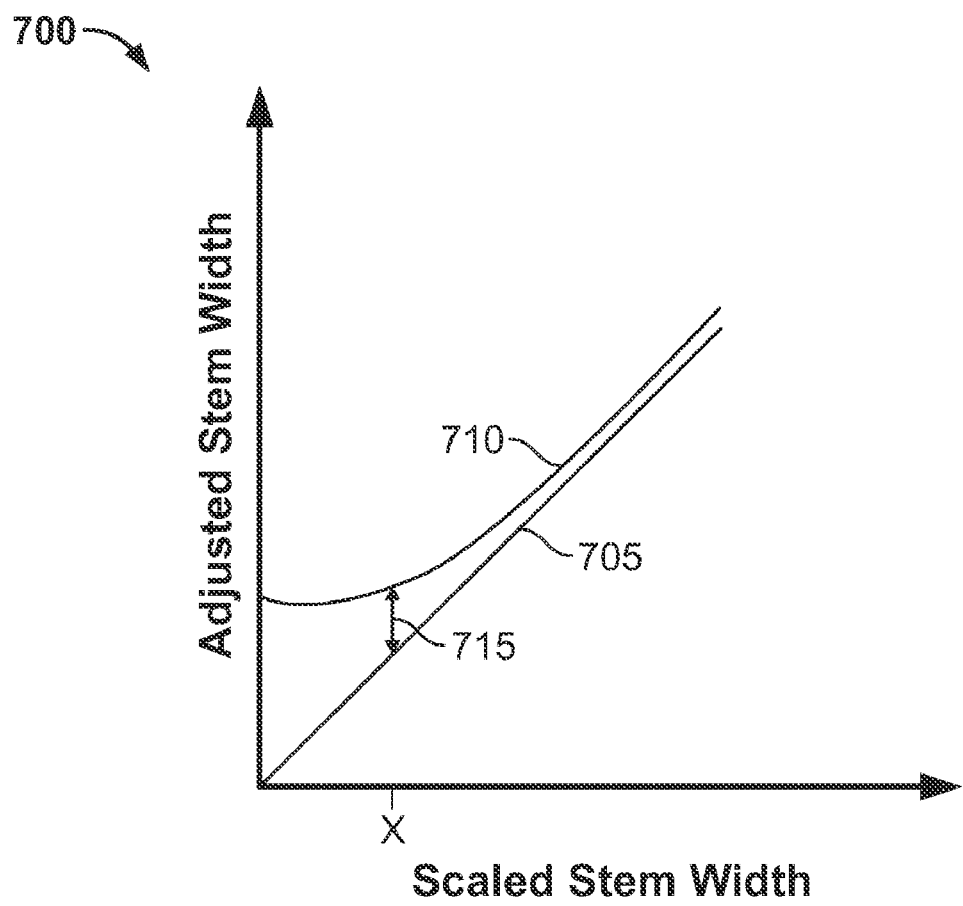
FIGS. 7A-C show graphical representations of initial adjustment values.

Based on the scaled stem width of the glyph, an initial adjustment value for the density values of the device pixels that will represent the glyph can be calculated (step 520). In one implementation, an initial adjustment value can be calculated by reference to a graph representing a function, such as the graph 700 shown in FIG. 7A depicting a relationship between a scaled stem width and an adjusted stem width. The horizontal axis of the graph represents a range of scaled stem widths, and the vertical axis represents a range of adjusted stem widths. A linear relationship depicted by a line 705 is shown between the adjusted stem widths and the scaled stem widths when the density values of pixels making up a stem have not been adjusted (i.e., scaled stem width=adjusted stem width). A non-linear relationship depicted by a curve is shown between the adjusted stem width and the scaled stem width when the density values of pixels making up a stem have been adjusted, for example, to compensate for fading that can occur at smaller sizes. At a given scaled stem width, the difference 715 between the line 705 and the curve 710 represents the initial adjustment value.

Figure 7B:
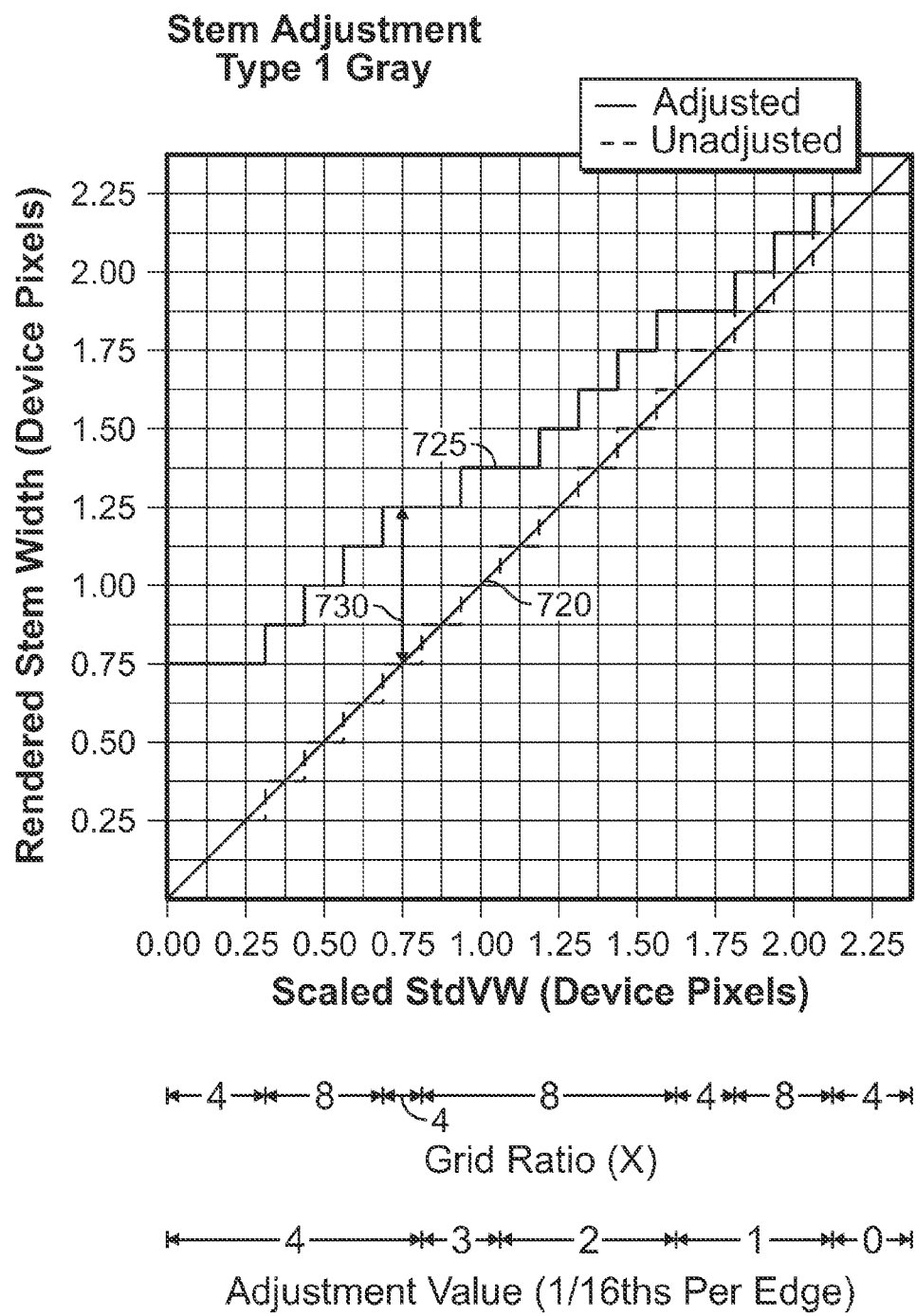
Figure 7C:
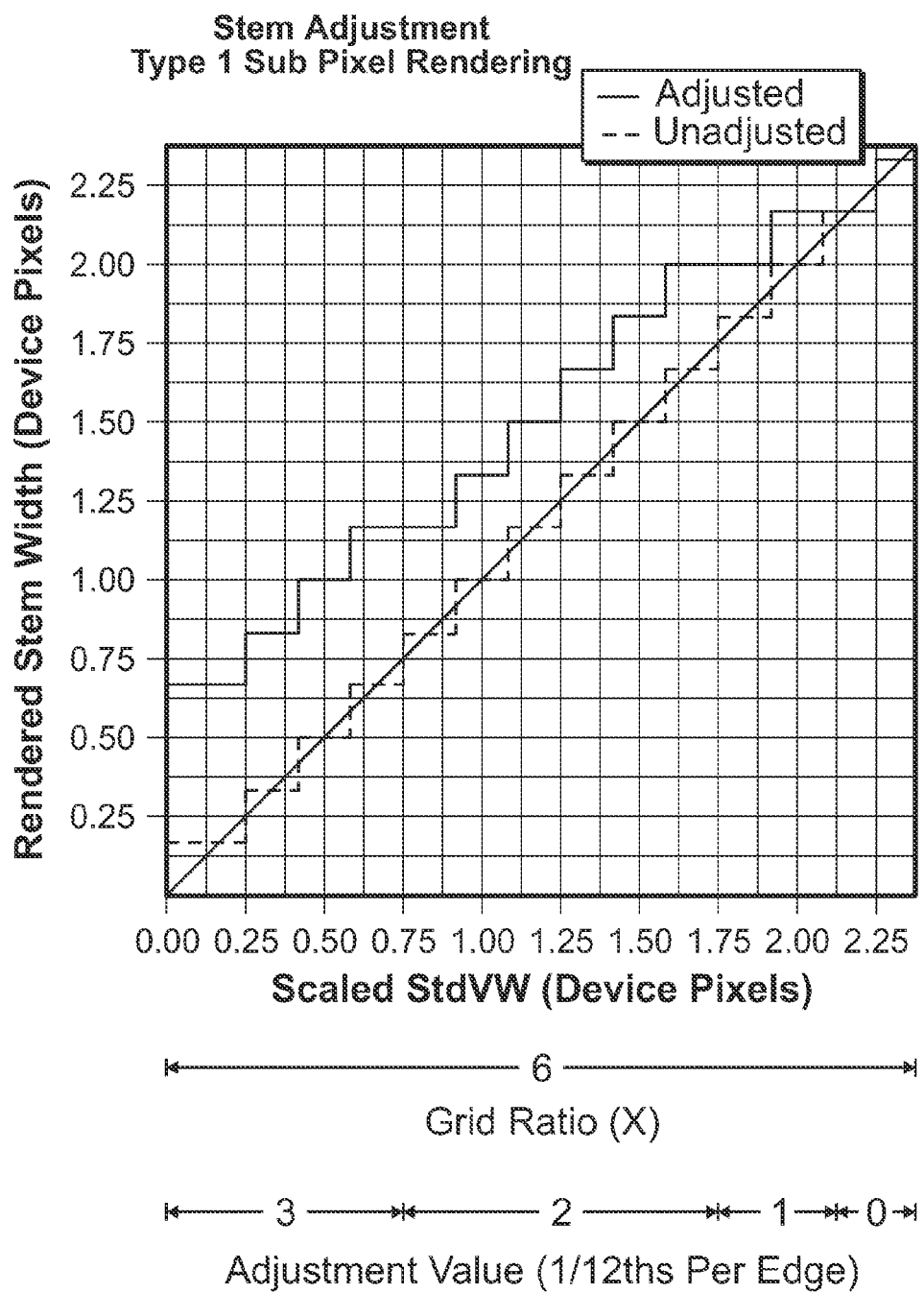

Scaled stem widths and adjusted stem widths are typically calculated in terms of device pixel amounts, for example, using ¼ device pixel increments if rendering a high resolution bitmap with a 4×4 grid ratio. FIG. 7B shows a graph that can be used to determine an initial adjustment value of a glyph in an Adobe Type 1 font to be displayed in gray scale in an Adobe Acrobat 5.0 application. The adjusted stem width is shown in increments of a ¼ pixel, and the curve 710 of FIG. 7A is therefore replaced by a stepped line 725. The graph shown in FIG. 7C can be used to determine an initial adjustment value of a glyph in an Adobe Type 1 font to be displayed using subpixel rendering. Subpixel rendering refers to a technique wherein the characteristics of a device are taken into consideration in rendering a glyph, for example, taking into consideration the red, green and blue subpixels making up a device pixel in an RGB device. Cleartype rendering available from Microsoft Corporation and Cooltype rendering available from Adobe are examples of fonts that are used for subpixel rendering.

The relationship between a scaled stem width and an adjusted stem width can be implemented as a table, such as the tables illustrated in FIGS. 8A-G. Such tables are useful when implementing the technique in a computer program. FIG. 8A shows a table that can be used to determine an initial adjustment value when a glyph to be rendered is in a Type 1 font to be displayed in gray scale. As an example, consider a glyph having a scaled stem width of $^{12}/_{16}{}^{th}$ of a device pixel. Using the table 800, in particular row 804, an initial adjustment value is $^{4}/_{16}{}^{th}$ or 0.25 of a pixel, per stroke edge. The same value can be found by reference to the graph shown in FIG. 7B; at a scaled stem width of $^{12}/_{16}{}^{th}$ or 0.75. The difference 730 between the line 720 and the stepped line 725 is 0.50 of a pixel, which represents the adjustment per stroke. The adjustment per stroke edge is therefore ½ of this amount, and is 0.25 of a pixel.

In the present example, for illustrative purposes, the scaled stem width and the initial adjustment value have been selected as 1.25 pixels and ¼ pixel per stroke edge respectively. For the purpose of illustrating the techniques for adjusting density values of device pixels described herein, these exemplary values are easy to work with and provide clear illustrations of the benefits of the techniques of the invention. The initial adjustment value has not been selected according to one of the tables shown in FIGS. 8A-G, although in practice the value preferably is chosen according to the relevant table (i.e., based on the font and scaled stem width).

Figure 6A:
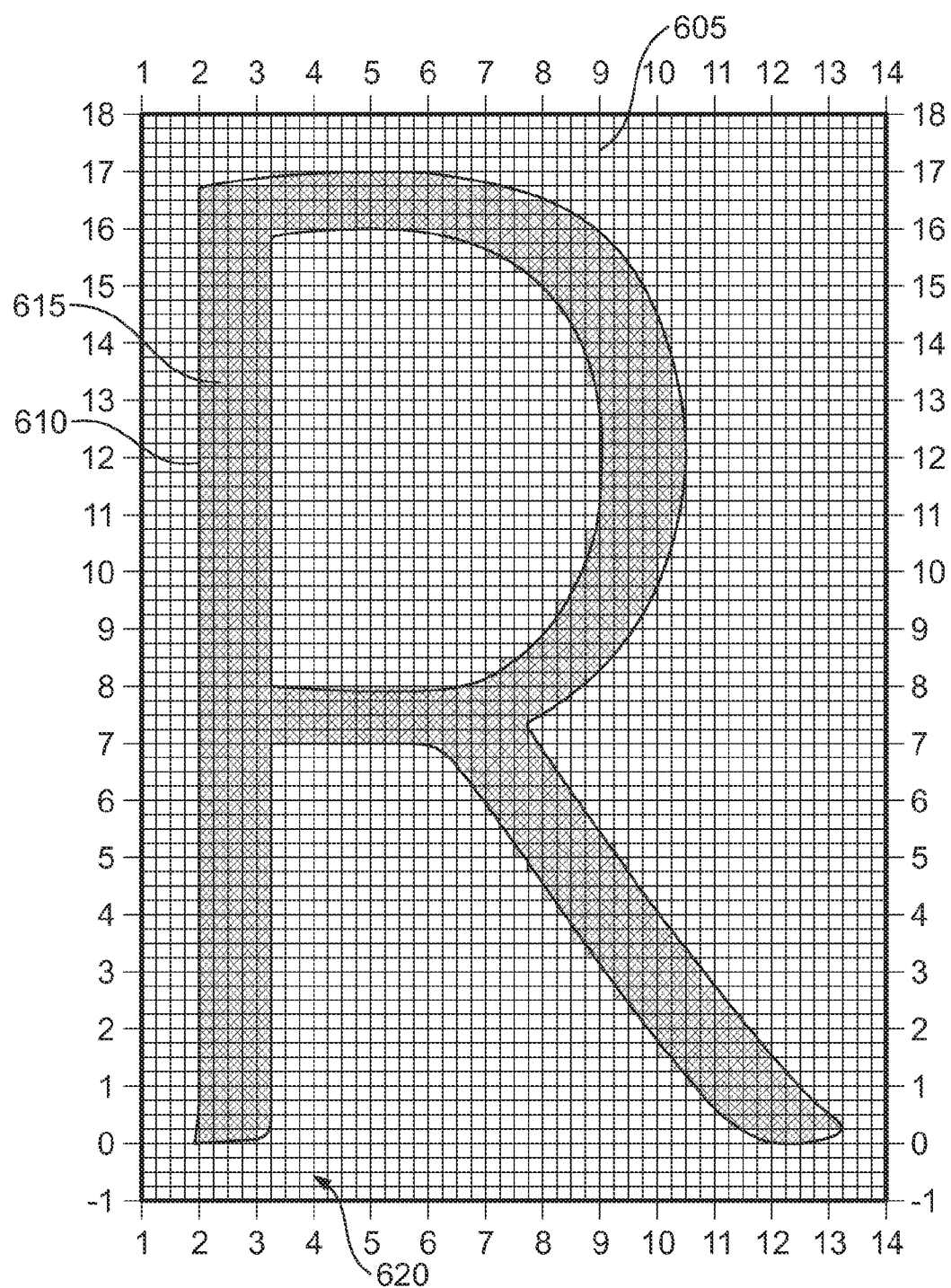
FIG. 6A shows an unadjusted high resolution bitmap representation of a glyph representing the character R.
Figure 6B:
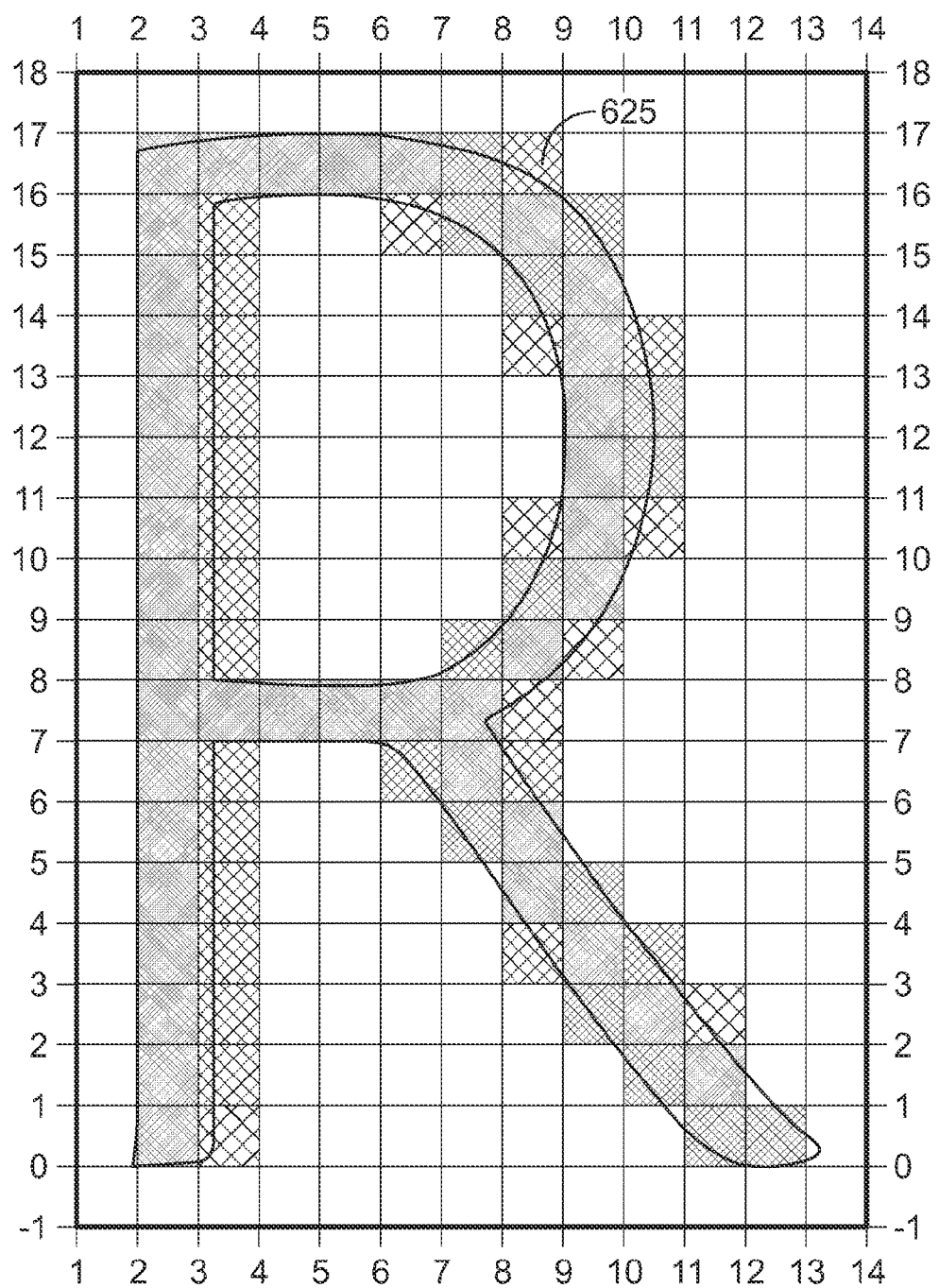
FIG. 6B shows an unadjusted gray scale representation of the bitmap shown in FIG. 6A.

A glyph outline is rasterized to generate a bitmap 605 shown in FIG. 6A (step 522). In a next step, the edges of the strokes forming the glyph are detected (step 525). In one implementation, the formula shown in Table 1 below can be used for edge detection, where the variables "a" through "e" represent bits in a high resolution rasterizer output having the geometric relationship shown in the first column. The expression is TRUE if the central pixel, "c", represents an edge.

TABLE 1

| a<br>bcd<br>e | (~c) & (a \| b \| d \| e) |
|---|---|

The calculation can be extended to parallel computation, using the formula shown in Table 2 below. The variables "a" through "e" represent a row of 8 high resolution bits (i.e., a byte), again with the same geometric relationship with the other bytes. The expression is an 8-bit byte where a particular bit in the result is TRUE if and only if the bits corresponding pixel represents an edge. With respect to both Tables 1 and 2, an edge is detected at a bit position if the bit is "off" and one or more of the four neighboring bits is "on". Other techniques for edge detection can be used.

TABLE 2

| a<br>bcd<br>e | (~c) & (a \| (b << 7) \| (c >> 1) \| (c << 1) \| (d >> 7) \| e) |
|---|---|

Figure 6C:
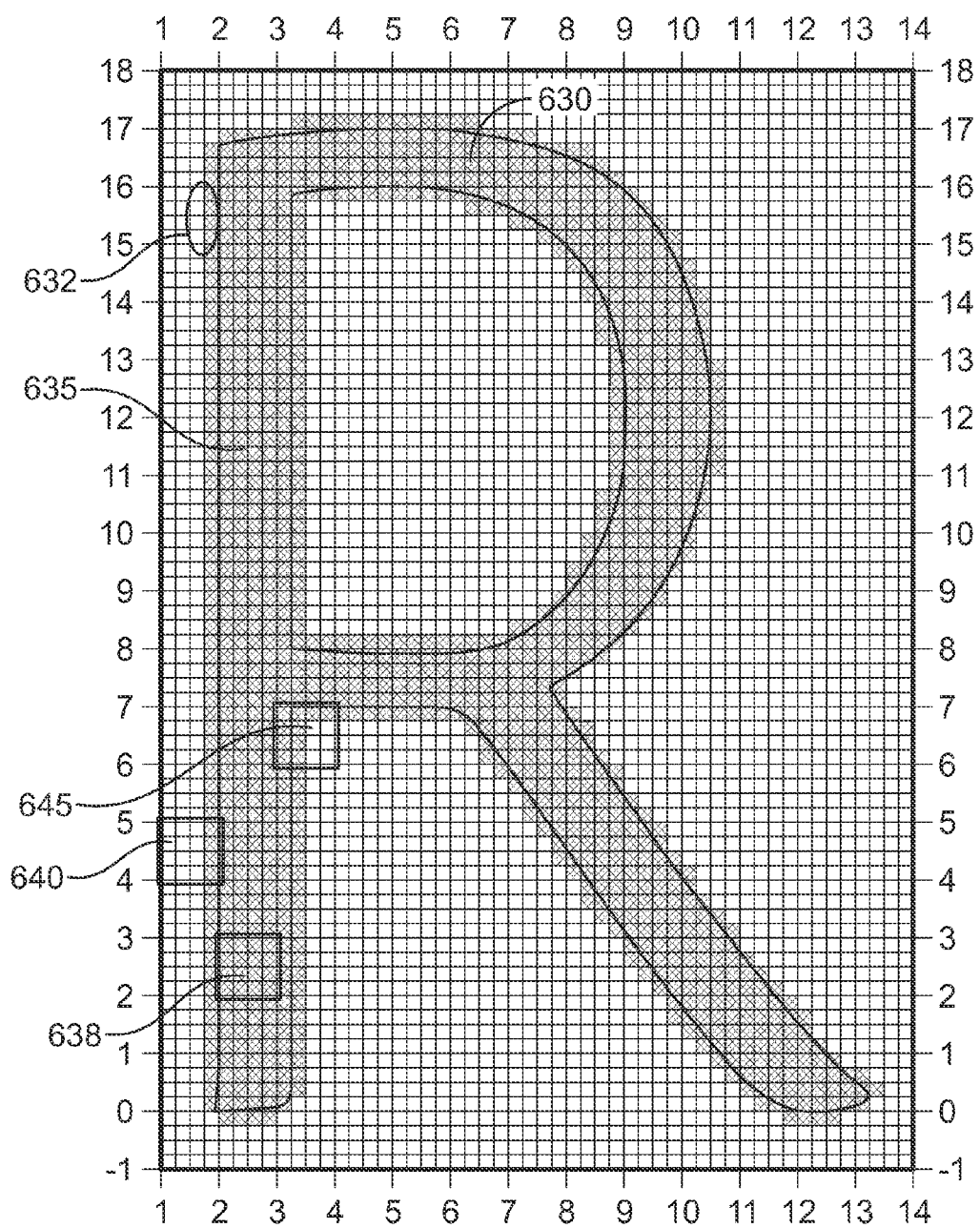
FIG. 6C shows a high resolution bitmap representation of a glyph representing the character R and showing edge detection.

Referring to FIG. 6C, the bitmap 605 of FIG. 6A is shown with the edges detected; the gray fine pixels outlining the original bitmap represent the initial adjustment value, and are referred to herein as the initial adjustment pixels 632. The initial adjustment pixels 632 are shown for illustrative purposes; the bitmap 605 has not actually been altered or re-generated to include the initial adjustment pixels 632. The initial adjustment pixels 632 are shown in FIG. 6C to assist in visualizing the adjustment technique, and are for illustrative purposes.

The density value of the device pixels that are marked by one or more initial adjustment pixels will be adjusted by a final adjustment value; the device pixels that are not marked (i.e., the "interior" or black pixels) will not have their density values adjusted. However, the interior pixels are already at maximum density. Although their density value is not adjusted, the adjustment "carries over" into neighboring pixels. That is, although the density value of an interior pixel cannot be increased, the amount by which an interior pixel would have been increased (if it were not already at maximum density), can be applied to a neighboring pixel, which may have an initial density value of zero.

Conventional darkening would not have darkened pixel 638 nor the other pixels forming the left edge of the vertical stem (because they already have maximum density value). The left edge of the vertical stem would remain unchanged after darkening the glyph. The technique illustrated in FIG. 6C allows the darkening or adjustment of the maximum density pixels forming the vertical stem to carry over into the neighboring pixels, for example pixel 640 which is marked by four initial adjustment pixels 632. Pixel 640 initially was not marked by any fine grid pixels and was not included in the gray scale representation of the glyph (see FIG. 6B). However, pixel 640 will be included in the adjusted gray scale representation downsampled from the bitmap 630.

To determine the final adjustment value for device pixels marked by the initial adjustment pixels 632, the length of the edge of a stroke passing through the device pixels is calculated (step 530). In one implementation, the length is calculated in terms of the number of initial adjustment pixels 632 included in a device pixel divided by the grid ratio. For example, the length of the edge 610 of the vertical stem passing through device pixel 640 is 4 initial adjustment pixels divided by a grid ratio of 4, and is therefore 1. The length of the edge of the vertical and horizontal strokes passing through device pixel 645 is 6 initial adjustment pixels divided by a grid ratio of 4, and is therefore 1.5.

The final adjustment value for a device pixel is calculated from the initial adjustment value and the length of the edge passing through the device pixel as follows (step 535):

Final Adjustment Value=Initial Adjustment Value× Length of Edge

The initial adjustment value is expressed in terms of the adjustment of a device pixel per stroke edge. The length of the edge of a stroke passing through a device pixel is represented as the number of initial adjustment pixels divided by the grid ratio. For example, the final adjustment value of device pixel 640 can be calculated as follows. The initial adjustment value was previously determined above for the glyph at a point size of 26 pixels per em to be ¼ of a device pixel per edge. As shown in FIG. 6C, the length of the edge of the glyph passing through device pixel 640 is 4/4=1. Applying the above formula, the final adjustment value can be calculated as follows:

(Final Adjustment Value)$_{640}$=¼×1=¼=0.25

As a second example, the final adjustment value of device pixel 645 can be calculated as follows:

(Final Adjustment Value)$_{645}$=¼×1.5=⅜=0.375

The final adjustment value for device pixel 645 is greater than the final adjustment value for device pixel 640, and accordingly the density value of device pixel 645 will undergo a relatively larger adjustment than the density value of device pixel 640. If the output is a gray scale representation in shades of gray and black against a white background, then device pixel 645 will appear to have been "darkened" more than device pixel 640.

The density value for each device resolution pixel is calculated (step 540), taking into account a final adjustment value for the device pixel if applicable (i.e., if the device pixel includes one or more initial adjustment pixels). Density values can be expressed as a value ranging between 0 and 1. The adjusted density value can be calculated according to the formula below.

Adjusted Density Value=Original Density Value+Final Adjustment Value

For example, the adjusted density value for device pixel 640 can be calculated as follows:

(Adjusted Density Value)$_{640}$=0+0.25=0.25

The level of gray applied to the device pixel 640 when rendering a gray scale representation of the pixel 640 shall correspond to a density of 0.25. The adjusted density value for device pixel 645 can be calculated as follows:

(Adjusted Density Value)$_{645}$=4/16+⅜=0.625

Figure 6D:
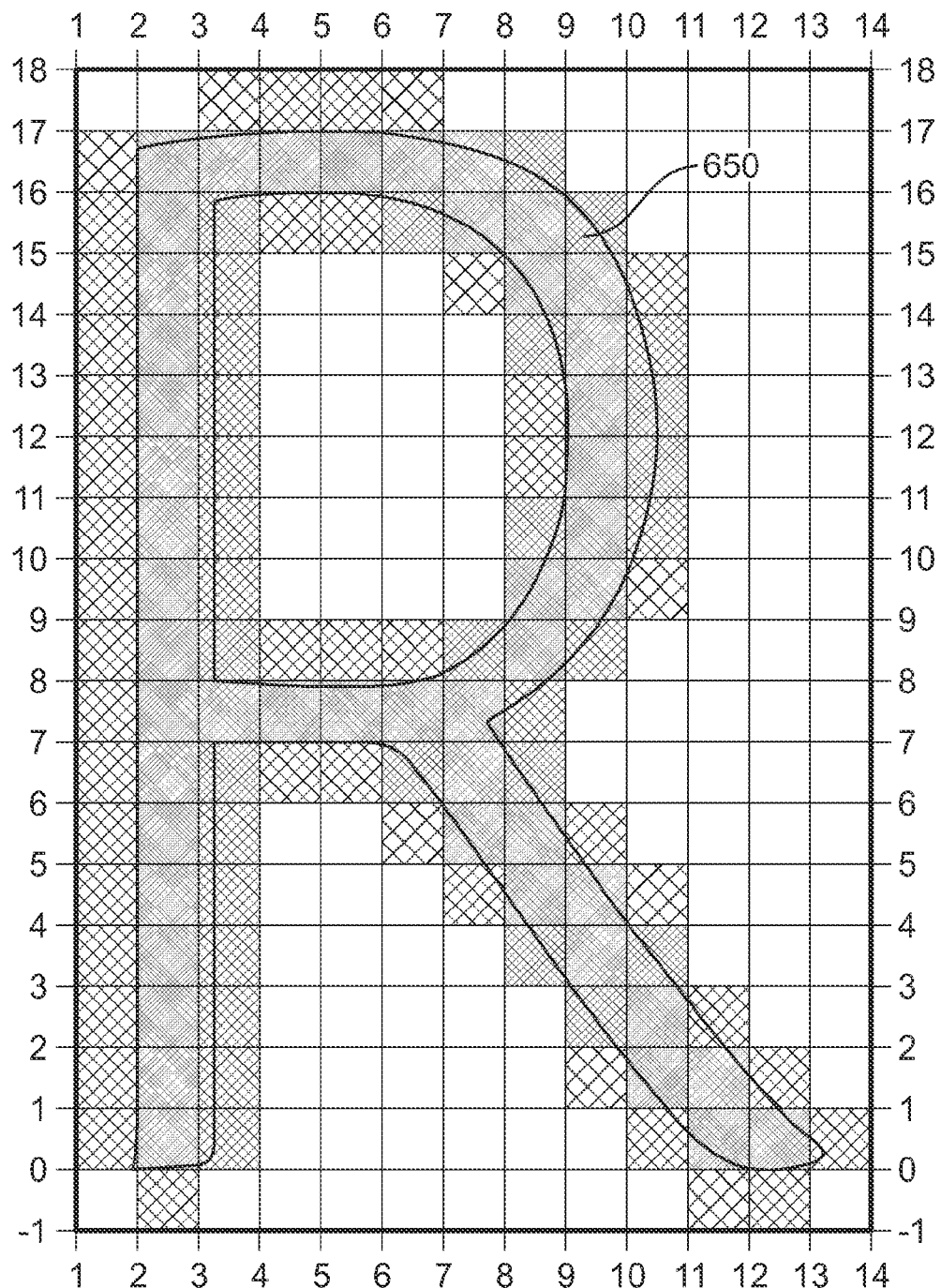
FIG. 6D shows an adjusted gray scale representation of the bitmap shown in FIG. 6C.

An adjusted gray scale representation 650 of the glyph is shown in FIG. 6D with the final adjustment values applied to adjust the density values of the edge pixels. A comparison of the adjusted gray scale representation 650 to the original gray scale representation 625 shown in FIG. 6B illustrates the effect of adjusting the pixel density values of the edge pixels. This adjustment may include a carry over adjustment into neighboring pixels, such as along the left edge 610 of the vertical stem 615. For example, in the original bitmap 600, device pixel 640 was not marked by any fine grid pixels, and therefore had a density value of 0. This is reflected in the original gray scale representation, i.e., the device pixel 640 is white. By contrast, in the bitmap shown in FIG. 6C, the device pixel 640 is marked with initial adjustment pixels, and the density value is adjusted by the final adjustment value from 0 to 0.25.

Similarly, device pixel 645 had an original density value of 4/16 or 0.25, which is represented by a gray level shown in FIG. 6B. This gray level is lighter (i.e., of a lower density level) than the gray level shown in FIG. 6D, corresponding to the adjusted density value of 0.625. The overall appearance of the adjusted gray scale representation 650 is darker than the overall appearance of the original gray scale representation 625. The number of device pixels marked by the vertical stem increased from 2 pixels to 3 pixels, thereby widening the stem, in terms of marked device pixels.

The technique for calculating final adjustment values and adjusting the density value of device pixels can be implemented in fonts such as Adobe's Type 1 font, Type 2 font, as well as TrueType fonts, and other fonts. Implementations of the technique are not limited to rendering text, i.e., glyphs, but can be implemented in any thin, filled shape. For example, in a graphics application drawing lines, such as a grid in a spreadsheet, the above technique can be implemented to adjust the density values of device pixels representing the lines forming the grid.

Minimizing the number of device pixels marked by a glyph's stroke represented by adjusted density values may be desirable in some implementations. For example, the adjusted gray scale representation of the glyph in FIG. 6D has a vertical stem that is marked by 3 device pixels. This is one pixel wider than the original, unadjusted gray scale representation 605 of the glyph in FIG. 6B, which has a vertical stem width of 2 pixels. The left edge 610 of the original gray scale representation 625 is represented by a column of maximum density (i.e., black) pixels, whereas the left edge of the adjusted gray scale representation 650 is represented by a column of low density pixels. Such a column of low density pixels may give a blurred appearance to a reader.

The blurring effect can occur when, pre-adjustment, the outline of the glyph is hinted to align one or more edges of the outline to the device resolution grid. For example, referring to FIG. 9A, a high resolution bitmap representation 900 of a glyph corresponding to the character "R" is shown. The glyph is associated with the Adobe Type 1 CronosMM font and is to be rendered at a 26 pixels per em size. The glyph outline 902 that was rendered as the bitmap representation 900 is also depicted for illustrative purposes. The glyph outline 902 was hinted such that the left edge 904 of the glyph outline 902 aligns to the device resolution grid 906. The glyph outline 902 is hinted according to, for example, the black edge hinting policy described in pending U.S. patent application Ser. No. 09/739,537, filed Dec. 15, 2000, by T. Dowling and R. D. Arnold, entitled "Hinted Stem Placement on High Resolution Pixel Grid", the entire contents of which are hereby incorporated by reference. Referring to FIG. 9B, the original (i.e., unadjusted) gray scale representation 908 of the glyph downsampled from the bitmap 900 is shown. The left edge of the vertical stem 910 is represented by maximum density (i.e., black) pixels.

Figure 9A:
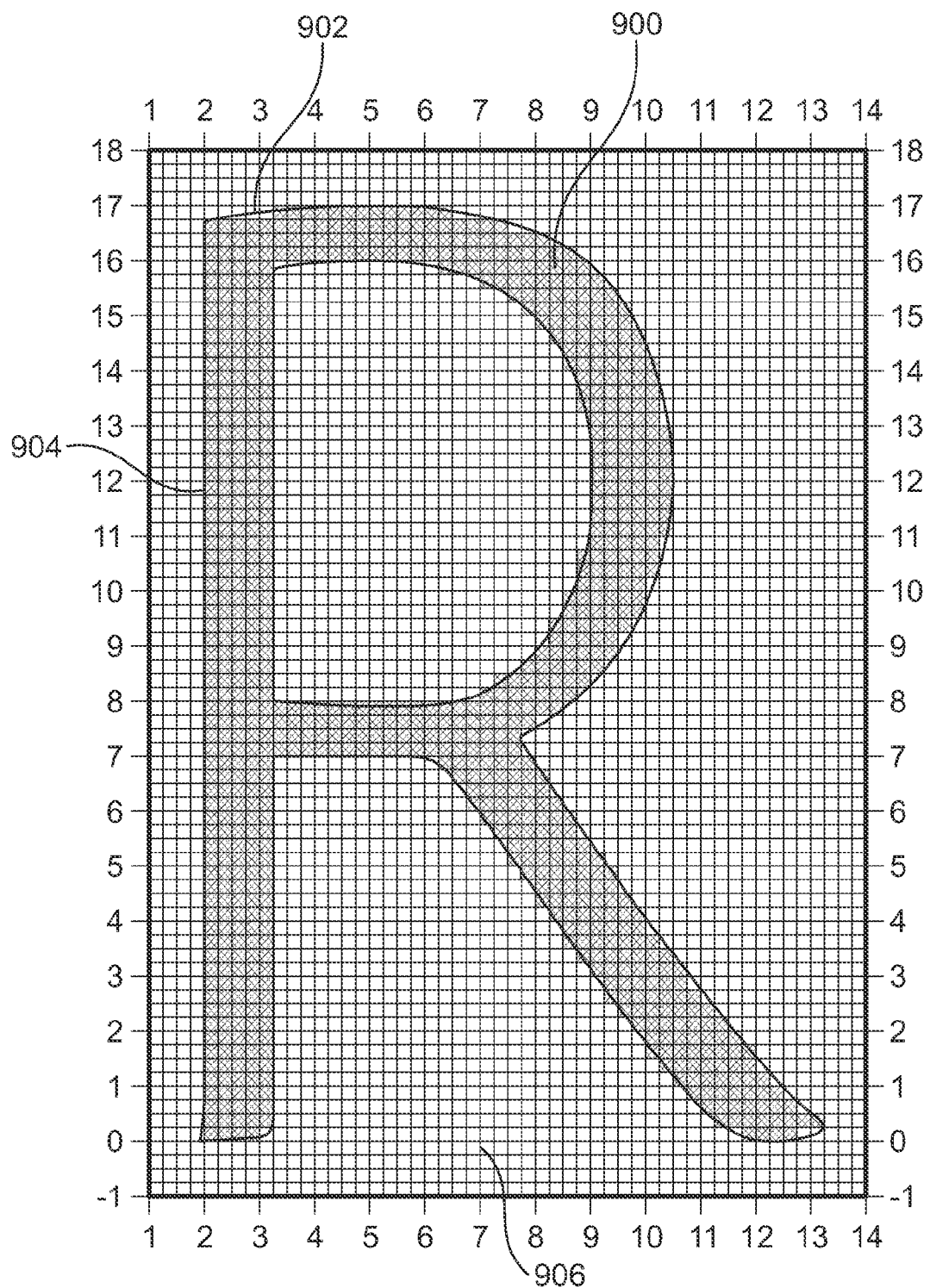
FIGS. 9A-G show high resolution bitmap and gray scale representations of a glyph representing the character R.
Figure 9B:
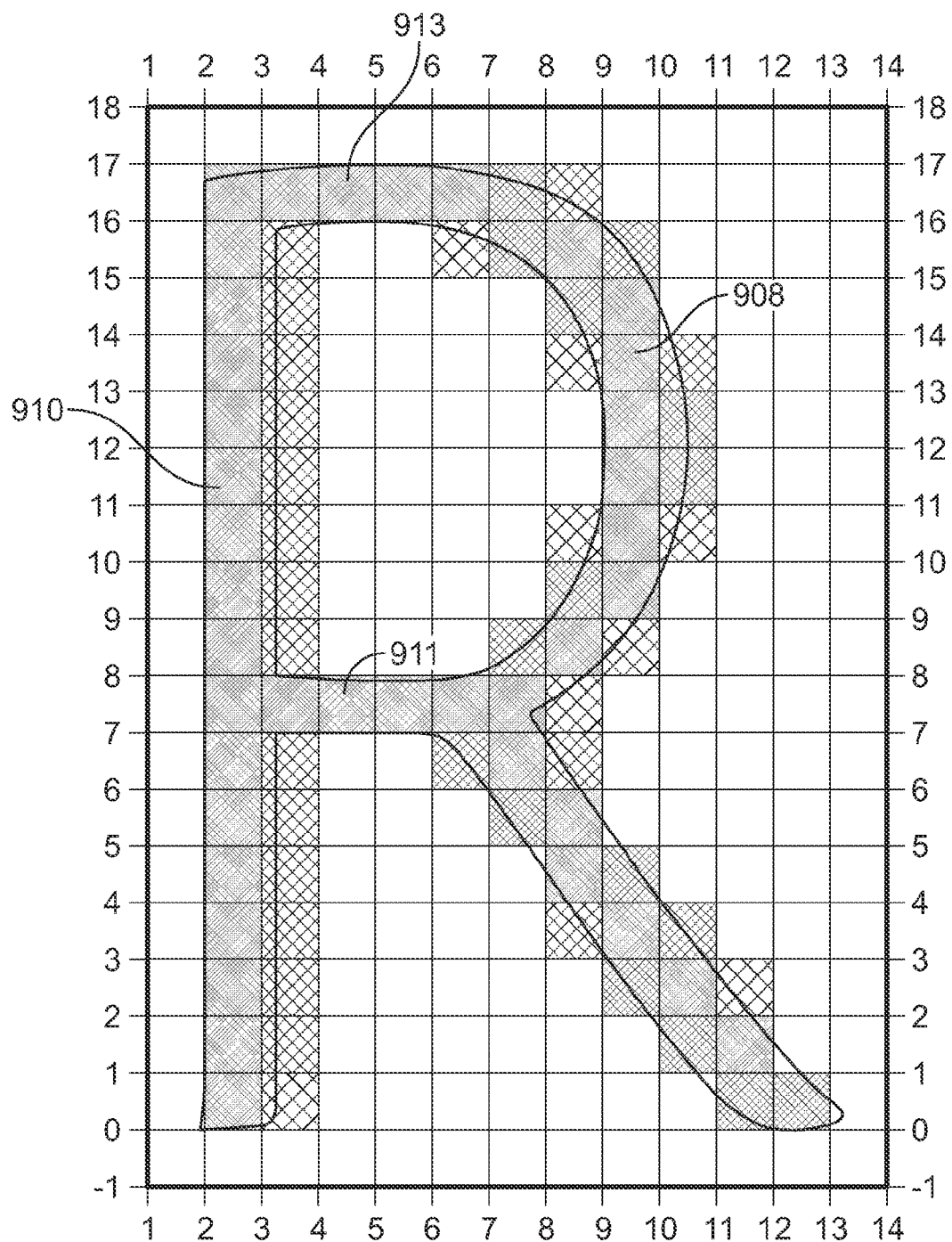
Figure 9C:
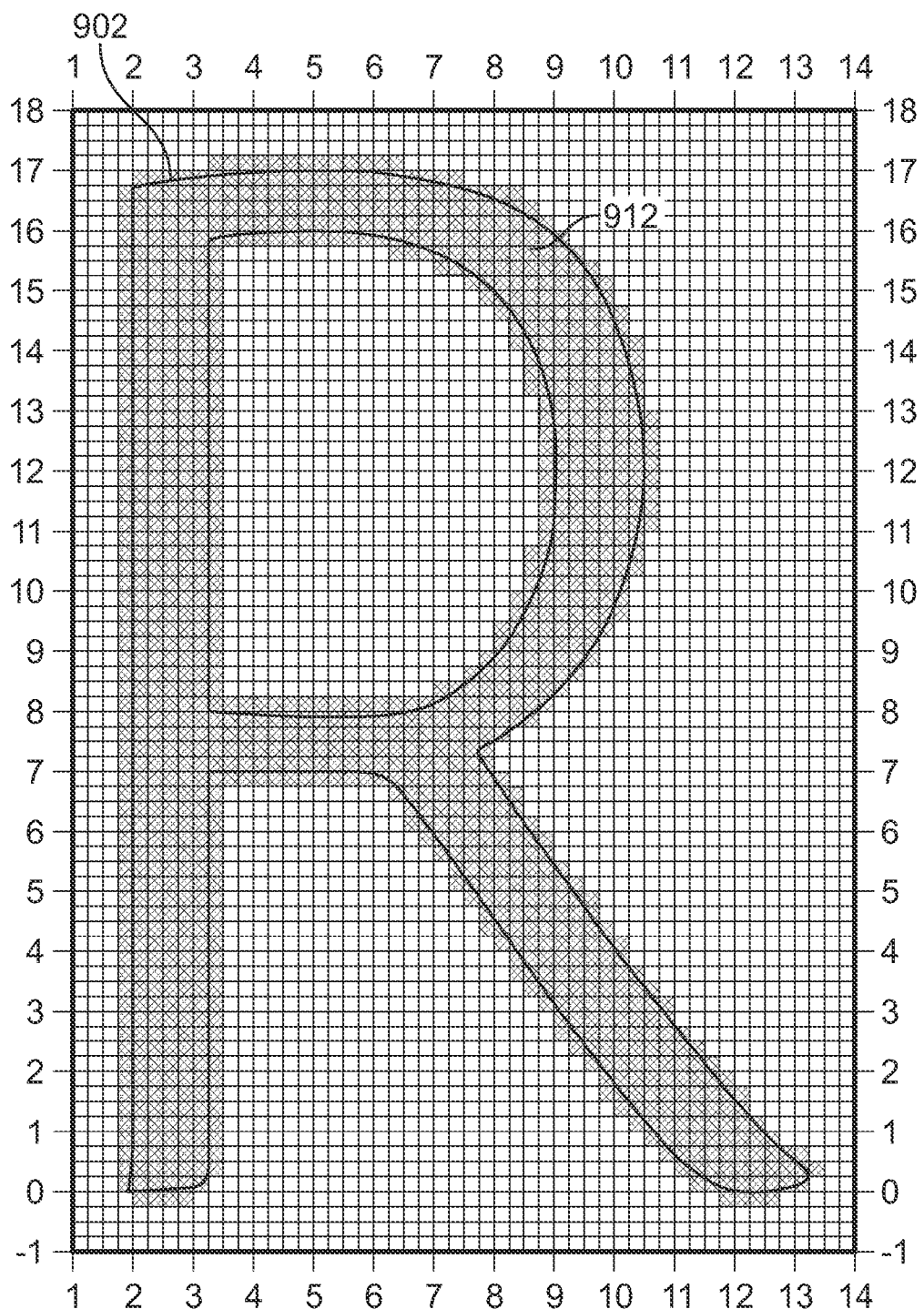
Figure 9D:
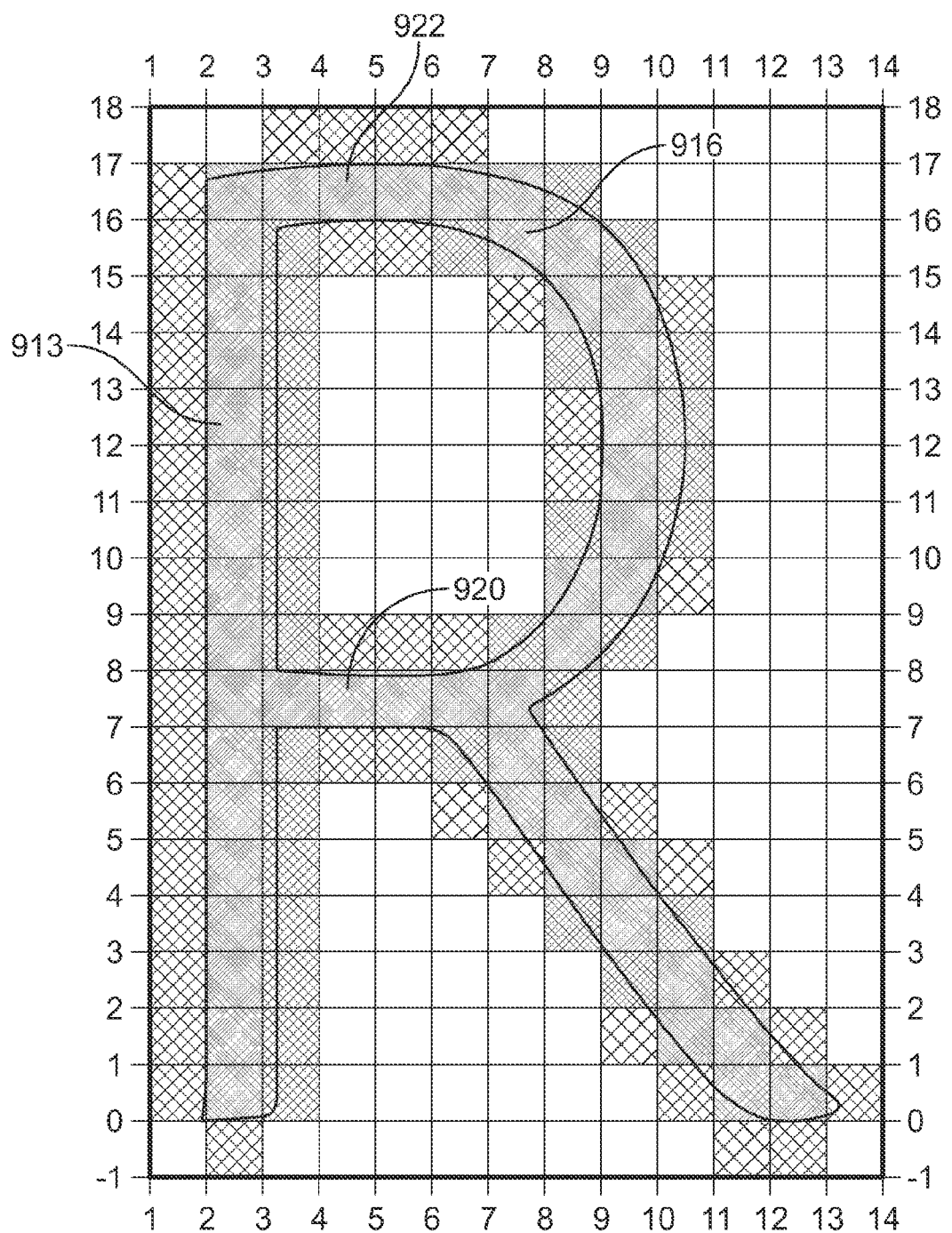

FIG. 9C shows a high resolution bitmap 912 representation of the glyph, which for illustrative purposes includes edges that have been adjusted by an initial adjustment value of ¼ of a device pixel. The outline 902 is shown overlying the bitmap 912 for illustrative purposes and corresponds to the original hinted outline shown in FIG. 9A. FIG. 9D shows an adjusted gray scale representation 916 downsampled from the bitmap 912. The vertical stem 918 in the adjusted gray scale representation 916 is 3 device pixels wide, as compared to the vertical stem 910 in the original gray scale representation, which is 2 device pixels wide. The horizontal stems 920 and 922 of the adjusted gray scale representation 916 are also 3 device pixels wide, as compared to the 1 pixel width of the corresponding horizontal stems 911 and 913 in the original gray scale representation 908. The wider vertical and horizontal stems in the adjusted gray scale representation 916 can have a blurring effect.

Figure 10:
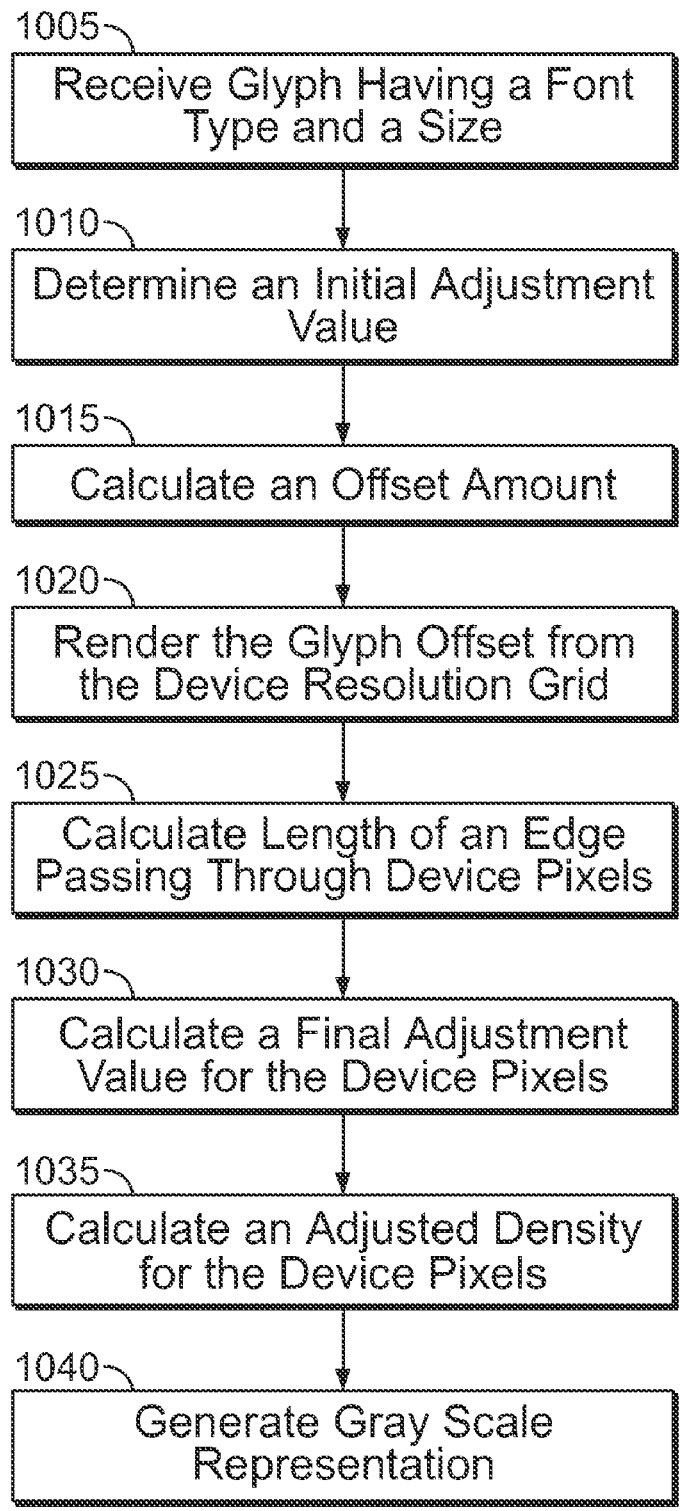
FIG. 10 shows a process for adjusting the density values of device pixels representing a glyph, while minimizing the stroke width in terms of device pixels.

FIG. 10 shows a process 1000 to adjust the density values of device pixels representing a glyph, while minimizing the stroke width in terms of device pixels to provide sharp edges for readability and maintaining contrast. For illustrative purposes, the glyph represented in FIGS. 9A and 9B will be adjusted according to the process 1000. In a first step, a glyph to be rendered at a certain size and belonging to a font is received (step 1005). In this example, the size is 26 pixels per em and the font is Adobe Type 1 CronosMM. An initial adjustment value for the glyph is determined (step 1010) based on a scaled stem width of the glyph, using the techniques described above. In the present example, the initial adjustment value is ¼ of a device pixel per glyph edge.

An offset amount is calculated, which will be an amount by which the glyph will be offset from the device resolution grid 906 when a bitmap is rasterized (step 1015), as compared to the position of the original grid outline 906. The bitmap representation of the glyph is rasterized offset from the device resolution grid 906 by the offset amount (step 1020).

In one implementation, the offset amount is calculated as 1/n, where n is the grid ratio. That is, if the ratio of the high resolution grid to the device resolution grid is 8×8, then an offset amount of ⅛ is calculated. Preferably, the offset amount is greater than or equal to the initial adjustment value. If a grid ratio of 8 gives an offset amount that is less than an initial adjustment value, then the grid ratio is adjusted, for example, to 4, thus giving a greater offset value of ¼.

Figure 9E:
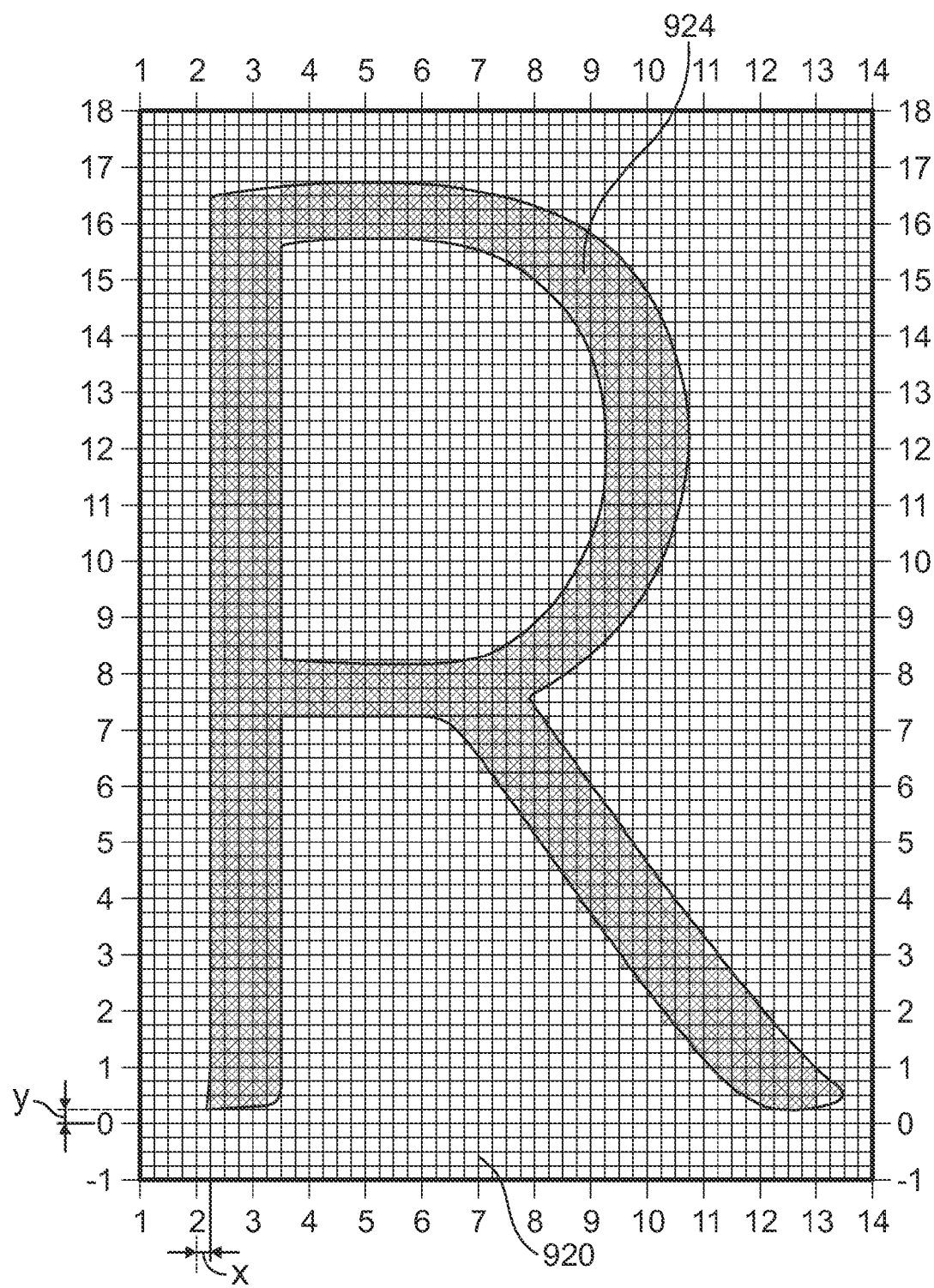

Referring to FIG. 9E, a high resolution bitmap representation 924 of the glyph is shown, offset from the device resolution grid 906 by ¼ device pixel in the x and the y directions relative to the original position of the glyph outline 902 shown in FIG. 9A. By rendering the glyph offset from the device resolution grid 906 by the offset amount, the density values of the device pixels can be adjusted (i.e., the strokes "darkened"), while maintaining alignment of one or more of the glyph's edges to the device resolution grid 906. In the present example, the initial adjustment value is ¼ pixel. Therefore a device pixel can be adjusted by a density value of up to ¼ pixel, i.e., the final adjustment value of a device pixel's density value can be ¼ pixel or less. The offset amount selected in the present example is ¼ of a device pixel, which is equal to the initial adjustment value.

Figure 9F:
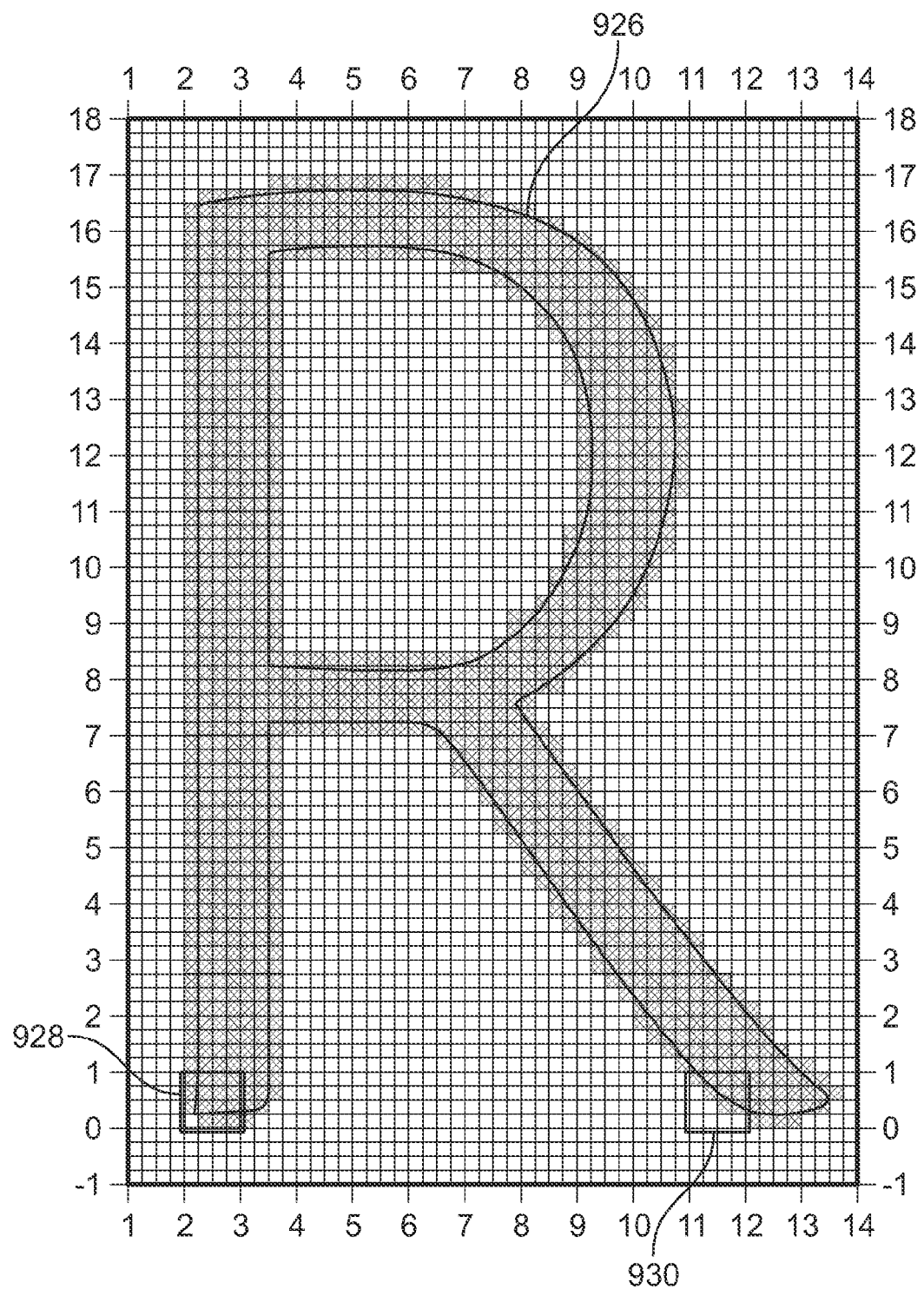

Using techniques described above in reference to FIGS. 5 and 6A-D, the length of an edge of the glyph passing through a device pixel representing the glyph offset from the device resolution grid 906 by the offset amount is calculated (step 1025). FIG. 9F shows a high resolution bitmap representation 926 of the glyph that is offset from the device resolution grid 906 by the offset amount. For illustrative purposes, the bitmap representation of the glyph is shown adjusted along the edges of the glyph by the initial adjustment value (i.e., ¼ pixel). The fine resolution pixels shown in gray on the outside of the glyph outline 902 are the initial adjustment pixels and represent the initial adjustment value. As described above, the length of an edge of the glyph passing through a device pixel can be calculated by counting the number of initial adjustment pixels marking the device pixel and dividing by the grid ratio. For example, device pixel 928 is marked by 6 initial adjustment pixels, and device pixel 930 is marked by 4 initial adjustment pixels.

A final adjustment value for the device pixels is calculated based on the initial adjustment value and the lengths of the edge passing through the device pixels (step 1030). For example, the final adjustment values for device pixels 928 and 930 can be calculated as follows:

(Final Adjustment Value)$_{928}$=¼×6/16=6/16=0.375

(Final Adjustment Value)$_{930}$=¼×4/4=¼=0.25

The adjusted density values of the device pixels representing the glyph are calculated based on the original density values and the final adjustment values (step 1035). For example, the adjusted density values for the device pixels 928 and 930 can be calculated as follows:

(Adjusted Density Value)$_{928}$=9/16+0.375=0.9375

(Adjusted Density Value)$_{930}$=5/16+0.25=0.5625

Figure 9G:
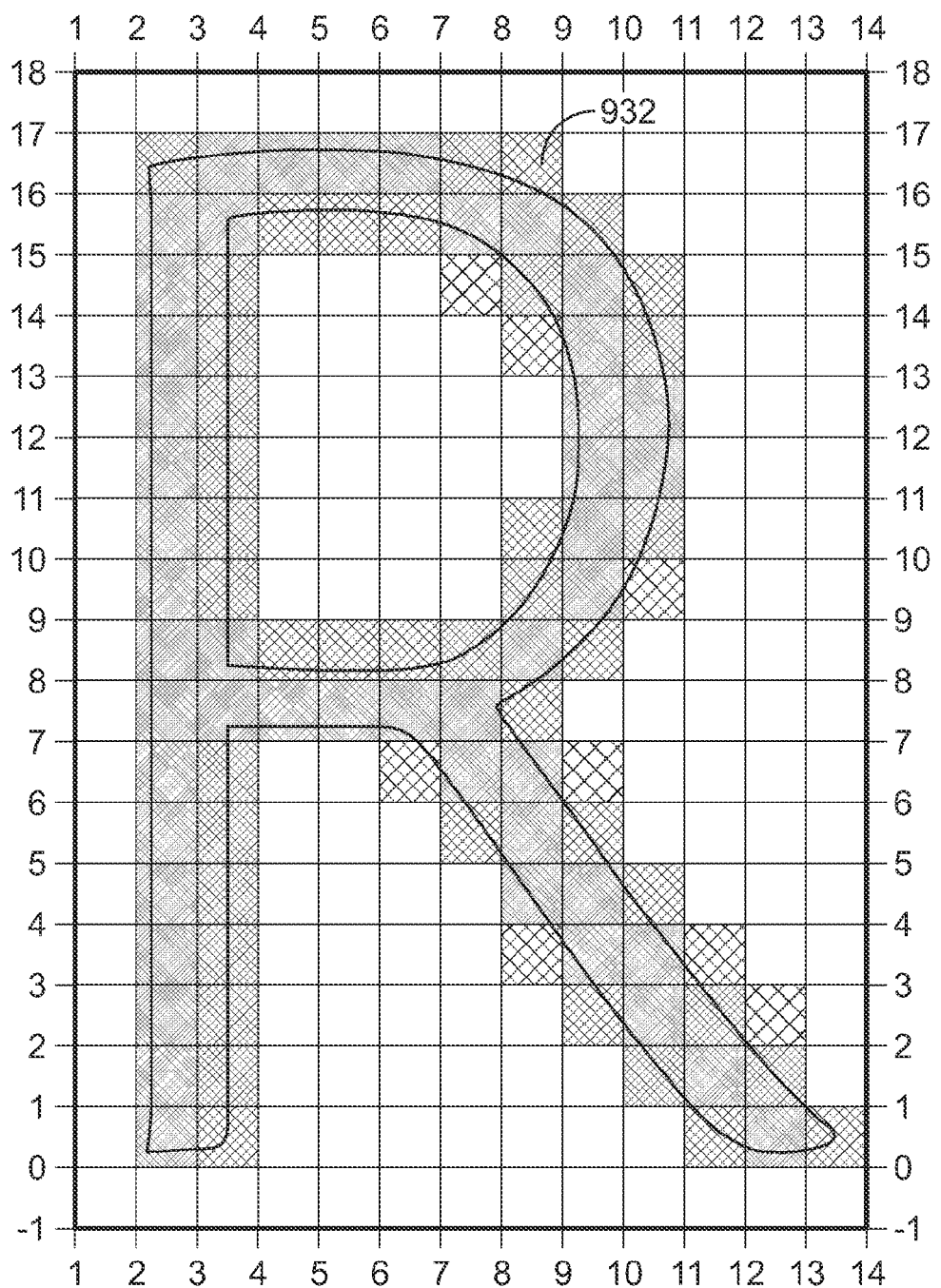

The density values of the rendered glyph 926 are adjusted (step 1040). An adjusted gray scale representation 932 of the glyph shown in FIG. 9G is generated from the adjusted density values and the bitmap 924 (FIG. 9E). A comparison of the adjusted gray scale representation 932 to the original gray scale representation 908 of FIG. 9B illustrates how adjusting the density values of the device pixels darkens the overall appearance of the glyph. The vertical stem width in both the adjusted gray scale representation 932 and the original gray scale representation 908 is 2 device pixels wide. By comparison, the adjusted (but not offset) gray scale representation 916 shown in FIG. 9D, which was not offset from the device resolution grid 906 before rendering and adjusting, has a vertical stem width of 3 device pixels. The horizontal stems 911, 913 of the original gray scale representation 908, which were one maximum density value pixel wide, are darkened in the adjusted gray scale representation 932 and are 2 pixels wide. This occurs without the blurred effect illustrated by the adjusted (but not offset) gray scale representation 916 in FIG. 9D, i.e., contrast with the background is maintained.

In the example shown in FIGS. 9E-G, the glyph was rendered offset by equal offset amounts in both the x and y directions. In another implementation, the glyph can be rendered offset by an offset amount in only one of the x and y directions, or offset by different offset amounts in the x and y directions.

The technique for calculating an offset amount based on an initial adjustment value and rendering the glyph offset from the device resolution grid by the offset amount can be implemented in fonts such as TrueType, Adobe's Type 1 font, Type 2 font, and other fonts that allow similar types of hinting as the Type 1 font. Implementations of the technique are not limited to rendering text, i.e., glyphs, but can be implemented in any thin, filled shape. For example, in a graphics application drawing lines, such as a grid in a spreadsheet, the above technique can be implemented to adjust the density values of device pixels representing the lines forming the grid.

An implementation of the above described density value adjustment and glyph offsetting techniques is described in further detail in reference to the table shown in FIGS. 8A-8G. FIG. 8A is an example of a table 800 that can be used to determine an initial adjustment value when a glyph to be rendered is an Adobe Type 1 font to be displayed in gray scale. The first column 802 includes a set of scaled stem width values expressed in terms of $1/16^{th}$ of a device pixel. Referring to the sixth row 803, the scaled stem width is 5 or $5/1^{th}$ of a device pixel. The table includes scaled stem widths up to a maximum value of 37, or 2 and $5/1^{th}$ of a device pixel. Typically, a table such as this includes scaled stem width values up to a maximum of just over 2 device pixels in width.

The second and third columns 804 and 806 are the x and y grid ratios respectively. The values in these columns indicate, at a given scaled stem width, the grid ratio for a high resolution bitmap that will be rendered to represent the glyph. In this particular table, at certain scaled stem widths the grid ratio is 4×4 (i.e., 4 fine grid pixels in the x and y directions for each device pixel), whereas at other scaled stem widths the grid ratio is 8×8. The fourth column 808 indicates the hint grid ratio that is the ratio of the grid to which the glyph outline is hinted to, relative to the device resolution grid. The fifth and sixth columns 810 and 812 indicate the alignment in the x and y directions. For example, referring to row 803, the x alignment value is 8 and the hint grid ratio is 8. That is, the glyph outline was hinted to a fine grid having a grid ratio of 8×8 as compared to the device resolution grid. The position of the glyph outline was aligned to $1/8^{th}$ of a device pixel (i.e., aligned to the fine grid). If, for example, the x alignment value is 1, that indicates the position of the glyph outline was aligned to the device resolution grid.

The next two columns 814 and 816 indicate the x and y offset amounts respectively. For example, referring to row 803, at a scaled stem width of $5/16^{th}$, the glyph is rendered offset from the hinted glyph outline position by 0 in the x direction and by 1 in the y direction. A high resolution bitmap representation of the glyph will not be offset in the x direction, but will be offset by an amount of $1/8^{th}$ of a device pixel (i.e., 1 fine grid pixel) in the y direction. At other scaled stem widths, such as 11 through 25 sixteenths of a device pixel, the glyph is rendered offset by $1/8^{th}$ of a device pixel in both the x and the y directions.

The next two columns 818 and 820 indicate whether the adjustment to pixel density values will "carry" over to a neighboring pixel in the x and y directions respectively. A value of 0 indicates that there will be no carrying (i.e., 0=no), and a value of 1 indicates that there will be carrying (i.e., 1=yes). For example, referring to row 803, the x and y adjustment can carry in both the x and y directions, since the values in columns 818 and 820 are both 1 (i.e., "yes"). If the value in either column is 0, meaning the adjustment value cannot carry into a neighboring pixel in the corresponding direction, then the edge detector will not identify such a neighboring pixel when detecting the edge.

The final column on the right, column 822, indicates the initial adjustment value corresponding to the scaled stem width indicated in the first column 802. For example, referring to row 803, at a scaled stem width of $5/1^{th}$, the initial adjustment value is $4/16$.

Tables similar to FIG. 8A are shown in FIGS. 8C-G. FIG. 8C shows a table for determining initial adjustment values when using a Type 1 font will be displayed using subpixel rendering. The grid ratio in this instance is 6×6, which is typical when using subpixel rendering on a RGB output device, as the fine grid resolution can be expressed as a multiple of 3.

FIGS. 8D and 8E show tables that can be used to determine initial adjustment values when using a TrueType font with isotropic anti-aliasing to be displayed in gray scale and subpixel rendering respectively.

FIGS. 8F and 8G show tables for determining initial adjustment values for TrueType fonts to be displayed in gray scale when hinting using an anisotropic anti-aliasing policy. Anisotropic anti-aliasing refers a technique in which a bitmap representation of a glyph is generated by anti-aliasing to some degree in the x direction and to a different degree in the y direction. Anti-aliasing occurs in both directions, but not to the same degree. Thus, an anti-aliasing process is used in the x direction, and a different anti-aliasing process is used in the y direction to generate a high resolution bitmap representation of the glyph. Anisotropic anti-aliasing is described further in U.S. patent application Ser. No. 10/440,013, filed May 16, 2003, by T. Dowling and R. D. Arnold, entitled "Anisotropic Anti-Aliasing", the entire contents of which are hereby incorporated by reference.

Figure 11A:
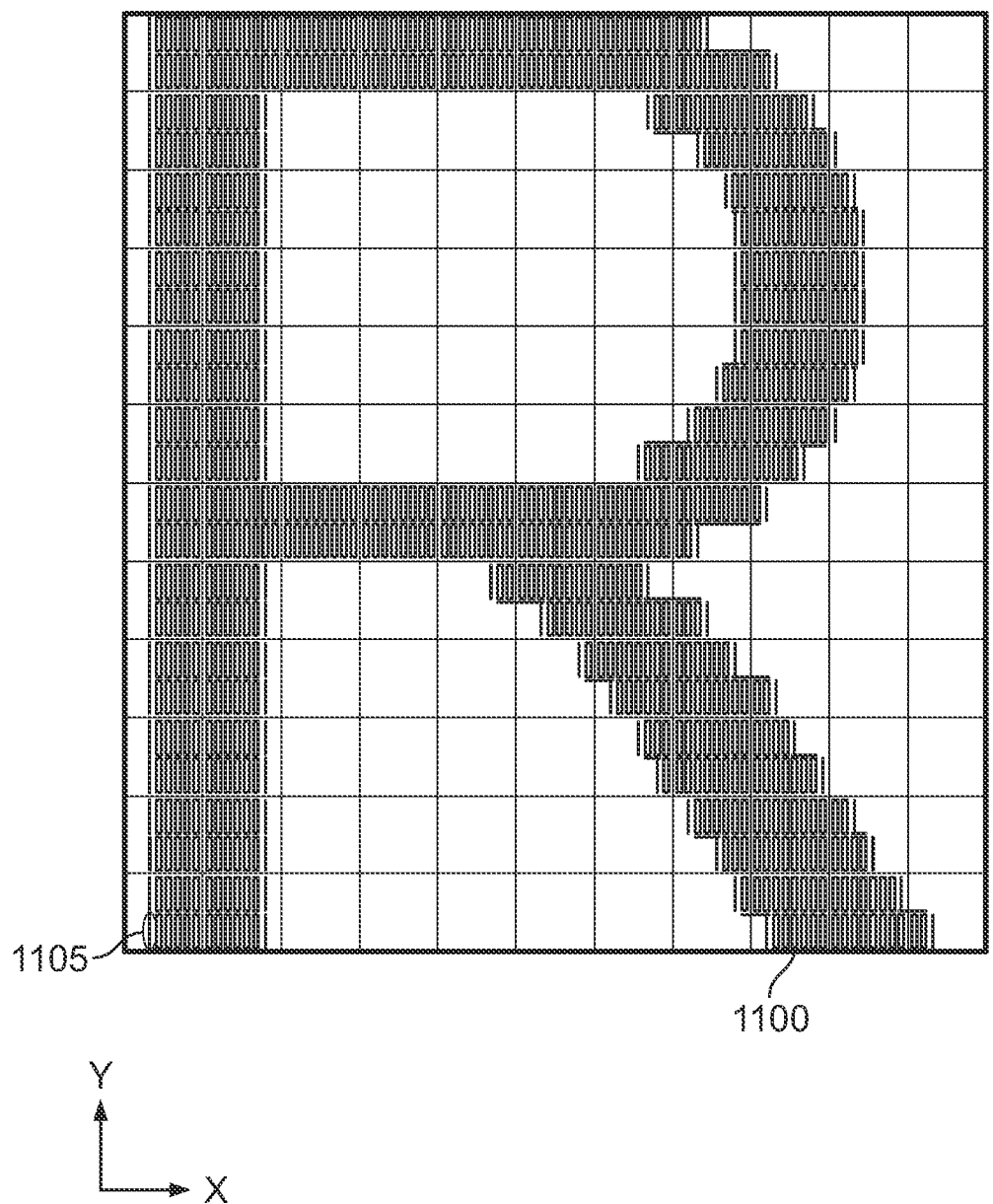
FIGS. 11A-G show density maps and gray scale representations of a glyph representing the character R.

FIGS. 11A-G illustrate an example of adjusting the density values of a glyph that is generated by anisotropic anti-aliasing. FIG. 11A shows a high resolution bitmap representation 1100 of a glyph representing the character "R", in a TrueType ArialMT font at a size of 16 ppem. For illustrative purposes, the high resolution pixels in the y direction are stretched vertically to fit the coarse grid corresponding to the device resolution. The grid ratio is 8×2, i.e., 8 fine grid pixels per device pixel in the x direction and 2 fine grid pixels per device pixel in the y direction. The scaled stem width is 1.4 pixels. Referring to FIG. 8D, an initial adjustment value can be determined for the scaled stem width by rounding to $11/8$ths (i.e., 1.375). Per row 840 (i.e., the row corresponding to a scaled stem width of $11/8^{th}$), the initial adjustment value is $1/16^{th}$ of a device pixel. There is no "carry" in the y direction, per the Y Carry column 842, and accordingly the edge detector does not detect horizontal edges aligned with device pixel boundaries, however, horizontal edges that are not aligned with device pixel boundaries are detected. In some implementations, not having carry in the y direction can keep horizontal stems sharp, although at the expense of the stem not being darkened in the y direction.

In one implementation, the edges can be detected using the formula shown in Table 3 below, where the edge detector can distinguish between horizontal and vertical edges. The variables "a" through "e" represent bits in a high resolution rasterizer output having the geometric relationship shown in the first column. The expression is TRUE if the central pixel, "c", represents a vertical and/or horizontal edge.

TABLE 3

| bits | vertical edges | horizontal edges |
|---|---|---|
| a |  |  |
| bcd | (~c) & (b \| d) | (~c) & (a \| e) |
| e |  |  |

The thin gray line along the perimeter of the bitmap's 1100 edges in FIG. 11A represents the initial adjustment pixels 1105 in the x direction. The horizontal edges that are across device pixel boundaries are not detected and marked by the thin gray line.

Figures 11B, 11C:
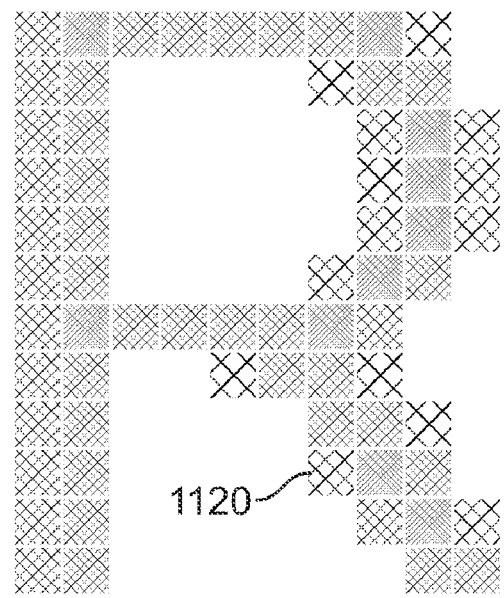

FIGS. 11B and C show the initial density values for device pixels representing the glyph before adjustment. The gray scale representation 1115 in FIG. 11C is produced from the density map 1110 shown in FIG. B by converting each density value to a gray value.

Figure 11D:
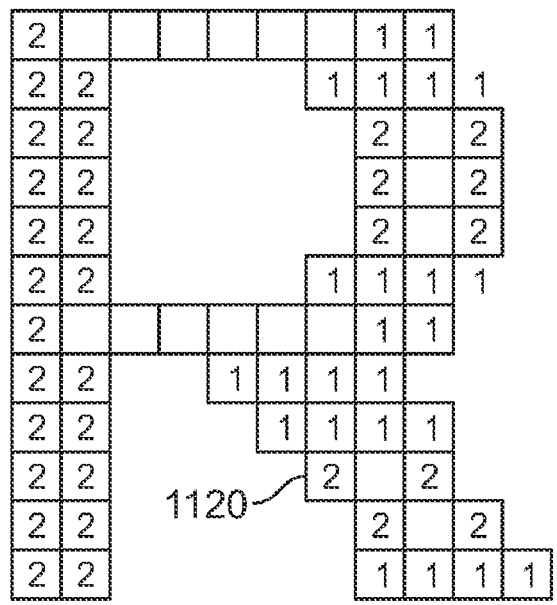
Figure 11E:
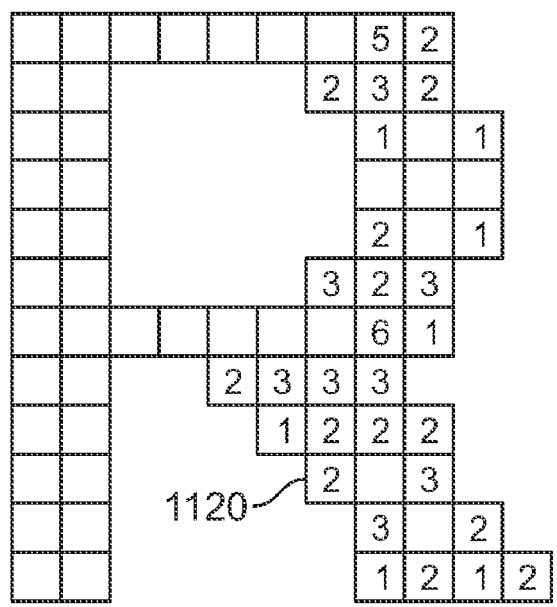

FIGS. 11D and E show the counts of vertical edges (FIG. 11D) and horizontal edges (FIG. 11E) in each device pixel. It is possible to register both a vertical and horizontal edge within the same device pixel. These values are used to calculate a final adjustment value for each device pixel. The final adjustment value for an anisotropic anti-aliased glyph can be calculated according to the following formula.

Final Adjustment Value=$\{(V\text{Edge}/Y\text{Grid})+(H\text{Edge}/X\text{Grid})\}\times$Initial Adjustment Value where:
VEdge=length of vertical edge;
YGrid=grid ratio in y direction;
HEdge=length of horizontal edge; and
XGrid=grid ratio in x direction.

As an example, the final adjustment value for device pixel 1120 can be calculated as follows:

(Final Adjustment Value)$_{1120}=\{(2/2)+(2/8)\}\times$
$1/16=1.25/16=1/16$(truncated to nearest $16^{th}$)

Figures 11F, 11G:
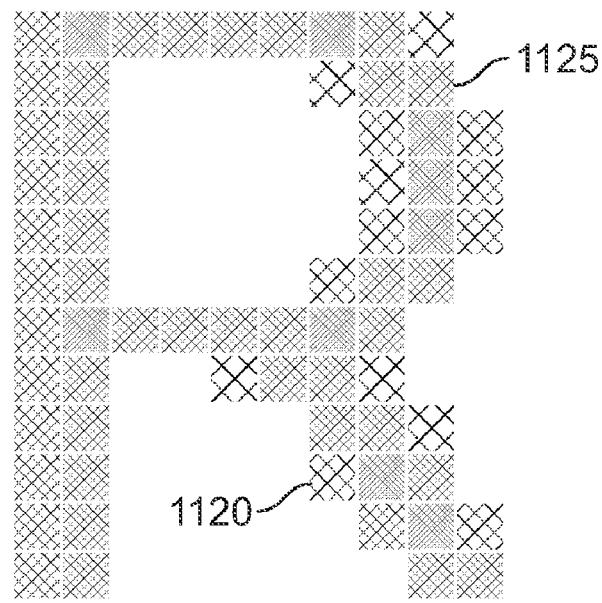

FIGS. 11F and G show a density map and a gray scale representation of the glyph are shown, respectively, including adjusted pixel density values. An adjusted density value for a device pixel is calculated by adding the final adjustment value of the device pixel to the initial density value of the device pixel. For example, the adjusted density value for device pixel 1120 can be calculated as follows:

(Adjusted Density Value)$_{1120}=4/16+1/16=5/16=0.3125$

The resulting gray scale representation 1125 is shown in FIG. 11G.

The examples of pixel density value adjustment described above use equal adjustment values for each edge of a stroke. A vertical stem, for example, was adjusted using an initial adjustment value of ¼ pixel applied to both the left and right edges of the stem. In one implementation, the density values of device pixels representing a glyph can be adjusted asymmetrically, whereby a different initial adjustment value can be applied to the two edges of a given stroke.

As show in FIG. 8B, five additional columns can be included in an initial adjustment value table such as the table shown in FIG. 8A. Like FIG. 8A, FIG. 8B also refers to an Adobe Type 1 font to be displayed in gray scale. The tables in FIGS. 8A and 8B can be implemented as a single table. The five additional columns can include column 850 indicating whether to use asymmetric adjusting. Asymmetric adjusting means the two edges of a glyph's stroke are not adjusted by equal amounts, as was the case in the examples discussed above. Rather, one edge may be adjusted more than the other, which may be useful for maintaining contrast along one or more edges. For example, if an offset value is slightly greater than the amount by which a device pixel's intensity value is adjusted, then a device pixel that had a maximum intensity value pre-adjustment, may have an adjusted density value that is less than maximum, resulting in an edge that is no longer black. To maintain a black edge of a stroke formed by the device pixel, the device pixels along one edge may be adjusted more than on the other edge, such that device pixels along the edge (post-adjustment) are of maximum density value.

Column 852 (shown in FIG. 8B) indicates a low initial density value, column 854 indicates a low initial adjustment value, column 856 indicates a high initial density value and column 858 indicates a high initial adjustment value. If column 850 indicates that there is no asymmetric darkening (i.e., has a value of 0), then the values in the remaining four columns 852-858 are all 0, for example, rows 1-5. With respect to FIGS. 8C-G, these columns are not shown because there was no asymmetric adjusting, and the values in these five columns would have been all zeros.

In the implementation shown in FIGS. 8A and 8B, initial adjustment values can be selected as follows. As an example, consider a glyph to be rendered having a scaled stem width of ⁵/₁ths therefore corresponding to the row 803 in FIG. 8A and row 860 in FIG. 8B. If, upon edge detection, an initial density value of device pixels along an edge of a stroke is 0 (column 852), i.e., the edge was along a device pixel boundary, then the initial adjustment value used for the device pixels along the edge is ²/₁₆ths (column 854). If, upon edge detection, an initial density value of device pixels along an edge of a stroke is 24 (column 856), then the initial adjustment value used for the device pixels along the edge is ⁶/₁₆ths (column 858). If, upon edge detection, an initial density value of device pixels along an edge of a stroke is neither the low initial density value in column 852 nor the high initial density value in column 856, then the initial adjustment value in column 822 of FIG. 8A is used.

Asymmetric adjusting can also be useful to preserve phase differences. Referring to FIG. 12, a table is shown that illustrates in the far right column 1205 two phases of a stem width having a scaled stem width equal to the value in the far left column 1210. The rasterized stem width (i.e., pre-adjustment) is shown as a bold line, and the "darkening amount" or the initial adjustment value is shown as a light line. The "phase difference" column 1215 indicates the difference in position of the stem at the two different phases.

In another implementation, a "horizontal initial adjustment value" can be calculated with respect to horizontal strokes and a "vertical initial adjustment value" can be calculated with respect to vertical strokes. A horizontal standard stem width can be determined using the techniques described above in the context of a vertical standard stem width, and a horizontal scaled stem width can then be determined from the horizontal standard stem width and a size at which a glyph is to be rendered. The horizontal initial adjustment value can then be determined based on the horizontal scaled stem width, for example, using the techniques described above, referring to tables similar to those shown in FIGS. 8A-G (which are for vertical scaled stem widths). The vertical initial adjustment value can be calculated as described above in reference to the horizontal initial adjustment value.

The horizontal initial adjustment value can be used to adjust horizontal strokes, and is therefore used to determine a final adjustment value for device pixels that will be adjusted in the y direction. The final adjustment value can be calculated based on the horizontal initial adjustment value and the length of a horizontal edge of a glyph passing through a device pixel. The vertical initial adjustment value can be used to adjust vertical strokes, and is therefore used to determine a final adjustment value for device pixels that will be adjusted in the x direction. A final adjustment value for a glyph can be calculated using the following formula:

$$\text{Final Adjustment Value} = (V\text{Edge}/Y\text{Grid}) \times V\text{Init}\} + \{(H\text{Edge}/X\text{Grid}) \times H\text{Init}\}$$

where:
VEdge=length of vertical edge
YGrid=grid ratio in the y direction
VInit=vertical initial adjustment value
HEdge=length of horizontal edge
XGrid=grid ratio in the x direction
HInit=horizontal initial adjustment value The glyph may be rendered offset from the device resolution grid, and may be offset equal or different amounts in the x and y directions, as described above.

Referring again to the tables in FIGS. 8A-G, a number of parameters for rendering a glyph can be decided based on a scaled stem width of the glyph. For example, consider row 804 in FIG. 8A and the corresponding row 805 in FIG. 8B. A renderer that is render a glyph in a Type 1 font in gray scale having a scaled stem width of $^{12}/_1$ths, can determine from FIGS. 8A and 8B the following rendering parameters:

x and y grid ratios
hint grid ratio
hinting policy
x and y alignment
x and y offset amounts
whether to carry adjustment in the x and y directions
an initial adjustment value
whether to asymmetric adjust
a "low" initial adjustment value for a low density value if asymmetrically adjusting
a "high" initial adjustment value for a high density value if asymmetrically adjusting The above parameters can be collectively referred to as an example of a "rendering policy". Other rendering policies can include more, fewer and/or different parameters than those included in FIGS. 8A and 8B. The rendering policy is selected by the renderer based on the scaled stem width of a glyph to be rendered, and can be selected dynamically and pre-rasterization, e.g., before generation of a bitmap representation of the glyph.

Figure 13:
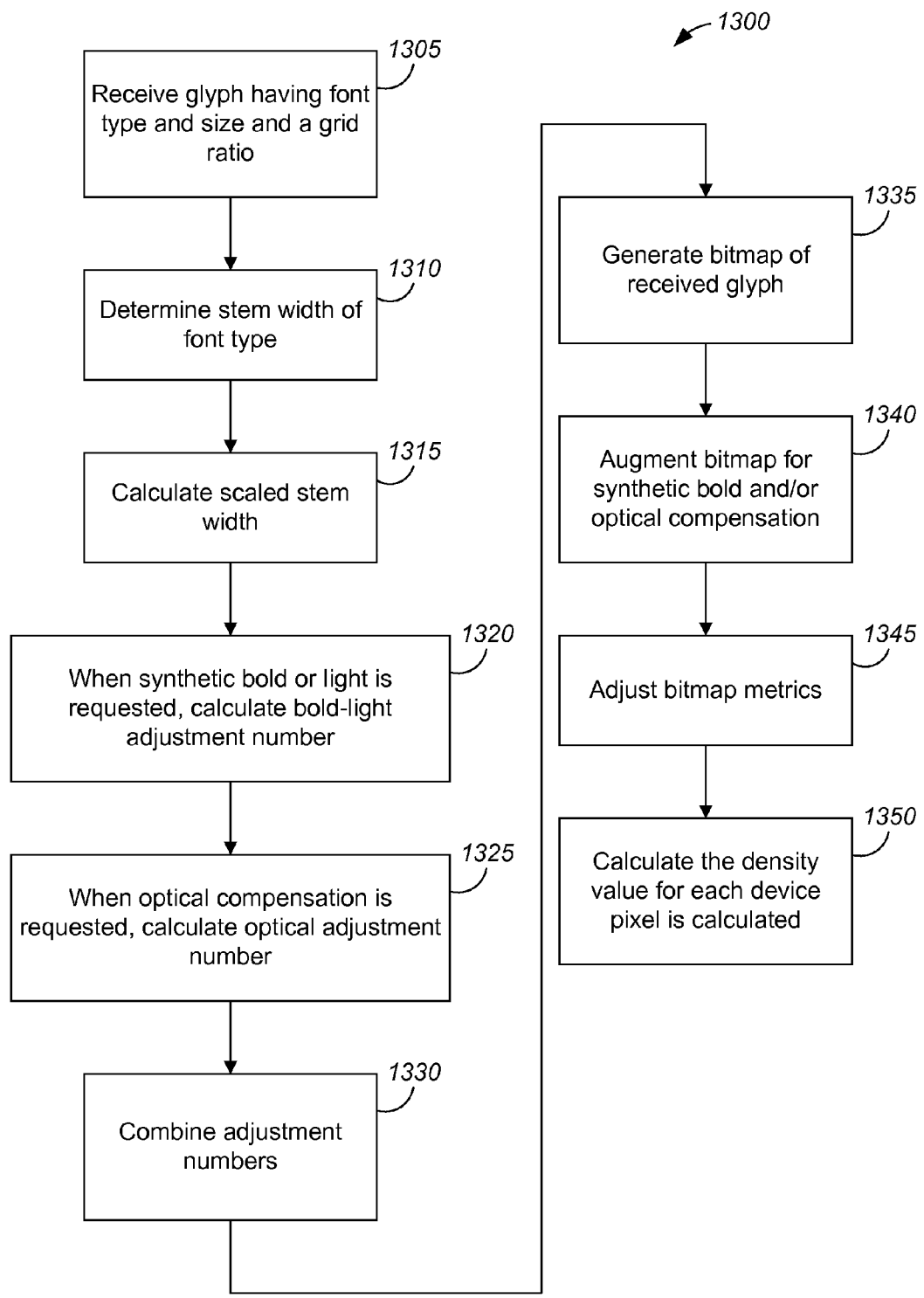
FIG. 13 is a flowchart showing a process for generating a bitmap for an augmented glyph.

FIG. 13 shows a process 1300 performed by the renderer for adjusting the density values of device pixels representing an image of a glyph. The process 1300 is an alternative to the process 500 described in reference to FIG. 5, which implements glyph adjustment based on an edge detection technique. The process 1300 implements a smear bold technique that is an improvement over conventional smear bold techniques. That is, the bitmap adjustment effected by the process 1300 is a form of smear bold.

A glyph that is associated with a font and that is to be rendered at a particular size on a raster of a raster output device is received or obtained by the renderer along with a grid ratio (step 1305). The glyph shown in FIG. 6A is an example of a glyph that can be received. The glyph's font belongs to a particular font type. The grid ratio specifies an integral number of rows of fine pixels and an integral number of columns of fine pixels that correspond to height and width, respectively, of a device pixel of the raster of the raster output device. The grid ratio thus specifies the number of fine pixels that correspond to a device pixel.

The stem width of the font type is determined (step 1310), and a scaled stem width is calculated (step 1315). Steps 1310 and 1315 are performed as described in reference to steps 510 and 515 of FIG. 5. Either or both of the horizontal and vertical scaled stem widths can be calculated. A scaled horizontal stem width is used for producing vertical smears. A scaled vertical stem width is used for producing horizontal smears.

When the renderer is requested to provide a synthetic bold or synthetic light rendering of the glyph, a bold-light adjustment number is determined (step 1320). The bold-light adjustment number is used in producing either synthetic bold by marking fine pixels that are unmarked or in producing synthetic light by unmarking fine pixels that are marked (i.e., erasing fine pixels). The bold-light adjustment number is conveniently expressed in units of fine pixels. The determination is based on the scaled stem width calculated in step 1320. Alternatively, the determination can be based on the particular size at which the glyph is to be displayed, for example, a particular number of points per em or pixels per em. The determination can be effected by use of a function for producing synthetic bold, for example, one that describes a linear relationship between the scaled stem width and the bold-light adjustment number of fine pixels to be marked or unmarked.

When the renderer is requested to provide optical compensation in rendering the glyph, an optical compensation adjustment number is determined (step 1325). The optical compensation adjustment number is used for optical compensation, which is effected by marking fine pixels. (Optical compensation characteristically does not erase fine pixels.) The optical compensation number is conveniently expressed in units of fine pixels. The determination is based on the scaled stem width calculated in step 1320. Alternatively, the determination can be based on the particular size at which the glyph is to be displayed. The determination can be effected by use of a function for optical compensation, for example, a function that describes an inversely proportional relationship between the scaled stem width and the optical compensation adjustment number of fine pixels to be marked. One implementation of such a function is:

$$\text{Number of fine pixels} = 1.25 * (12\text{-scaled stem width})$$

Except for the use of a different function, i.e., one for optical compensation as opposed to one for producing synthetic bold or light, the determination of the number of fine pixels to be marked for optical compensation is similar to the determination of the number of pixels to be marked for producing synthetic bold or light.

The above-mentioned requests for synthetic bold, synthetic light, and optical compensation can be initiated by a human operator. The operator can effect the request, for example, by checking an appropriate box in a graphical user interface to indicate that synthetic bold, synthetic light, or optical compensation is desired. Alternatively, the request can be initiated by a program such as an application that is outputting a character represented by the glyph.

There can be two different adjustment numbers determined for each of steps 1320 and 1325, one calculated from a scaled vertical stem width and the other calculated from a scaled horizontal stem width. The one calculated from a scaled horizontal stem width is used for applying the improved smear bold technique in a vertical direction, and the one calculated from a scaled vertical stem width is used for applying the improved smear bold technique in a horizontal direction.

The bold-light adjustment number and the optical compensation adjustment number are combined (step 1330). In one implementation they are simply added. In this implementation, the optical compensation number is positive. The bold-light adjustment number is positive if synthetic bold is requested and negative if synthetic light is requested. A positive result of the add operation indicates that fine pixels are to be marked to effect the adjustment. A negative result indicates that fine pixels are to be erased to effect the adjustment. The resulting combination is referred to in the instant specification as an adjustment number. The adjustment number can be constrained to be within a maximum limit and a minimum limit.

The glyph is rendered at the particular size to generate a bitmap (step 1335). The bitmap represents fine pixels of a high resolution raster marked to represent the glyph. Optionally, the bitmap can include padding, i.e., unmarked fine pixels added to one or more edges of the bitmap to allow for augmentation of fine pixels, as will be described below. The amount of padding can be calculated from the above-described adjustment numbers. By way of example, the amount of padding can be a combination of the adjustment numbers.

Figure 14:
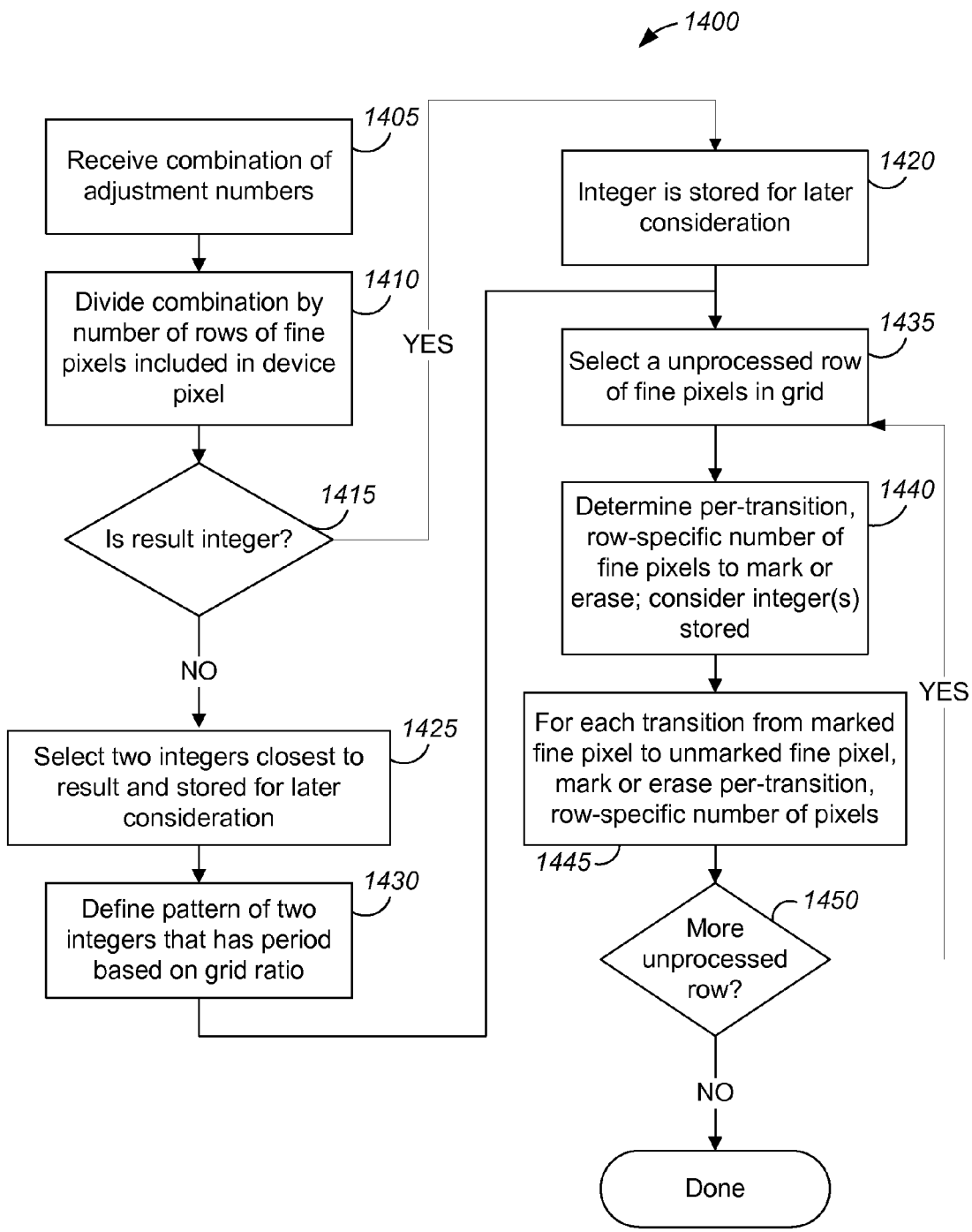
FIG. 14 is a flowchart showing an implementation for augmenting a glyph.

The bitmap is adjusted (step 1340). In general, adjustment is effected by marking or erasing one or more pixels at a transition of a marked pixel to an unmarked pixel in a particular direction. The number of pixels marked or erased is determined based on the adjustment number generated in the previous step. FIG. 14 illustrates an implementation of adjustment.

Optionally, bitmap metrics are changed (step 1345). Bitmap metrics include, for example, bitmap height, width, origin and advance. A metric can be changed to account for any adjustment. For example, the origin of the bitmap can be moved left to compensate for an adjustment that grew a glyph's right edges and that consequently moved the glyph's advance to the right.

A density value for each device pixel is calculated (step 1350). This step is performed as described in reference to step 540 of FIG. 5.

FIG. 14 illustrates a process 1400 performed by a renderer for adjusting a bitmap according to an adjustment number. The adjustment number can be calculated as described in reference to step 1330. The renderer receives or obtains the adjustment number (step 1405). The adjustment number is divided by the number of rows of fine pixels that correspond to the height of a device pixel (step 1410). For example, if the grid ratio is 6×5 (i.e., 6 fine pixels in the x direction and 5 fine pixels in the y direction for each device pixel), and there thus are five rows of fine pixels corresponding to the height of the device pixel, the combination would be divided by 5. The result may or may not be an integer. Dividing an adjustment number having a value of 8 by 5, for example, would yield 1.6.

If the result is an integer (YES branch from decision 1415), then the integer is stored for later use (step 1420). If the result of step 1410 is not an integer (NO branch from decision 1415), then the two integer closest to the result are selected (step 1425). If the result is 1.6, for example, 1 and 2 would be selected and stored for later use.

A pattern of instances of the two integers is defined (step 1430). Advantageously, the pattern is defined so that the number of pixels to be marked or erased will be distributed as evenly as possible along an edge of the glyph. An even distribution tends to maintain fidelity to the glyph's original shape. The pattern can be any form of dithering in which the amount of adjustment (augmentation or erosion) from one row of pixels to the next does not vary by more than one fine pixel. That is, the minimum and maximum adjustment amounts are within one fine pixel over all of the rows of the bitmap.

The number of instances in the pattern depends on the grid ratio. In particular, the number of instances is the number of rows of fine pixel that correspond to the height of a device pixel. For a grid ratio of 6×5, the number of instances is 5. The sum of values of the instances is equal to the adjustment number received in step 1405. For the above-described example in which the adjustment number has a value of 8 and the grid ratio is 6×5, a pattern of 2, 2, 2, 1, and 1 can be defined.

An unprocessed row of fine pixels in the high resolution bitmap is selected (step 1435). An unprocessed row is a row for which adjustment has not been effected. The rows are selected in order from top to bottom. Alternatively, the rows can be selected in other orders, for example, in order from bottom to top or from middle to top and then bottom to middle.

For a currently selected row, a per-transition adjustment number is determined (step 1440). The determination depends on whether the result of step 1410 is an integer. If it is, then there is only one integer to be considered and the integer is the per-transition number for the row. If the result of step 1410 is not an integer, however, then there are two integers to be considered and one of these number is selected based on the pattern of numbers defined in step 1430. In general, the pattern determines the sequence of integers to use for an order in which rows are selected. The sequence is repeated until there are no more rows to process. For the above-described pattern of 2, 2, 2, 1 and 1, the numbers selected for the top, second, third, fourth, fifth, and sixth rows of the bitmap are 2, 2, 2, 1, 1, and 2, respectively.

The per-transition number is line specific. That is, it is determined line by line. For the implementation being described, in which smearing is in a horizontal direction, the per-transition number is determined row by row. For an implementation in which smearing is in a vertical direction, the per-transition number would be determined column by column.

For the currently selected row, the renderer locates each transition from a marked fine pixels to an unmarked fine pixel in a particular direction. For each transition located, the renderer marks a group of one or more unmarked pixels adjacent to the transition, if synthetic bold, optical compensation, or both are requested, or erase a group of one or more marked pixels adjacent to the transition, if synthetic light is requested or if synthetic light and optical compensation are requested and the adjustment for synthetic light trumps the adjustment for optical compensation, i.e., the bold-light adjustment number is greater than the optical compensation adjustment number (step 1445). The particular direction is left to right. Alternatively, the particular direction is right to left. The selected row can include zero or more transitions. If no transitions are located, then no adjustment is made for the row, and the per-transition number determined for current row is not carried forward to the next row. That is, another determination of the per-transition adjustment is made for the next row.

Whether there are unprocessed rows remaining is determined (decision step 1450). If there are, then steps 1435 through step 1445 are repeated. Otherwise, the process is completed and bitmap metrics can be changed as described above in reference to step 1345.

In the above-described process 1400, the direction of the smear is horizontal, so the described processing is performed on a row by row basis and the adjustment number is divided by the y component of the grid ratio. For smearing in a vertical direction, the described processing is performed on a column by column basis and the adjustment number is divided by the x component of the grid ratio.

Figure 15:
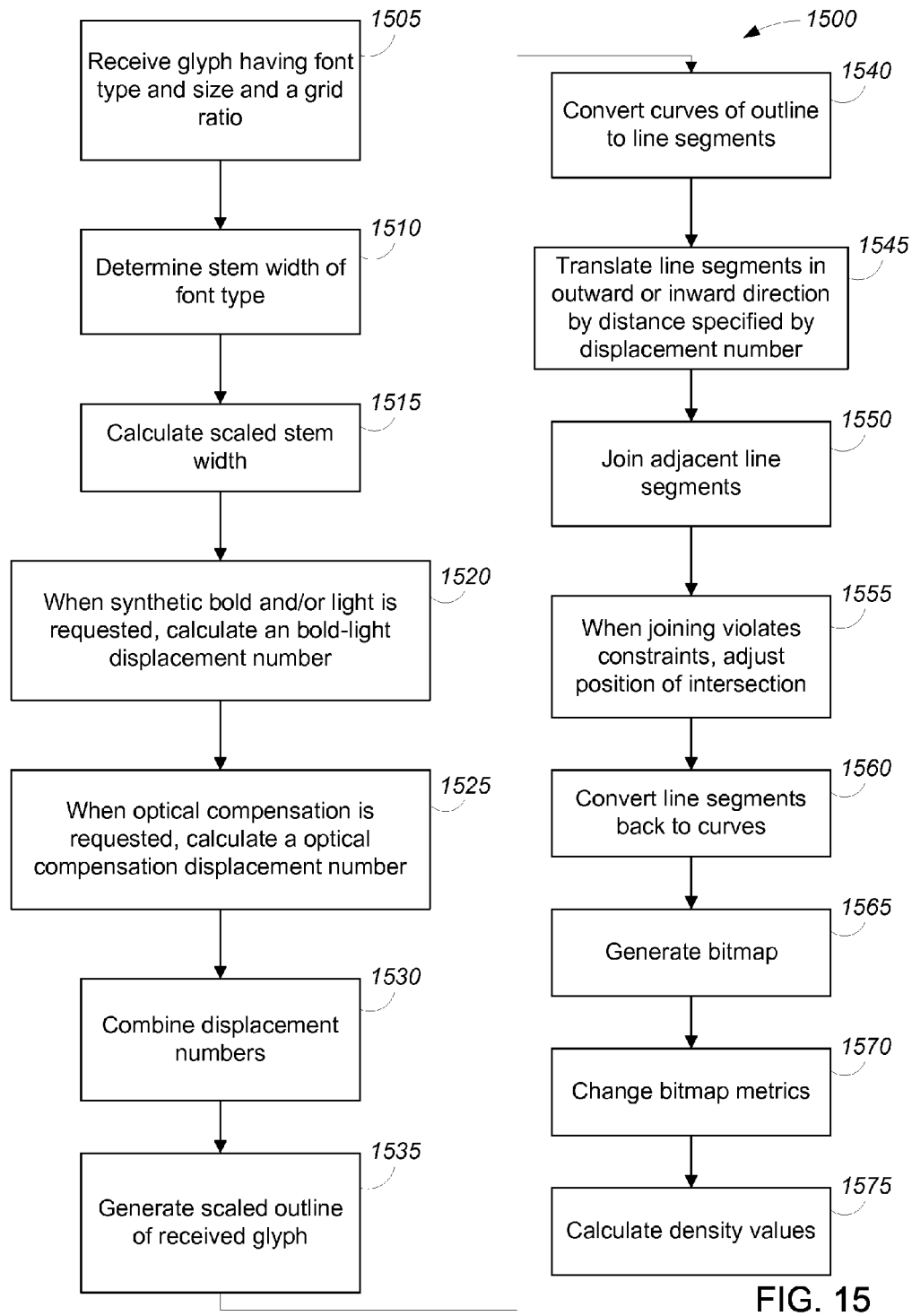
FIG. 15 is a flowchart showing a process for generating an outline for an augmented glyph.

FIG. 15 illustrates a process 1500 performed by the renderer for adjusting the density values of device pixels representing an image of a glyph. The process 1500 is an alternative to the processes 500 and 1300 described in reference to FIG. 5 and FIG. 13, respectively. The process 1500 implements an outline adjustment technique, as will be described below.

A glyph that is associated with a font and that is to be rendered at a given size on a raster of a raster output device is received along with a grid ratio by the renderer (step 1505). The stem width of the font type is determined (step 1510). A scaled stem width is calculated (step 1515). Steps 1510 and 1515 are performed as described in reference to steps 510 and 515 of FIG. 5. Either or both of the horizontal and vertical scaled stem widths can be calculated, as discussed above.

When synthetic bold or synthetic light is requested, a bold-light displacement number is determined (step 1520). The bold-light displacement number is used for producing synthetic bold or for producing synthetic light. The bold-light displacement number is expressed in units of fine pixels. The determination is based on the scaled stem width calculated in step 1520. Alternatively, the determination can be based on the particular size at which the glyph is to be displayed. The determination can be effected by use of a function for producing synthetic bold, for example, a function that describes a linear relationship between the scaled stem width and the bold-light adjustment number.

When optical compensation is requested, an optical compensation displacement number is determined (step 1525). The optical compensation displacement number is used for optical compensation and is usually expressed in units of fine pixels. The determination is based on the scaled stem width calculated in step 1520. The determination can be effect by use of a function for optical compensation, for example, one that describes an inversely proportional relationship between the scaled stem width and the optical adjustment number.

Optionally, there can be four bold-light displacement numbers determined for step 1520, one for displacement in the positive x direction, one for displacement in the negative x direction, one for displacement in the positive y direction, and one for displacement in the negative y direction. The ones for displacement is a horizontal direction can be calculated from a scaled vertical stem width, and the ones for vertical displacement can be calculated from a scaled horizontal stem width. The numbers can be different from each other when asymmetric adjustment is desired. For example, the number for displacement in the positive x direction can be difference from the number for displacement in the negative x direction.

Likewise, there can be four optical compensation displacement numbers determined in step 1525, which can also have different values.

The bold-light displacement number or numbers and the optical compensation displacement number or numbers are combined (step 1530). The resulting combination is referred to in the instant specification as the displacement number.

When there are four bold-light displacement numbers and four optical compensation displacement numbers, they are combined by their displacement direction. That is, the bold-light number for positive x displacement is combined with the optical compensation number for positive x displacement, the bold-light number for negative x displacement is combined with the optical compensation number for negative x displacement, the bold-light number for positive y displacement is combined with the optical compensation number for positive y displacement, and the bold-light number for negative y displacement is combined with the optical compensation number for negative y displacement. There can thus be four displacement numbers.

The renderer generates a scaled outline of the glyph (step 1535). A scaled outline is an outline that has been scaled to the size at which the glyph is to be rendered. The outline can include zero or more curves. Curves defining glyphs are generally Bezier curves. The outline, for example, can be defined by line segments and no curves. Alternatively, the outline can be defined solely by Bezier curves.

When the outline includes curves, each curve is changed to one or more line segments (step 1540). The change is performed using the control points of defining the curves. These points define the line segments corresponding to the curve. For a third order Bezier curve, the control points would be the two end points of the curve and two additional control points.

The line segments of the outline are translated (step 1545). The line segments are moved in an outward direction for optical compensation and to produce synthetic bold and in an inward direction to produce a synthetic light. The outward direction and the inward direction can be perpendicular to the line segment. The outward direction points to an exterior of the glyph outline. The inward direction points in the opposite direction to an interior of the glyph outline. The winding order of the outline can be used to identify the exterior of the outline. Winding order can be determined as described below in reference to FIG. 16.

When there is only one displacement number, the line segments are moved by a distance that is equal to the displacement number.

When there are four displacement numbers, the distance which the line segments is determined by selection of displacement numbers. Displacement numbers are selected based on a classification of the inward direction or outward direction which the line segment is to be moved. Inward or outward directions can be classified as up, down, left, right, between up and left, between down and left, between down and right, and between up and right. Displacement numbers are selected so that the line segment is moved in the appropriate direction. For example, if the outward direction which a line segment is to be moved is up, then the displacement number for displacement in the positive x direction is selected. If the outwards direction is between up and right, then the displacement number for displacement in the positive x direction and the displacement number for displacement in the positive y direction are selected.

The moving of line segments usually disconnects their endpoints from each other.

After they are moved, formerly connected line segments are rejoined (step 1550). This joining is performed by extending or trimming the segments' endpoints until each pair of adjacent line segments joins at an intersection point that becomes an endpoint of each the line segments of the pair.

Optionally, the joining is subject to one or more constraints and an intersection is adjusted when the one or more constraints are violated (step 1555). One constraint limits the distance at which an endpoint of a line segment can be moved. The distance can be represented by a vertical component and a horizontal component of the distance, each of which can be expressed in terms of a number of fine pixels. The constraints can, alternatively, be based on a miter limit, which is described in Adobe's PostScript Language Reference Manual ($3^{rd}$ ed).

Any line segment changed from a curve in step 1540 is changed back to a corresponding curve (step 1560). In this way, an augmented scaled outline of the received glyph is determined from the moved and joined line segments.

A bitmap is generated from the augmented scaled outline (step 1565), as described above in reference to step 1335. Optionally, bitmap metrics are changed (step 1570), as described above in reference to step 1345. The density value for each device pixel is calculated (step 1575). This step is performed as described in reference to step 540 of FIG. 5.

In the above-described processes 1300 and 1500, steps 1305 through 1345 and steps 1505 through 1570 can be performed by a rasterizer. Steps 1350 and 1575 can be performed by a downsampler. The rasterizer is a component of a renderer that generally functions to provide a high resolution bitmap of a glyph. In the course of generating a bitmap for a glyph, the rasterizer usually has sufficient information to generate an outline of the glyph, which can be adjusted as described in FIG. 15 and output to a process requesting the outline and which can be requested by another process. The downsampler is a component of the renderer that generally functions to downsample a high resolution bitmap to generate a gray scale representation of a glyph image.

Figure 16:
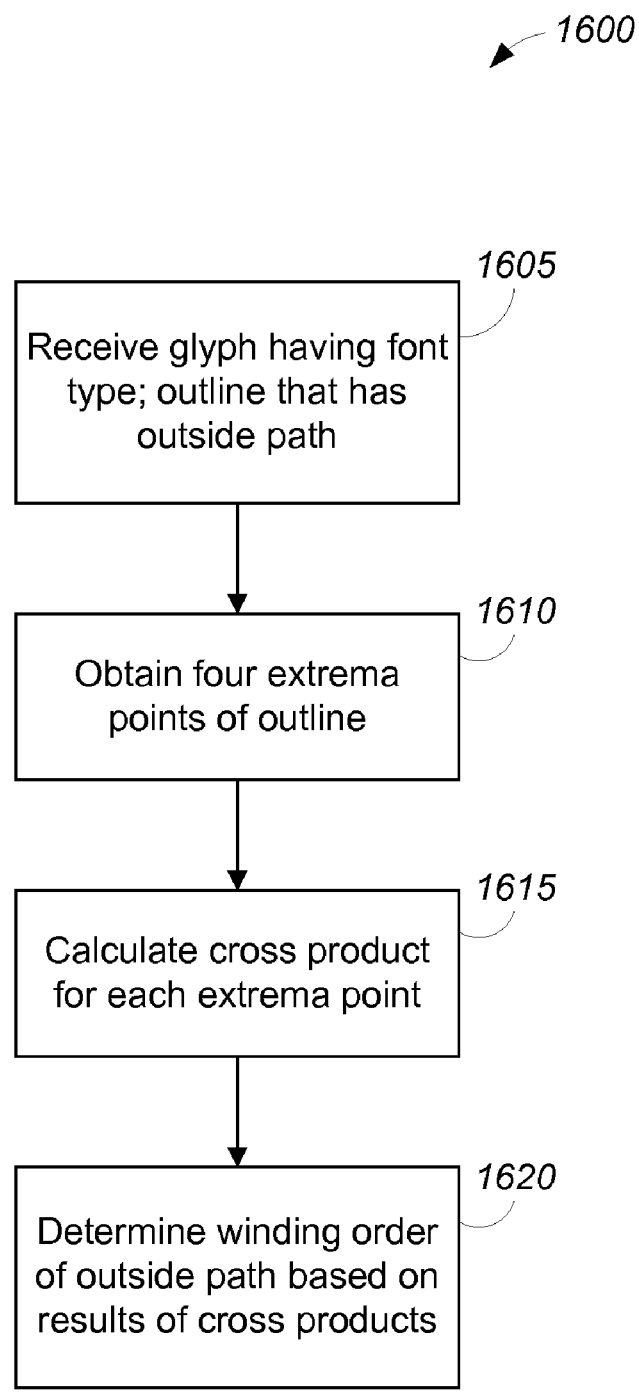
FIG. 16 is a flowchart showing a process for determining winding order.

FIG. 16 shows a process 1600 for determining winding order of a glyph outline. The winding order specifies a direction of travel along paths of an outline. An outline can include an outside path and an inside path. An outline of a glyph that represents the letter "O", for example, includes an outside path and an inside path. The outside and inside paths are usually, and assumed to be, wound in opposite directions.

A glyph outline is received along with a font type (step 1605). The outline includes only line segments, some of which may have been Bezier curves that were converted to line segments as described above. The outline includes one or more outside paths. A font type typically specifies a default winding order.

Four extrema points are obtained (step 1610). In the course of path analysis that finds bounding box information (extrema points), vectors that attach to the extrema points are stored. In general, extrema points are identified by determining a maximum x value of an endpoint of a line segment on the outline, a minimum x value of an endpoint of a line segment on the outline, a maximum y value of an endpoint of a line segment on the outline, and a minimum y value of an endpoint of a line segment on the outline. Any standard function for locating minima and maxima is suitable for identifying extrema points.

The extrema points are by definition located on an outside path. The extrema may be obtained from different outside paths when the outline has multiple outside paths.

For each extrema point, two vectors associated with the extrema are obtained and their cross product is calculated (step 1615). A right hand coordinate system is used and a right hand rule is used to define orientation in the cross vector space. The vectors are those that intersect at the extrema point. The cross product result is a vector that is orthogonal to the outline, either in the positive or negative z direction. A positive result indicates a counterclockwise winding order and a negative result indicates a clockwise winding order.

The winding order is determined based on the default winding order and the results of the cross products (step 1620). The default winding order is used unless three or four of the results indicate otherwise.

In the above description, implementations have been described in which a high resolution bitmap was generated, for example, at step 522 and step 1020 of FIGS. 5 and 10, respectively. A bitmap represents a grid of cells, which can be, for example, squares, rectangles, triangles, or trapezoids. Other techniques can be used, other than generating a bitmap, for example, a precursor structure referred to as a "cross array" may be generated, which includes high resolution information about where lines intersect projected pixel centers. Adjusted alpha maps may be generated from the information included in the cross array structure.

Moreover, implementations have been described in which processing is performed on a row by row basis. Processing is not so limited, however, and can be performed on a column by column basis.

In the described implementations, the outlines being processed included Bezier curves, examples of which include cubic Bezier curves and quadratic Bezier curves. The invention is not limited to processing outlines having Bezier curves, but rather can be applied to outlines that include other types of curves, as long as the curve is defined by information that can be used to calculate points associated with the curve. An example of such a non-Bezier curve is an arc defined by PostScript. In PostScript, an arc is generally defined by an origin, radius, starting angle, and ending angle. This information can be used to calculate endpoints of the arc, which can be processed as the above-described control points are processed to obtain line segments.

The above description made reference to examples using fonts including Roman characters, in particular, the character R. However, it should be understood that the techniques described in this specification can be used with fonts including other types of characters including, for example, Japanese kanji characters, Cyrillic characters or Arabic characters. Further, the techniques can be used in alternative writing modes such as left to right, right to left or vertical.

Embodiments of the invention and all of the functional operations described in this specification can be implemented in digital electronic circuitry, or in computer software, firmware, or hardware, including the structures disclosed in this specification and their structural equivalents, or in combinations of them. Embodiments of the invention can be implemented as one or more computer program products, i.e., one or more modules of computer program instructions encoded on a computer-readable medium, e.g., a machine-readable storage device, a machine-readable storage medium, a memory device, or a machine-readable propagated signal, for execution by, or to control the operation of, data processing apparatus. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Particular embodiments of the invention have been described. Other embodiments are within the scope of the following claims. For example, the actions recited in the claims can be performed in a different order and still achieve desirable results.

What is claimed is:

1. A method comprising:
  receiving a glyph for display at a size on a raster output device;
  receiving a grid ratio, the grid ratio specifying an integer number of fine pixels of a high resolution grid that correspond to a device pixel of a raster of the output device;
  rendering, with one or more computers, the glyph at the size on the high resolution grid, the high resolution grid including fine pixels marked to represent the glyph and fine pixels that are unmarked;
  determining, with the one or more computers, for each line of pixels of the high resolution grid in a particular direction, a line-specific, per-transition adjustment number, the line-specific, per-transition adjustment number determined from a scaled stem width for the glyph; and
  in each line of pixels of the high resolution grid, marking or erasing the line-specific, per-transition adjustment number of fine pixels in the high resolution grid at each transition from a marked fine pixel to an unmarked fine pixel in the particular direction.

2. The method of claim 1, wherein the glyph is associated with a font, and wherein determining the line-specific, per-transition adjustment number includes:
  obtaining a standard stem width of the font;
  calculating the scaled stem width for the glyph by scaling the standard stem width to the size at which the glyph is to be displayed on the raster output device;
  calculating an adjustment number from the scaled stem width; and
  determining the integer line-specific, per-transition adjustment number, the determining being based at least on the adjustment number.

3. The method of claim 2, wherein determining the integer line-specific, per-transition adjustment number includes:
  defining a pattern of the adjustment number of fine pixels for distribution among lines of fine pixels of the high resolution grid; and
  using the pattern to select, for each line of fine pixels of the high resolution grid in the particular direction, the integer number of fine pixels to be marked or erased at each transition from a marked fine pixel to an unmarked fine pixel in a particular direction.

4. The method of claim 3, wherein:
  the pattern is a form of dithering in which the line-specific, per-transition adjustment number does not vary by more than one fine pixel from one line of fine pixels to a next line of fine pixels.

5. The method of claim 2, wherein:
  the calculating of the adjustment number is based on one of a function for providing synthetic bold, a function for providing synthetic light, or a function for providing optical compensation.

6. The method of claim 5, wherein:
  the function for providing synthetic bold and the function for providing synthetic light each defines a linear relationship between adjustment number and scaled stem width; and
  the function for optical compensation defines an inversely proportional relationship between adjustment number and scaled stem width.

7. The method of claim 2, wherein calculating an adjustment number includes:
  calculating a component for producing a synthetic bold appearance or a synthetic light appearance;
  calculating a component for optical compensation, the calculating of the component for optical compensation accounting for the component for producing a bold appearance or the component for producing the synthetic light; and
  combining the components.

8. The method of claim 2, wherein the grid ratio specifies a number of rows of fine pixels that correspond to a height of the device pixel, wherein the line of fine pixels is a row in the high resolution grid, and wherein the adjustment number determined based on the scaled stem width is a first adjustment number, the method further comprising:
  calculating a second adjustment number by dividing the first adjustment number by the number of rows of fine pixels corresponding to the height of the device pixel;

when the second adjustment number is not an integer, selecting two integers that delimit the second adjustment number;

defining a pattern of a number of instances of the two integers, a sum of values of the instances in the pattern equaling the first adjustment number, the number of instances equaling the number of rows of fine pixels corresponding to the height of the device pixel; and selecting, based on the pattern, one of the two integers as the line-specific, per-transition adjustment number.

9. The method of claim 1, wherein obtaining the integer number includes:

calculating an adjustment number from the size at which the glyph is to be displayed, wherein the size is expressed as either points per em or pixels per em; and determining the line-specific, per-transition adjustment number, the determining being based at least on the adjustment number.

10. The method of claim 1, wherein:

the high resolution grid is stored in a digital memory as a bitmap.

11. The method of claim 10, wherein rendering the glyph includes:

adding unmarked fine pixels to an edge of the bitmap to allow for the marking or erasing.

12. The method of claim 10, further comprising:

adjusting a bitmap metric after the marking or erasing.

13. The method of claim 1, wherein:

the marking or erasing are performed by a rasterizer during rendering, the rasterizer being a first component of a renderer.

14. The method of claim 13, further comprising:

downsampling the bitmap representing the adjusted version of the glyph.

15. The method of claim 13, wherein:

the downsampling is performed by a downsampler that is a second component of the renderer.

16. The method of claim 1, where the particular direction of the line of pixels is vertical.

17. A computer-program product, tangibly stored on machine-readable storage medium, the product comprising instructions operable to cause a computing device to perform a method comprising:

receiving a glyph for display at a size on a raster output device;

receiving a grid ratio, the grid ratio specifying an integer number of fine pixels of a high resolution grid that correspond to a device pixel of a raster of the output device;

rendering the glyph at the size on the high resolution grid, the high resolution grid including fine pixels marked to represent the glyph and fine pixels that are unmarked;

determining for each line of pixels of the high resolution grid in a particular direction, a line-specific, per-transition adjustment number, the line-specific, per-transition adjustment number determined from a scaled stem width for the glyph; and in each line of pixels of the high resolution grid, marking or erasing the line-specific, per-transition adjustment number of fine pixels in the high resolution grid at each transition from a marked fine pixel to an unmarked fine pixel in a particular direction of the line of pixels.

18. The product of claim 17, wherein the glyph is associated with a font, and wherein determining the line-specific, per-transition adjustment number includes:

obtaining a standard stem width of the font;

calculating the scaled stem width for the glyph by scaling the standard stem width to the size at which the glyph is to be displayed on the raster output device;

calculating an adjustment number from the scaled stem width; and determining the integer line-specific, per-transition adjustment number, the determining being based at least on the adjustment number.

19. The product of claim 18, wherein determining the integer line-specific, per-transition adjustment number includes:

defining a pattern of the adjustment number of fine pixels for distribution among lines of fine pixels of the high resolution grid; and using the pattern to select, for each line of fine pixels of the high resolution grid in the particular direction, the integer number of fine pixels to be marked or erased at each transition from a marked fine pixel to an unmarked fine pixel in a particular direction.

20. The product of claim 19, wherein:

the pattern is a form of dithering in which the line-specific, per-transition adjustment number does not vary by more than one fine pixel from one line of fine pixels to a next line of fine pixels.

21. The product of claim 18, wherein:

the calculating of the adjustment number is based on one of a function for providing synthetic bold, a function for providing synthetic light, or a function for providing optical compensation.

22. The product of claim 21, wherein:

the function for providing synthetic bold and the function for providing synthetic light each defines a linear relationship between adjustment number and scaled stem width; and the function for optical compensation defines an inversely proportional relationship between adjustment number and scaled stem width.

23. The product of claim 18, wherein calculating an adjustment number includes:

calculating a component for producing a synthetic bold appearance or a synthetic light appearance;

calculating a component for optical compensation, the calculating of the component for optical compensation accounting for the component for producing a bold appearance or the component for producing the synthetic light; and combining the components.

24. The product of claim 18, wherein the grid ratio specifies a number of rows of fine pixels that correspond to a height of the device pixel, wherein the line of fine pixels is a row in the high resolution grid, wherein the adjustment number determined based on the scaled stem width is a first adjustment number, and wherein the method further comprises:

calculating a second adjustment number by dividing the first adjustment number by the number of rows of fine pixels corresponding to the height of the device pixel;

when the second adjustment number is not an integer, selecting two integers that delimit the second adjustment number;

defining a pattern of a number of instances of the two integers, a sum of values of the instances in the pattern equaling the first adjustment number, the number of instances equaling the number of rows of fine pixels corresponding to the height of the device pixel; and selecting, based on the pattern, one of the two integers as the line-specific, per-transition adjustment number.

25. The product of claim 17, wherein obtaining the integer number includes:

calculating an adjustment number from the size at which the glyph is to be displayed, wherein the size is expressed as either points pattern or pixels per em; and determining the line-specific, per-transition adjustment number, the determining being based at least on the adjustment number.

26. The product of claim 17, wherein:

the high resolution grid is stored in a digital memory as a bitmap.

27. The product of claim 26, wherein rendering the glyph includes:

adding unmarked fine pixels to an edge of the bitmap to allow for the marking or erasing.

28. The product of claim 26, wherein the method further comprises:

adjusting a bitmap metric after the marking or erasing.

29. The product of claim 17, wherein:

the marking or erasing are performed by a rasterizer during rendering, the rasterizer being a first component of a rendering engine.

30. The product of claim 29, wherein the method further comprises:

downsampling the bitmap representing the adjusted version of the glyph.

31. The product of claim 29, wherein:

the downsampling is performed by a downsampler that is a second component of the rendering engine.

32. The product of claim 17, where the particular direction of the line of pixels is vertical.

33. A system comprising:

one or more computers configured to perform operations comprising:

receiving a glyph for display at a size on a raster output device;

receiving a grid ratio, the grid ratio specifying an integer number of fine pixels of a high resolution grid that correspond to a device pixel of a raster of the output device;

rendering the glyph at the size on the high resolution grid, the high resolution grid including fine pixels marked to represent the glyph and fine pixels that are unmarked;

determining, for each line of pixels of the high resolution grid in a particular direction, a line-specific, per-transition adjustment number, the adjustment number determined from a scaled stem width for the glyph; and in each line of pixels of the high resolution grid, marking or erasing the line-specific, per-transition adjustment number of fine pixels in the high resolution grid at each transition from a marked fine pixel to an unmarked fine pixel in the particular direction.

* * * * *

UNITED STATES PATENT AND TRADEMARK OFFICE
CERTIFICATE OF CORRECTION

PATENT NO. : 7,719,536 B2
APPLICATION NO. : 11/464716
DATED : May 18, 2010
INVENTOR(S) : Terence S. Dowling It is certified that error appears in the above-identified patent and that said Letters Patent is hereby corrected as shown below:

Column 31, line 9, in Claim 25, delete "pattern" and insert --per em-- therefor;

Column 32, line 21, in Claim 33, after "the" delete "adjustment number" and insert --line-specific, per-transition adjustment number-- therefor.

Signed and Sealed this

Twenty-fourth Day of August, 2010

David J. Kappos
*Director of the United States Patent and Trademark Office*